United States Patent
Lee et al.

(10) Patent No.: US 10,412,534 B2
(45) Date of Patent: Sep. 10, 2019

(54) METHOD AND DEVICE FOR PROVIDING SERVICE USING DATA BROADCASTING OF MOBILE DEVICE

(71) Applicant: SAMSUNG ELECTRONICS CO., LTD., Suwon-si (KR)

(72) Inventors: Kang-min Lee, Hwaseong-si (KR); Hyun-geun Jo, Seoul (KR); Hyung-rae Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 3 days.

(21) Appl. No.: 14/757,557

(22) Filed: Dec. 24, 2015

(65) Prior Publication Data
US 2016/0192118 A1 Jun. 30, 2016

(30) Foreign Application Priority Data
Dec. 26, 2014 (KR) ........................ 10-2014-0190904

(51) Int. Cl.
*H04W 4/02* (2018.01)
*G06Q 30/02* (2012.01)
*H04W 4/06* (2009.01)
*H04W 52/02* (2009.01)
*H04W 4/80* (2018.01)

(52) U.S. Cl.
CPC .......... *H04W 4/02* (2013.01); *G06Q 30/0259* (2013.01); *G06Q 30/0261* (2013.01); *G06Q 30/0267* (2013.01); *G06Q 30/0281* (2013.01); *H04W 4/06* (2013.01); *H04W 4/80* (2018.02); *H04W 52/0251* (2013.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/22* (2018.01); *Y02D 70/26* (2018.01)

(58) Field of Classification Search
CPC .......... G06Q 30/0267; G06Q 30/0281; H04W 4/008; H04W 4/02; H04W 4/06
USPC ........................................................ 455/41.2
See application file for complete search history.

(56) References Cited

U.S. PATENT DOCUMENTS

| 8,055,762 B2 | 11/2011 | Messer et al. |
| 9,151,823 B2 | 10/2015 | Lu et al. |
| 2006/0126601 A1 | 6/2006 | Kim et al. |
| 2006/0135117 A1* | 6/2006 | Laumen .................. H04W 4/24 455/405 |

(Continued)

FOREIGN PATENT DOCUMENTS

| EP | 2741527 A1 | 6/2014 |
| JP | 2014-33256 A | 2/2014 |

(Continued)

OTHER PUBLICATIONS

Search Report dated Mar. 24, 2016, issued by the International Searching Authority in counterpart International Patent Application No. PCT/KR2015/013781 (PCT/ISA/210).
Written Opinion dated Mar. 24, 2016, issued by the International Searching Authority in counterpart International Patent Application No. PCT/KR2015/013781 (PCT/ISA/237).

(Continued)

*Primary Examiner* — Eugene Yun
(74) *Attorney, Agent, or Firm* — Sughrue Mion, PLLC

(57) ABSTRACT

A service providing method including transmitting user ID information to a service terminal, receiving first service information from a server, and controlling a user terminal to provide a service using received first service information.

26 Claims, 48 Drawing Sheets

(56) References Cited

U.S. PATENT DOCUMENTS

| | | | |
|---|---|---|---|
| 2007/0036096 A1 | 2/2007 | Sinivaara | |
| 2007/0060117 A1 | 3/2007 | Fishman et al. | |
| 2007/0135121 A1* | 6/2007 | Bae | H04W 4/02 455/432.1 |
| 2010/0125492 A1 | 5/2010 | Lin et al. | |
| 2011/0252336 A1* | 10/2011 | Ishii | G16H 40/20 715/745 |
| 2012/0042036 A1 | 2/2012 | Lau et al. | |
| 2013/0211912 A1 | 8/2013 | Kim et al. | |
| 2013/0217332 A1 | 8/2013 | Altman et al. | |
| 2013/0226704 A1 | 8/2013 | Fernandez | |
| 2013/0346546 A1 | 12/2013 | Jung | |
| 2014/0058770 A1 | 2/2014 | Kim et al. | |
| 2014/0066014 A1* | 3/2014 | Nicholson | H04W 12/08 455/411 |
| 2015/0163765 A1* | 6/2015 | Hobbs | H04W 64/00 455/41.2 |

FOREIGN PATENT DOCUMENTS

| | | |
|---|---|---|
| KR | 10-2010-0076498 A | 7/2010 |
| KR | 10-2010-0098836 A | 9/2010 |
| KR | 10-2013-0082699 A | 7/2013 |
| KR | 10-2013-0092500 A | 8/2013 |
| KR | 10-2013-0097683 A | 9/2013 |

OTHER PUBLICATIONS

Communication dated May 2, 2016, issued by the European Patent Office in counterpart European Patent Application No. 15202720.7.

* cited by examiner

FIG. 3A

| USER CONTEXT INFORMATION TYPE | USER CONTEXT INFORMATION | SERVICE INFORMATION |
|---|---|---|
| INTEREST INFORMATION | CLEANER | CLEANER DISCOUNT COUPON |
| INTEREST INFORMATION | SMARTPHONE | SMARTPHONE DISCOUNT COUPON |
| STATE INFORMATION | GOING HOME FROM SCHOOL | BUS TIME SCHEDULE |
| STATE INFORMATION | WEATHER STATE | DAILY TASK INFORMATION |

FIG. 3B

| USER ID INFORMATION | USER GRADE |
|---|---|
| 11 | EXCELLENT |
| 12 | EXCELLENT |
| 13 | EXCELLENT |
| 14 | NEW CUSTOMER |

METHOD AND DEVICE FOR PROVIDING SERVICE USING DATA BROADCASTING OF MOBILE DEVICE

CROSS-REFERENCE TO RELATED PATENT APPLICATION

This application claims priority from Korean Patent Application No. 10-2014-0190904, filed on Dec. 26, 2014, in the Korean Intellectual Property Office, the disclosure of which is incorporated herein by reference in its entirety.

BACKGROUND

Field

Methods and apparatuses consistent with exemplary embodiments relate to a method of providing a service to a mobile device using data broadcasting of the mobile device, and an electronic apparatus for performing the method.

Description of Related Art

Various methods of providing a service to a user exist. For example, there is a method of providing an advertisement service to a user based on interest information that the user has registered in a server. For example, when a user subscribes to a web site, a service provider may provide pieces of promotion information to the user via an e-mail, based on interest information that the user has input to the web site. However, because this service providing method fails to reflect a current situation of a user, the user cannot be provided with useful service information in real time.

In another example, there has been proposed a method of providing service information using a quick response (QR) code. For example, a service providing method has been proposed in which a web address is provided to a user using a QR code and the user obtains information from the received web address. In this service method, the user may photograph the QR code to obtain desired information. To acquire a QR code, the user may acquire an image of the QR code by operating the camera of a user terminal of the user. However, many users experience inconvenience when attempting to acquire a QR code.

To remove the inconvenience of the service method using a QR code, a method of providing a web address or service information to a user using short-range communication has been developed. The method using short-range communication prevents users from being inconvenienced by having to directly acquire an image of a QR code. However, a user terminal may periodically check whether a signal that uses short-range communication is received from an external source. In addition, if the user terminal determines that the signal is received, the user terminal may scan data received from the signal and thus check whether the scanned data is valid data that is used in a service. In the case of using short-range communication, a plurality of users exist and use short-range communication. Thus, the number of times a user terminal performs scanning and the amount of data to be scanned increases, leading to an increase of the load on the user terminal. This load increase increases power consumption of the user terminal.

Accordingly, a system for reducing power consumption of a user terminal and also providing service information to a user without special user manipulation is needed.

SUMMARY

According to an aspect of an exemplary embodiment, a user terminal includes a communicator configured to transmit user ID information to a service terminal and receive service information from a server; and a controller configured to control the user terminal to provide a service using the service information. The service information is provided from the server to the user terminal according to a service request provided to the server by the service terminal.

The service information may include at least one among service information generated by the server according to the user context information, and service information provided by the service terminal to the server.

The communicator may be further configured to broadcast the user ID information to an unspecified terminal using a short-range wireless communication method.

The user ID information may include at least one among a user ID, terminal ID information of the user terminal, and network ID information of the user terminal.

The user terminal may further include an input interface configured to receive a user input. The controller may be further configured to control the communicator to broadcast user context information acquired using the input interface. The service information may include at least one among service information generated by the server according to the user context information, and service information generated by the service terminal according to the user context information.

The user terminal may further include a sensor configured to generate sensing data based on sensed surroundings of the user terminal. The controller may be further configured to determine corresponding user context information mapped with the sensing data using mapping information representing mapping between the sensing data and the user context information, and control the communicator to broadcast the determined user context information.

The controller may be further configured to determine whether transmission conditions for broadcasting the determined user context information have been satisfied, and, in response to the determining, control the communicator to broadcast the determined user context information.

The controller is further configured to, in response to the user context information being broadcast, transmit a message to an external terminal according to history information, the message comprising a control message that is transmitted by the user terminal, and in response to the user context information being broadcast, generate the history information may including the control message transmitted by the user terminal and ID information corresponding to the external terminal having received the message.

The controller may be further configured to update the history information using a control input that is made by the external terminal to the user terminal after state information is broadcast.

According to an aspect of an exemplary embodiment, a service terminal includes a communicator configured to receive user ID information from a user terminal and transmit a service provision request to a server; and a controller configured to control the communicator receive the user ID information, to transmit the service provision request to the server in response to receiving the user ID information from the user terminal.

The controller may be further configured to control the communicator to transmit the user ID information to the server.

The communicator may be further configured to receive user context information from the user terminal, and the controller may be further configured to control the communicator to transmit the user context information to the server.

The communicator may be further configured to receive service information from the server, and the controller may be further configured to control the service terminal to provide a service using the service information, and the service information may be generated by the server having received the user context information from the service terminal, according to the user context information.

The communicator may be further configured to receive user context information from the user terminal, and the controller may be further configured to determine corresponding service information mapped with the received user context information using mapping information representing mapping between the user context information and the service information, and control the communicator to transmit the corresponding service information to the server.

According to an aspect of an exemplary embodiment, a server includes a communicator configured to receive a service provision request comprising user ID information from a service terminal having received the user ID information from a user terminal, and transmit service information to a user terminal; and a controller configured to determine the user terminal using the user ID information and generate the service information according to the service provision request, and control the communicator to transmit the service information to the reception device in response to receiving the user ID information and the service provision request from the service terminal.

The communicator may be further configured to receive user context information from the service terminal, and the controller may be further configured to determine corresponding service information mapped with the received user context information using mapping information representing mapping between user context information and service information, and control the communicator to transmit the determined service information to the user terminal.

According to an aspect of an exemplary embodiment, a service providing method performed by a user terminal includes broadcasting user ID information to a service terminal; receiving service information from a server; and controlling the user terminal to provide a service using the received service information. The service information is provided from the server to the user terminal according to a service request provided to the server by the service terminal having received the broadcast user ID information.

According to an aspect of an exemplary embodiment, a service providing method performed by a service terminal includes receiving broadcast user ID information from a user terminal; and transmitting a service provision request corresponding to a user terminal service to the user terminal and the user ID information to a server.

According to an aspect of an exemplary embodiment, a service providing method performed by a server includes receiving a service provision request comprising user ID information from a service terminal that has received the user ID information from a user terminal; determining the user terminal using the user ID information; generating service information according to the service provision request; and transmitting the service information to the user terminal.

According to an aspect of an exemplary embodiment, there is provided a service providing system including: a user terminal including a user terminal communicator and a user terminal controller; a service terminal including a service terminal communicator and a service terminal controller; and a server including a server communicator and a server controller. The user terminal controller is configured to control the user terminal communicator to transmit user ID information to the service terminal, the service terminal controller is configured to control the service terminal communicator to receive the user ID information from the user terminal, determine a service request, and transmit the service request to the server, the server controller is further configured to control the server communicator to receive the service request form the service terminal, determine service information corresponding to the service request, and control the server communicator to transmit the service information to the user terminal, and the user terminal controller is further configured to control the user terminal communicator to receive the service information from the server and generate a user service based on the service information.

The user terminal may further include an input interface configured to generate a user input signal, and the user terminal controller may be further configured to generate a control message comprising the user ID information based on the user input signal and control the user terminal controller to transmit the control message to the service terminal.

The user terminal may further include a sensor configured to generate a sensor signal, and the user terminal controller may be further configured to generate a control message including the user ID information based on the sensor signal and control the user terminal controller to transmit the control message to the service terminal.

The sensor signal may correspond to a location of the user terminal, and the server controller may be further configured to determine a user terminal location based on the sensor signal, and determine the service information based on the location of the user terminal.

BRIEF DESCRIPTION OF THE DRAWINGS

These and/or other aspects will become apparent and more readily appreciated from the following description of the exemplary embodiments, taken in conjunction with the accompanying drawings in which:

FIGS. 3A and 3B illustrate formats in which service information is stored, according to one or more exemplary embodiments;

DETAILED DESCRIPTION

Figure 1:
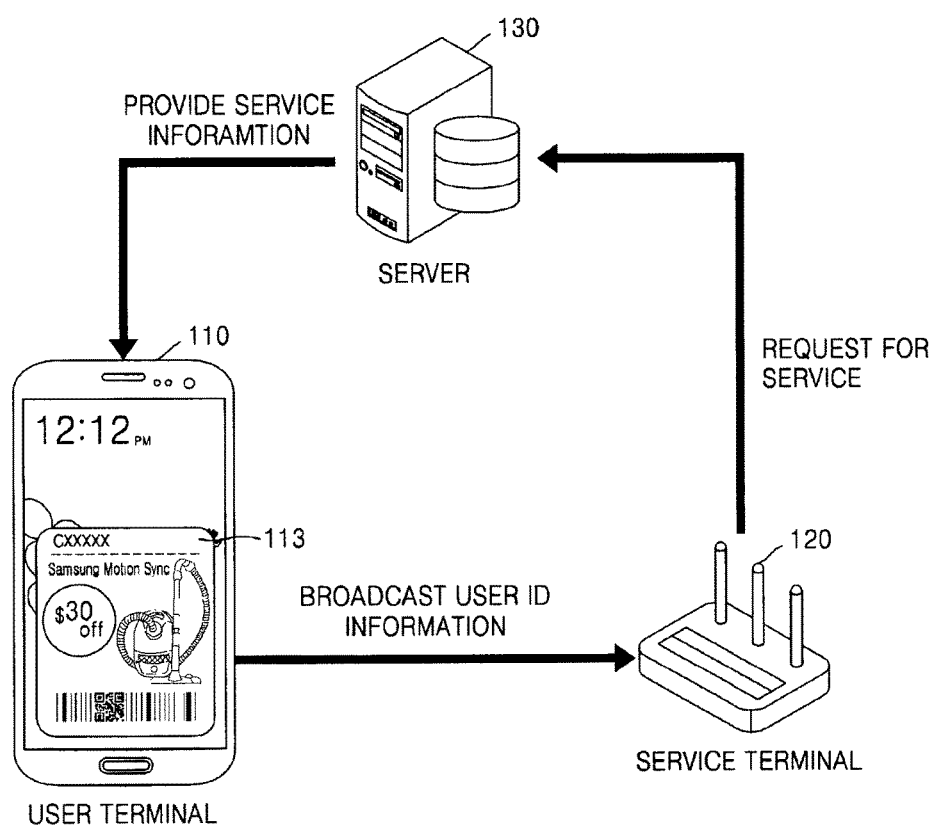
FIG. 1 is a conceptual view illustrating a service providing method according to an exemplary embodiment.

Reference will now be made in detail to exemplary embodiments, examples of which are illustrated in the accompanying drawings, wherein like reference numerals refer to the like elements throughout. In this regard, the present exemplary embodiments may have different forms and should not be construed as being limited to the descriptions set forth herein. Accordingly, the exemplary embodiments are described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the terms used in the specification will be briefly described, and then exemplary embodiments will be described in detail.

Although terms widely used at present were selected in consideration of the functions thereof, these terms may vary according to intentions of one of ordinary skill in the art, case precedents, the advent of new technologies, and the like. Terms arbitrarily selected may also be used in a specific case. In this case, their meanings need to be given in the detailed description. Hence, the terms must be defined based on their meanings and the content of the entire specification, not by simply stating the terms.

The terms "comprises" and/or "comprising" or "includes" and/or "including" when used in this specification, specify the presence of stated elements, but do not preclude the presence or addition of one or more other elements. The terms " . . . unit" and " . . . module" when used in this specification refers to a module in which at least one function or one operation is performed, and may be implemented as hardware, software, or a combination of hardware and software.

The term "short-range communication" used throughout the specification may include, but are not limited to, at least one of wireless LAN (Wi-Fi), Bluetooth, ZigBee, Wi-Fi Direct (WFD), Ultra-Wideband (UWB), Infrared Data Association (IrDA), Bluetooth Low energy (BLE), near field communication (NFC), and Ant+.

Wireless LAN (Wi-Fi) may include an infrastructure mode in which an access point (AP) that transmits a wireless signal exchanges data with a plurality of terminals existing within a predetermined range of the AP, and an ad-hoc mode in which terminals mutually exchange data in a peer-to-peer (P2P) way, without the AP.

Bluetooth is a standard technology for wireless communication devices that perform wireless communication therebetween within a short range using low power.

UWB is a wireless communication technology used to transmit a large amount of data in a short period via a large spectrum frequency using low power.

WFD is a new version of Wi-Fi technology that incorporates direct communication between devices. For example, devices in which WFD is installed may communicate with each other and share information with each other even when no hotspot, router, or AP is provided.

ZigBee is one of the IEEE 802.15.4 standards that support short-range wireless communication. ZigBee is a technology for short-range wireless communication within a distance of 10 m to 20 m and ubiquitous computing in a wireless networking environment such as one that is established in a house or an office.

BLE refers to a core function of Bluetooth V 4.0 that is one of the short range communication technologies. BLE may have a relatively small duty cycle compared to a classic Bluetooth specification, may be produced at low costs, and may operate for several years with a coin-sized battery due to reduced mean power and standby power.

NFC, which may use a sort of radio frequency ID (RFID) or electronic tag, refers to non-contact short range wireless communication using a frequency band of 13.56 MHz. NFC enables data communication between devices at a distance of 10 cm through a short range wireless communication technology. NFC may include a P2P mode, a reader/writer (R/W) mode, and a card emulation mode.

Ant+ refers to a wireless communication technology with low power consumption and is used for short range communication using a frequency band of 2.4 GHz.

Exemplary embodiments are described in detail herein with reference to the accompanying drawings so that this disclosure may be easily performed by one of ordinary skill in the art. Exemplary embodiments may, however, be embodied in many different forms, and should not be construed as being limited to the exemplary embodiments set forth herein. In the drawings, parts irrelevant to the description are omitted for simplicity of explanation, and like numbers refer to like elements throughout.

FIG. 1 is a conceptual view illustrating a service providing method according to an exemplary embodiment.

The service providing method according to an exemplary embodiment is provided by including a user terminal 110, a service terminal 120, and a server 130.

The user terminal 110 may be, but is not limited to, a mobile device, a wearable device, an audio player, a car, or the like. For example, the user terminal 110 may be a smartphone, a tablet PC, smart glasses, a smart watch, a smart ring, a smart patch, a smart band, or a portable audio player. Alternatively, the user terminal 110 may be a navigation device for vehicles, a transparent display device, or a head-up display device, for example.

The user terminal 110 may transmit at least one of user ID information and user context information to an unspecific terminal. For example, the user terminal 110 may broadcast the user ID information. Alternatively, the user terminal 110 may broadcast the user ID information and the user context information. The user terminal 110 may broadcast the user ID information and the user context information to transmit the user ID information to the service terminal 120, which is not specified.

The user ID information includes information for identifying a user of the service providing method according to an exemplary embodiment. The user ID information may include a user ID. As another exemplary embodiment, the user ID information may include a terminal ID for identifying the user terminal 110 that uses the service providing method according to an exemplary embodiment. Alternatively, the user ID information may include a network ID of the user terminal 110 that uses the service providing method according to an exemplary embodiment. The network ID is information for specifying a reception terminal to perform data communication in a network. For example, the network ID may be an address of a physical layer (PHY layer or MAC layer) of a terminal connected to the network.

The user ID information may be pre-stored in the user terminal 110. Alternatively, the user ID information may be acquired by being input to the user terminal 110 by a user or may be acquired by being received from an external device. When the user ID information includes a user ID, the user terminal 110 may receive the user ID from the user and thus acquire the user ID. When the user ID information includes a network ID, the user terminal 110 may be allocated a network ID by the server 130.

The user context information includes at least one of user interest information, user state information, user event information, state information of a terminal of the user, and terminal surrounding information of the user. The user context information represents a correlation between the user and a surrounding environment.

The user interest information includes information about interests of a current user. For example, the user interest information represents a product, a service, news, or a schedule in which a user is interested. For example, the user interest information may include information such as the title and ID number of a product in which a user is interested.

The user state information represents the state of a current user. The user state information may represent the psychological state or physical state of the current user. The user state information may represent a psychological state of a user, such as, an enjoyable state, a happy state, a sad state, an infuriated state, or a sleepy state of the user. Alternatively, the user state information may include location information of a current user or time information, such as a location of a current user or a current time. The user state information may also represent a state in which a current user is going to school, a state in which the current user is going home from school, a state in which a current user is shopping, a state in which a current user needs to wake up, or a state in which a current user has got lost, for example.

The user event information represents an event that has occurred with respect to a current user. For example, the user event information may include pieces of information about a loss event of the user terminal 110, an event in which a notification message has been generated in a group to which a user belongs, an event in which a user has been assigned homework by the school, and an event in which a user takes a picture.

Although the user context information is exemplified above, the user context information is not limited to the aforementioned examples.

The user context information may be generated by being directly received by the user terminal 110 from the user, may be generated by analyzing information previously input by the user, may be generated by the user terminal 110 analyzing the circumstances of the user using a sensor, or may be generated by being received from an external apparatus.

For example, the user terminal 110 may directly receive user interest information from the user. For example, the user terminal 110 may receive, as the user interest information, a product title, an ID code, and the like, of a product in which the user is interested. Alternatively, the user terminal 110 may generate interest information of the user by analyzing, for example, a search history of the user and a message input by the user. Alternatively, the user terminal 110 may receive interest information from the server 130 or another user.

For example, when the user context information includes user state information, the user terminal 110 may directly receive a current state from the user. Alternatively, the user terminal 110 may analyze a body signal of the user by analyzing a heartbeat, a breathing pattern, and the like of the user using a sensor, thereby determining user state information according to a body state of the user. Alternatively, the user terminal 110 may determine location information of the user using, for example, a global positioning system (GPS). Alternatively, the user terminal 110 may determine time information according to a current time set by the user terminal 110 or a current time displayed on the user terminal 110.

Alternatively, the user terminal 110 may compare a current time with the time to go home from school using home time information previously received from the user, and, when the current time is the time to go home from school, the user terminal 110 may generate user state information indicating that the user is currently going home from school. Alternatively, the user terminal 110 may compare information about preset dangerous regions with a current location of the user, and, when the current location of the user is included in the preset dangerous regions, the user terminal 110 may generate user state information representing that the user is currently located in a dangerous region.

When the user context information includes user event information, the user terminal 110 may directly receive information about generation of an event from the user. Alternatively, the user terminal 110 may receive information about generation of an event from the server 130 or another user. Alternatively, the user terminal 110 may generate user event information by analyzing sensing information that has been generated by a sensor.

For example, when the user terminal 110 fails in user authentication a preset number or more of times, the user terminal 110 may determine that the user terminal 110 has been lost, and may generate a loss event of the user terminal 110 as user event information.

The user context information may be pre-stored in the user terminal 110. The user context information may be pre-stored in a memory of the user terminal 110. Alternatively, the user context information may be pre-stored in the server 130. The user context information may be pre-stored according to users or devices in the server 130. For example, the user context information may be stored for each person in the server 130, or may be stored for each group of users in the server 130. Alternatively, user context information set by another user may be pre-stored in the server 130.

As described above, the user context information may be directly set by a user. The user may set user context information of another user. Alternatively, a business owner may set user context information of some or all of clients. The business owner may set user context information according to previous classification of the clients. For example, when the clients are classified according to hobbies, interest information with respect to electronic products may be set for clients who are interested in electronic products, and interest information with respect to sports events may be set for clients who are interested in sports events. Alternatively, when the clients are classified according to monthly consumed money, interest information with respect to expensive products may be set for clients having high monthly consumed money, and interest information with respect to cheap products may be set for clients having low monthly consumed money.

The user context information may be set by the server 130. For example, the cloud server 130 may generate the user context information of a user by investigating a terminal usage pattern of the user. For example, the cloud server 130 may generate a common subject as the user interest information by analyzing, for example, images uploaded by the user to the cloud server 130 and keywords searched from the cloud server 130. The server 130 may transmit the user context information to the user terminal 110 at the request of the user terminal 110.

The user context information may be set for a group of users. For example, user context information may be set for the users belonging to a group, such as, a student group or a small group. A person having an authority to set user context information for a group may set user context information for the group.

For example, when a user group is a class group made of students and a guidance teacher who belong to a class in a school, the guidance teacher, a class president, and some or all of the students of the class, may generate user context information of all of the students belonging to the class group, or may generate user context information of some of the students belonging to the class group.

The user terminal 110 may determine whether to transmit the user context information. The user terminal 110 may periodically determine whether to transmit the user context information. The user terminal 110 may receive and store transmission conditions for transmitting the user context information. When the transmission conditions are satisfied, the user terminal 110 may determine that the user context information is to be transmitted, and may transmit the user context information. When a value acquired from a sensor or a user input satisfies the received transmission conditions, the user terminal 110 may determine that the user context information is to be transmitted, and may transmit the user context information.

For example, the user terminal 110 may receive home time information as the transmission conditions from the user and store the home time information. When a current time is a home time specified in the transmission conditions, the user terminal 110 may broadcast user context information representing that the user is currently going home from school. Alternatively, the user terminal 110 may receive a transmission condition representing that, when the user is located in a dangerous region, user context information is to be transmitted. In this example, when the user terminal 110 acquires a location of the user terminal 110 using a GPS and the acquired location corresponds to a dangerous region, the transmission condition is satisfied, and thus the user terminal 110 may broadcast user state information representing that the user is currently located in a dangerous region.

The service terminal 120 receives from the user terminal 110 the user ID information and the user context information that are transmitted by the user terminal 110 to an unspecified terminal. The service terminal 120 may be a beacon that receives information that is broadcast by the user terminal 110. Alternatively, the service terminal 120 may be a large-sized display device, a car, a sensor, or the like, but the service terminal 120 is not limited thereto.

The service terminal 120 may receive user ID information that is broadcast by the user terminal 110. According to an exemplary embodiment, at least one service terminal 120 may receive the user ID information of the user terminal 110. The service terminal 120 may also receive user context information that is broadcast by the user terminal 110.

The service terminal 120 may generate user context information. The service terminal 120 may generate the user context information using the same method as the above-described method in which the user terminal 110 generates user context information. For example, the service terminal 120 may generate the user context information by directly receiving the same from a user, may generate the user context information by analyzing the information previously input by the user, may generate the user context information by analyzing the circumstances of the user using a sensor, or may generate the user context information by receiving the same from an external apparatus.

The service terminal 120 may transmit the generated user context information to the server 130. When the service terminal 120 receives the user ID information from the user terminal 110, the service terminal 120 may transmit the received user ID information together with the generated user context information to the server 130. The service terminal 120 may further transmit the user context information received from the user terminal 110 to the server 130.

The service terminal 120 generates service information. The service information may include information about a product or an event. For example, the service information may include information about a product, multimedia content, or promotion, but is not limited thereto. The service information may include at least one data type from among text, audio, video, and hologram data, however the data type of the service information is not limited to these examples.

For example, the service information may include a uniform resource locator (URL) address in which information of a product is contained, or abstract information about the product. Alternatively, the service information may include a URL address, abstract information, or the like of content. Alternatively, the service information may include promotion coupon information, a barcode, or a URL address.

When the service terminal 120 receives the user ID information from the user terminal 110, the service terminal 120 may generate the service information. The service terminal 120 may generate the service information, based on user context information. The service terminal 120 may generate the service information according to the user context information received from the user terminal 110 or the user context information generated by the service terminal 120.

For example, when the user context information includes user interest information, the service terminal 120 may generate, as the service information, a discount coupon image associated with a product name or product ID code included in the user interest information, or a URL address that contains detailed information of a product.

When the user context information includes user state information, the service terminal 120 may generate the service information according to states of the user. For example, the service terminal 120 may generate, as the service information, a proverb helping the user to calm down, according to user state information representing that the user is in an excited state.

For example, the memory of the service terminal 120 may store mapping data representing mapping between the user context information and the service information. The service terminal 120 may determine what service information is to be provided to the user in response to user context information, using the mapping data. For example, when the user context information includes user interest information including a cleaner, the service terminal 120 may generate a cleaner discount coupon as the service information. Alternatively, when the user context information includes user state information representing that the user is going home from school, the service terminal 120 may generate a bus time schedule as the service information.

The service terminal 120 may determine service information to be provided based on user context information in other ways. For example, the service terminal 120 may generate different pieces of service information for the same user context information, according to locations where or time points when the user terminal 110 broadcasts the user context information. Alternatively, the service terminal 120 may map the same user context information of the user terminal 110 with different pieces of service information, according to locations where, or time points when, the service terminal 120 has received the user context information of the user terminal 110. The service terminal 120 may store information for performing the mapping. Alternatively, the service terminal 120 may generate the service information according to a method, which will be described later, by which the server 130 generates service information.

For convenience of explanation, the service information generated by the service terminal 120 will now be defined as first service information. However, this definition is only made for explanation, and thus the service information generated by the service terminal 120 may be defined as another name.

The service terminal 120 may generate the first service information using the user context information received from the user terminal 110. For example, when the user context information received from the user terminal 110 includes information about interest products of the user, the service terminal 120 may generate the information about the interest products of the user as the first service information. For example, the service terminal 120 may generate a product discount coupon as the first service information.

The service terminal 120 may provide a service directly to the user according to the first service information. For example, the service terminal 120 may directly display a discount coupon image.

The service terminal 120 may transmit the first service information to the user terminal 110. The service terminal 120 may provide the first service information to a user indicated by the user ID information. For example, the service terminal 120 may provide the first service information to the user terminal 110, which is indicated by the user ID information, or may provide the first service information to an account of the user indicated by the user ID information.

The service terminal 120 may transmit the first service information to the user terminal 110 via another terminal. For example, the service terminal 120 may transmit the first service information to the user terminal 110 via the server 130. The service terminal 120 may transmit the user ID information received from the user terminal 110 to the server 130. For example, the service terminal 120 may transmit both the user ID information received from the user terminal 110 and the first service information to the server 130.

The service terminal 120 may transmit to the server 130 at least one of user ID information, user context information, and service information. Together with the at least one information, the service terminal 120 may also transmit, to the server 130, device information of a reception terminal that is to receive the service information, a physical network address of the reception terminal, and a data type that may be received by the reception terminal.

The user context information may be related to a location or time. For example, the user interest information may be related to a location of a user and a current time. When the service terminal 120 transmits user context information related to the location of the service terminal 120 to the server 130, the service terminal 120 may also transmit information of a business owner terminal. For example, when the service terminal 120 is located in multiple stores, the service terminal 120 may transmit to the server 130 information of a store where the service terminal 120 is located, so that the server 130 may provide service information specific to each store to a user. Alternatively, when the service terminal 120 transmits user context information related to time to the server 130, the service terminal 120 may also transmit time information to the server 130. For example, when a chain of stores provides different discounted items according to entrance orders, the service terminal 120 may transmit, to the server 130, time information representing the time when the service terminal 120 has received user ID information.

The server 130 receives at least one of the user ID information, the user context information, and the first service information from the service terminal 120. The server 130 may generate service information. For example, the server 130 may generate service information using the user context information. Alternatively, the server 130 may generate service information using the first service information. For convenience of explanation, the service information generated by the server 130 will now be defined as second service information. However, this definition is only made for explanation, and thus the service information generated by the server 130 may be defined as another name. The server 130 may transmit the generated second service information to the user terminal 110.

The server 130 may determine the received first service information as the second service information. For example, when the received first service information includes a discount coupon for a product, the server 130 may determine the first service information as the second service information.

The server 130 may generate the second service information using at least one of the user context information and the first service information received from the service terminal 120.

For example, the server 130 may generate service information according to the user context information. For example, a memory of the server 130 may store mapping data of the user context information and the service information. The server 130 may determine what service information is to be provided to a user in response to user context information, using the mapping data. For example, when the user context information includes user interest information including a cleaner, the server 130 may provide a cleaner discount coupon as the second service information to the user terminal 110. Alternatively, when the user context information includes user state information representing that the user is going home from school, the server 130 may provide a bus time schedule as the second service information to the user terminal 110.

The server 130 may determine service information to be provided based on the user context information, in other ways. For example, the server 130 may generate different pieces of service information for the same user context information, according to locations where or time points when the user terminal 110 broadcasts the user context information. Alternatively, the server 130 may map the same user context information of the user terminal 110 with different pieces of service information, according to locations where or time points when the service terminal 120 has received the user context information of the user terminal 110. The server 130 may store information for performing the mapping.

Alternatively, the service information may be determined by searching for related information using the user context information. For example, when the user context information includes an advertisement, the server 130 may determine a result of searching for the advertisement on the Internet, as the service information. The server 130 may determine information about the price and distributor of a product related to the advertisement, as the service information. The server 130 may also determine content information such as a poster, music, and a movie related to the advertisement, as the service information. Alternatively, the server 130 may determine promotion information related to the advertisement, as service information.

The server 130 may determine service information by searching for related information from among social information of the user or by searching for information of another terminal. For example, the server 130 may determine service information by requesting a server 130 of a social service to which the user has subscribed to search for user context information and receiving a result of the search. Alternatively, the server 130 may search for information of another terminal to perform a missing child search service or a lost terminal search service. Alternatively, the server 130 may determine service information by searching for information corresponding to user context information from a notification message that another user has transmitted to a user corresponding to the user context information.

The server 130 may generate the second service information using information, such as a product or content that is included in the received first service information. For example, when the first service information includes a discount coupon for a smartphone, the server 130 may add a discount coupon for a smartphone case to the first service information to thereby generate second service information including the discount coupon for the smartphone and the discount coupon for the smartphone case. Alternatively, the server 130 may generate service information according to the above-described method in which the service terminal 120 generates service information.

The server 130 may transmit the generated second service information to the user terminal 110 using the received user ID information. The server 130 may determine the type of service information to be transmitted. For example, the server 130 may determine the type of service information according to the user terminal 110. The server 130 may determine the type of service information according to users. The type of service information is, for example, a data format for expressing the service information or a size of data for expressing the service information, but is not limited thereto.

The server 130 may determine the type of service information that is transmitted, according to details that are preset by the user. The server 130 may determine the type of service information to be automatically transmitted. The server 130 may determine the type of service information to be transmitted according to the types of user terminal 110. For example, when the user terminal 110, which is to receive service information, is a high-performance device, such as a smartphone or a tablet PC, the server 130 may determine a high-resolution image as the type of service information. However, when the user terminal 110, which is to receive service information, is a low-performance device, such as a smart watch, the server 130 may determine a low-resolution image as the type of service information. When service information has a large size, the server 130 may not transmit the service information to the user but may transmit to the user only a notification message representing that the service information has been generated. At this time, the service information may be stored in the server 130.

The user terminal 110 receives the second service information from the server 130. The server 130 may specify the user terminal 110 that is to receive service information, using the user ID information received from the service terminal 120, and may transmit the second service information the specified user terminal 110. Accordingly, the user terminal 110 may receive service information from the server 130.

The user terminal 110 may provide a service using the second service information. For example, the user terminal 110 may provide a service according to the second service information. The user terminal 110 may provide the received second service information to the user by displaying the received second service information. In the example illustrated in FIG. 1, the user terminal 110 may display a discount coupon 113 of a product on a display using the second service information received from the server 130. The user may receive a price discount when buying the product, by showing the discount coupon 113 displayed on the user terminal 110 to a product provider.

When data of the second service information to be received has a large size, the user terminal 110 may not receive all of the data but the server 130 may store some of the data of the service information. When a plurality of pieces of service information exist, the user terminal 110 may check service information from the cloud server 130 and change the service information. When a plurality of pieces of service information exist, the user terminal 110 may sequentially receive the plurality of pieces of service information from the server 130.

A network via which the user terminal 110 broadcasts the ID information and the user context information, and a network via which the user terminal 110 receives the second service information from the server 130 may be different. For example, the user terminal 110 may broadcast the user ID information and the user context information using a low-power short-distance communication technique such as Bluetooth or ZigBee. The user terminal 110 may receive the second service information from the server 130 via a network that periodically checks if a new message has arrived. For example, the user terminal 110 may receive the second service information from the server 130 using a mobile communication network.

In the service providing method according to an exemplary embodiment, the user terminal 110 may broadcast user context information, such as user interest information, to the service terminal 120, which is around the user terminal 110, at regular time intervals using a low-power short-distance communication technique, and may receive service information corresponding to the user context information via an existing mobile communication network. Because the user terminal 110 periodically checks whether a reception request comes from a mobile communication network, the user terminal 110 has only to additionally check whether data received from the mobile communication network is data related to the service information, to receive the service information. The user terminal 110 may save the energy that is consumed to receive the service information.

In addition, because the user terminal 110 simply broadcasts the user ID information and the user context information, the user terminal 110 may skip an operation of performing network connection with the service terminal 120. Thus, the user terminal 110 may save the time and power that are consumed to perform the network connection. Moreover, because the user terminal 110 does not perform network connection with the service terminal 120, no handover occurs between the user terminal 110 and the service terminal 120.

Figure 2:
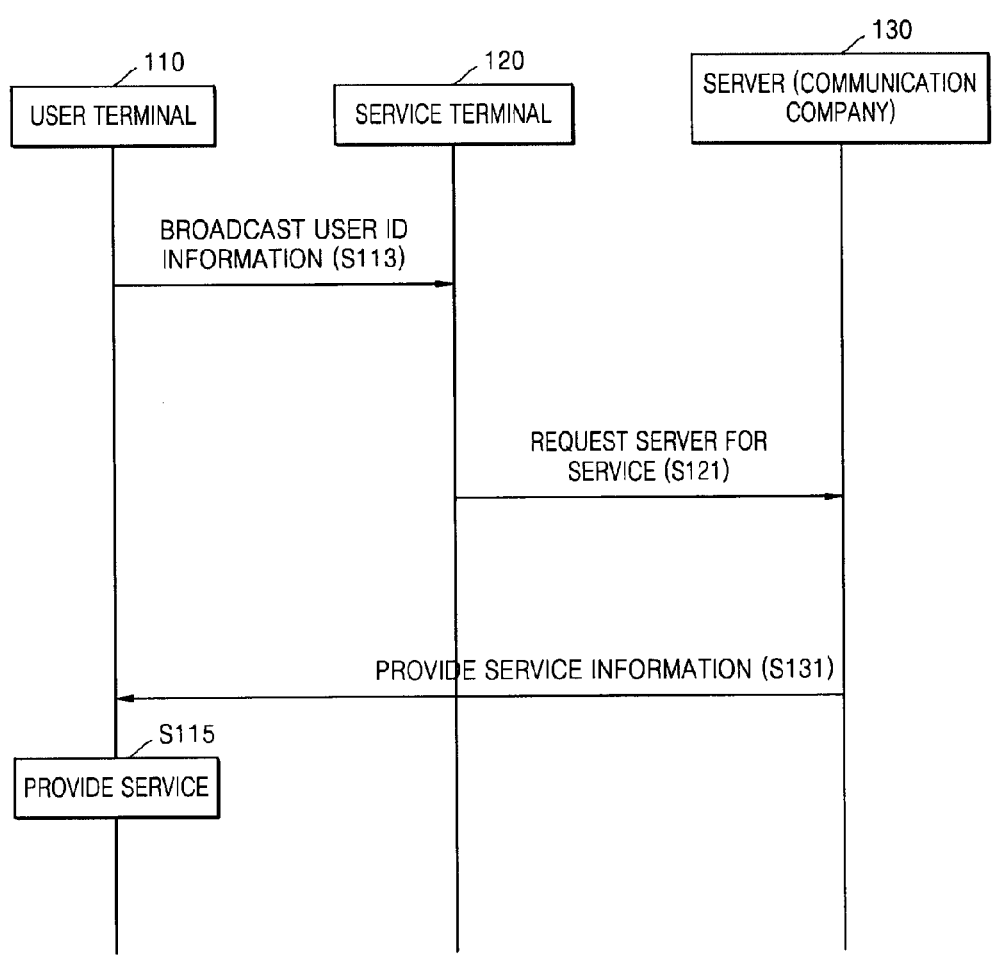
FIG. 2 is a flowchart illustrating a service providing method according to an exemplary embodiment.

FIG. 2 is a flowchart illustrating a service providing method according to an exemplary embodiment. The service providing method according to an exemplary embodiment will be described with reference to FIG. 2.

In operation S113, the user terminal 110 broadcasts user ID information to the service terminal 120. Broadcasting is a method in which a transmission device transmits data without specifying a reception device. The user terminal 110 may broadcast user ID information to an unspecified terminal around the user terminal 110. The user terminal 110 may further broadcast user context information in addition to the user ID information to the unspecified terminal around the user terminal 110. The user terminal 110 may broadcast the user ID information and the user context information at regular time intervals. A service terminal 120, which is located within a transmission distance of the user terminal 110, may receive the broadcasted user ID information and the broadcast user context information from the user terminal 110. For example, because the user terminal 110 broadcasts the user ID information and the user context information without specifying the service terminal 120 as a reception terminal, the user terminal 110 is unaware of which service terminal 120 is to acquire the user ID information. A service terminal that acquires the user ID information and the user context information from among at least one service terminal 120 may operate as the service terminal 120 according to an exemplary embodiment.

The service terminal 120 receives the user ID information. In operation S121, in response to the user ID information, the service terminal 120 requests the server 130 for a service. At this time, the service terminal 120 may transmit the ID information of a user who is to receive a service. When the service terminal 120 receives the user context information from the user terminal 110, the service terminal 120 may further transmit the received user context information to the server 130. The service terminal 120 may generate user context information and may further transmit the generated user context information to the server 130.

The service terminal 120 may generate service information and transmit the generated service information to the server 130. The service information may be previously generated. For example, because discount coupon information of a product may be previously generated as service information, when the service terminal 120 has received the user ID information from the user terminal 110, the service terminal 120 may transmit the user ID information of the user terminal 110 and the discount coupon information to the server 130.

When the service terminal 120 has received the user ID information and the user context information from the user terminal 110, the service terminal 120 may transmit first service information corresponding to the received user context information from among pieces of previously generated first service information to the server 130.

The pieces of service information may be classified according to user context information. To classify the pieces of service information according to user context information, the pieces of service information may be stored together with information about user context information that enables the pieces of service information to be provided, in a storage. FIG. 3A is a table showing a data structure in which service information is stored in a data storage such as a memory, according to an exemplary embodiment. In the exemplary embodiment illustrated in FIG. 3A, when user context information includes interest information about a cleaner, the service terminal 120 may generate a cleaner discount coupon as first service information.

Referring to FIG. 3A, the service information is stored together with user context information types and user context information in the storage. The storage may be a data storage, such as a memory, of a device that provides service information. A storage of the service terminal 120 may store the service information together with the user context information types and the user context information, as shown in FIG. 3A. Although service information, user context information types, and user context information are stored together in the exemplary embodiment illustrated in FIG. 3A, only the service information and the user context information except for the values of the user context information types may be stored in the storage.

The service information may be previously generated in the service terminal 120. Alternatively, the service terminal 120 may generate service information according to a preset method when the user ID information is received. For example, when the service terminal 120 receives the user ID information, the service terminal 120 may generate preset service information. The service terminal 120 may generate different pieces of service information according to time. When the service terminal 120 generates a discount coupon as the first service information, the service terminal 120 may generate the discount coupon such that a discount rate of a discount coupon generated in the morning is higher than a discount rate of a discount coupon generated in the afternoon.

The service terminal 120 may generate different pieces of service information according to user ID information. For example, the service terminal 120 may generate different pieces of first service information according to the values of the user ID information received from the user terminal 110.

As in a data structure shown in FIG. 3B, the service terminal 120 may store mapping information representing mapping between user ID information and user grade information in the storage. In the data structure of FIG. 3B, when user ID information is 11, a user grade of a user corresponding to the user ID information is excellent. Similarly, user grades of users corresponding to user ID information 12 and 13 are excellent, and a user grade of a user of which user ID information is 14 is new. The service terminal 120 may determine the grade of a client corresponding to the received user ID information, using the mapping information stored in the storage.

The service terminal 120 may set different pieces of service information according to the grades of users. For example, when a user grade according to user ID information is an excellent grade, the service terminal 120 may generate service information for preferred clients stored in the storage, as the service information.

The service terminal 120 may determine a client grade according to the frequency of reception of an ID number. For example, the service terminal 120 may store, as a new customer grade, a user grade of user ID information that is received less than a preset number of times, and store, as an excellent grade, a user grade of user ID information that is received the preset number of times or more, thereby generating mapping information representing mapping between the user ID information and user grades as shown in FIG. 3B.

The service terminal 120 may generate service information, based on user context information that is previously stored according to user ID information. For example, when user context information corresponding to the user ID information is previously stored, the service terminal 120 may generate service information based on the previously stored user context information. For example, when the user context information previously stored in the service terminal 120 represents that a user corresponding to user ID information is interested in a smartphone, the service terminal 120 may generate a discount coupon for the smartphone as the service information.

The server 130 receives a service request from the service terminal 120. Referring back to FIG. 2, in operation S131, the server 130, having received the service request, may provide the service information to the user terminal 110.

The server 130 may further receive at least one of user ID information, user context information, and service information from the service terminal 120. The server 130 may transmit the service information to a user terminal 110 indicated by the user ID information.

The server 130 may determine the user terminal 110 indicated by the user ID information, as the user terminal 110 that is to receive the service information. For example, when the user ID information is a terminal ID of the user terminal 110, the server 130 may transmit the service information to a user terminal 110 having the terminal ID. For example, the server 130 may store mapping information representing mapping between network IDs of user terminals 110 and terminal IDs. The server 130 may specify the user terminal 110 that is to receive service information, using a network ID corresponding to the terminal ID according to the mapping information.

Alternatively, when the user ID information includes a network ID of the user terminal 110, the server 130 may determine a user terminal 110 indicating the network ID, as the terminal that is to receive the service information. Alternatively, when the user ID information includes a user ID, the server 130 may determine a user terminal 110 indicated by the user ID, as the terminal that is to receive the service information.

Alternatively, when the user ID information includes information of a server 130 and a user ID, the server 130 may transmit the service information together with the user ID to the server 130. The server 130 having received the service information may transmit the service information to the user terminal 110.

The service information may be previously set. For example, in response to the service request, the server 130 may transmit preset service information to a terminal indicated by the user ID information.

As described above, the server 130 may generate service information using at least one of the user context information and the service information received from the service terminal 120.

The server 130 may determine service information to be provided, using the user context information received from the service terminal 120. Because the server 130 may generate the service information according to a method in which the service terminal 120 generates the service information, a detailed description thereof will be omitted herein.

The server 130 may determine the service information received from the service terminal 120, as the service information to be provided. For example, the server 130 may use first service information received from the service terminal 120, as second service information that is provided by the server 130.

The server 130 may generate the service information that is provided by the server 130, using the service information received from the service terminal 120. For example, the server 130 may generate the second service information that is provided by the server 130, using the first service information received from the service terminal 120. For example, the server 130 may generate the second service information by adding other service information to the first service information. When the first service information includes a discount coupon for a smartphone, the server 130 may add a discount coupon for a smartphone case to the first service information to thereby generate second service information including the discount coupon for the smartphone and the discount coupon for the smartphone case. As another example, the server 130 may generate other service information instead of the first service information, as the second service information. For example, when the first service information includes a discount coupon for a smartphone, the server 130 may generate second service information including a discount coupon having a higher discount rate than the discount coupon of the first service information.

The user terminal 110 receives the service information from the server 130. In operation S115, the user terminal 110 provides a service using the received service information. For example, when the service information includes image data, the user terminal 110 may display received image data.

For example, when the service information includes a discount coupon image, the user terminal 110 may display a received discount coupon image.

Figure 4:
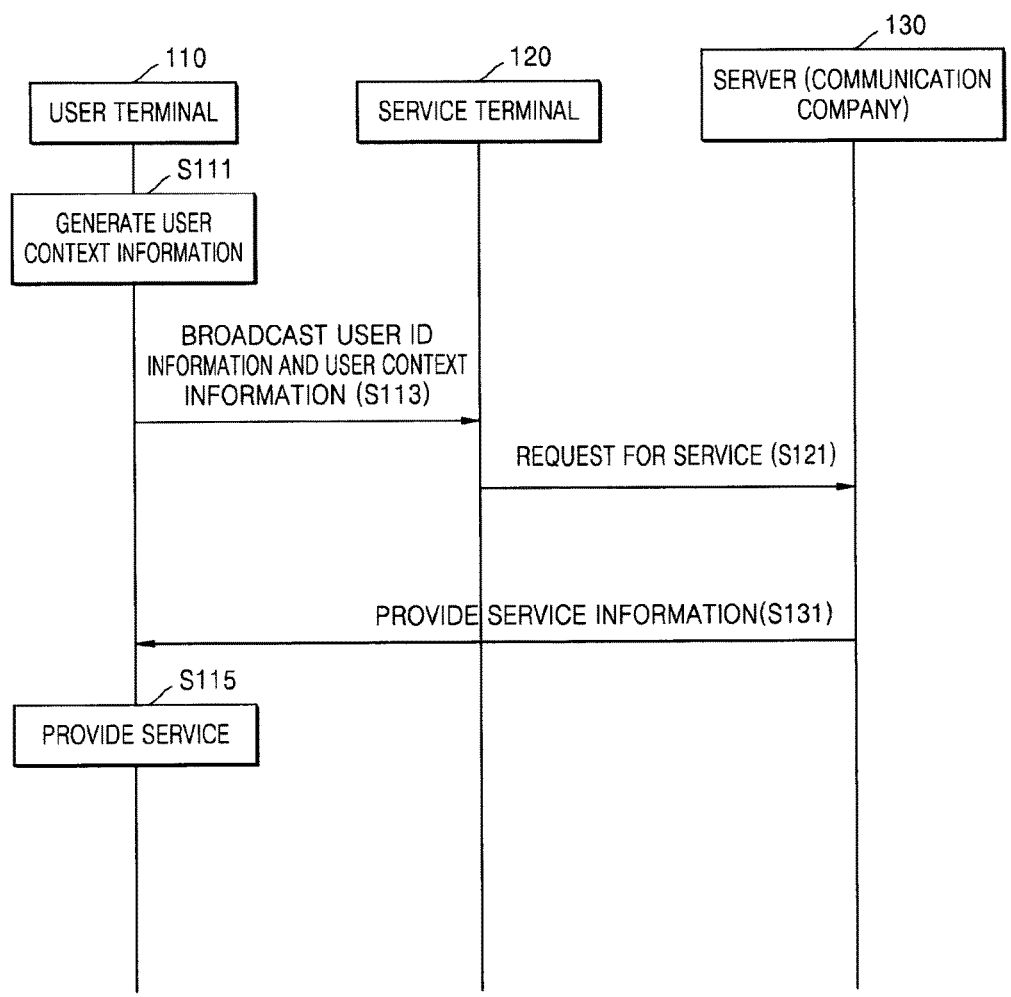
FIG. 4 is a flowchart illustrating a service providing method according to an exemplary embodiment.

FIG. 4 is a flowchart illustrating a service providing method according to an exemplary embodiment. The service providing method according to an exemplary embodiment may further include an operation of generating user context information. The service providing method of FIG. 4 further includes an operation S111 of generating user context information, in addition to the operations included in the service providing method of FIG. 2.

The operation S111 of generating the user context information will now be described. As described above, the user context information may be pre-stored in the user terminal 110. The user terminal 110 may generate the user context information by receiving the user context information directly from a user. For example, the user terminal 110 may receive interest information directly from the user.

The user terminal 110 may generate the user context information by analyzing sensing information generated by a sensor. For example, when a location of the user terminal 110 acquired by a GPS sensor is within a region set as a dangerous region, the user terminal 110 may determine that the user is currently located in a dangerous region, and generate user context information representing that the user is currently located in a dangerous region.

The user terminal 110 may acquire the user context information by receiving the same from an external apparatus. For example, the user terminal 110 may receive a warning indicating that a storm will arrive at a region where the user terminal 110 is located, from an external network, and thus generate user context information representing a storm warning.

Alternatively, the user terminal 110 may generate interest information of the user by analyzing, for example, a search history of the user and a message input by the user. For example, the user terminal 110 may generate a keyword selected from a result of a recent search by the user, as the interest information. As another example, when it is determined from home time information and message use amount information previously received from the user that a current time is the time when the user is able to go home from school and the amount of message used has increased, the user terminal 110 may determine user context information representing that the user is currently going home from school.

FIGS. 5A-5D are flowcharts service providing according to one or more exemplary embodiments. The above-described service providing methods may be modified as shown in FIGS. 5A-5D and then performed. Differences between the service providing method of FIGS. 5A-5D and the service providing methods of FIGS. 2 and 4 will now be described.

Figure 5A:
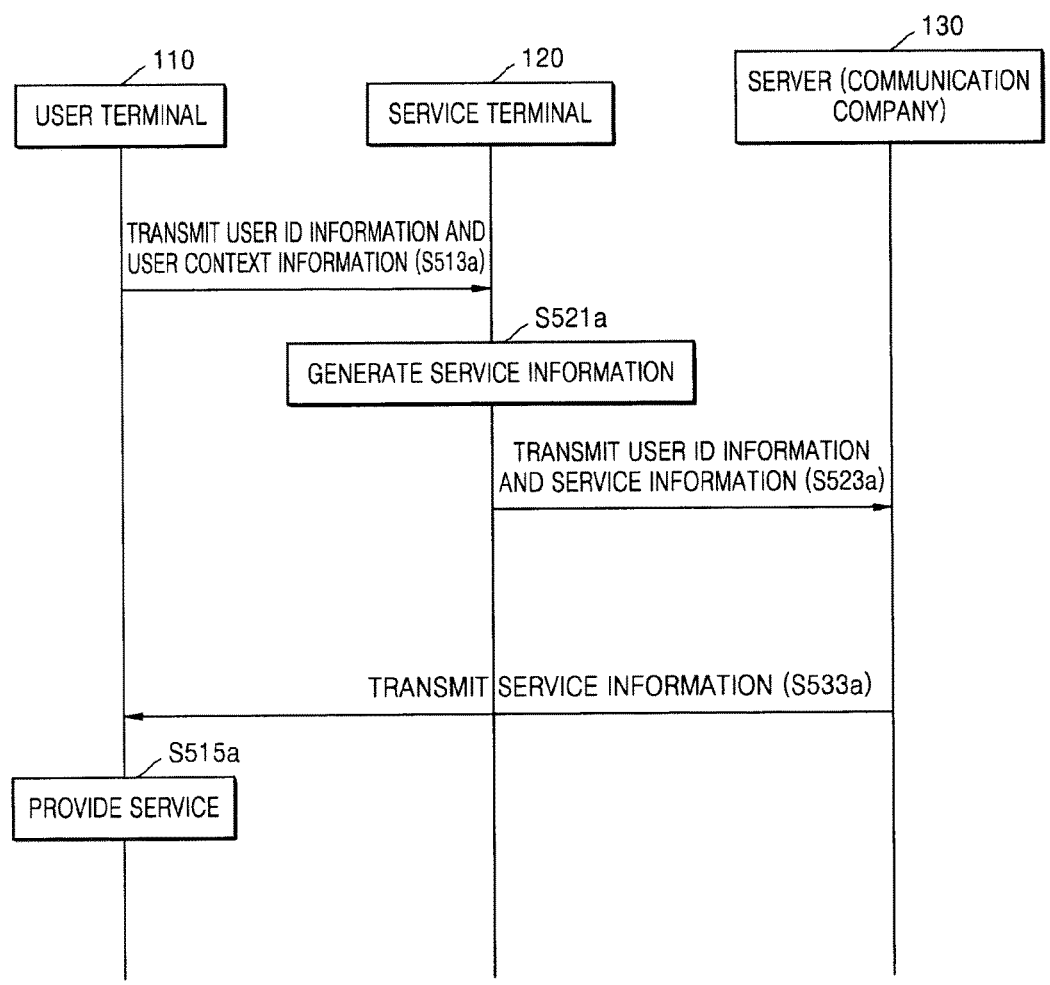
FIGS. 5A-5D are flowcharts illustrating service providing methods according to one or more exemplary embodiments.

FIG. 5A is a flowchart illustrating an exemplary embodiment in which the service terminal 120 generates service information according to user context information received from the user terminal 110.

First, the user terminal 110 transmits user ID information and the user context information to the service terminal 120, in operation S513a. For example, in the above-described way, the user terminal 110 may broadcast the user ID information and the user context information.

In operation S513a, the service terminal 120 receives the user ID information and the user context information. In operation S521a, the service terminal 120 having received the user ID information and the user context information generates service information using the above-described method. In operation S523a, the service terminal 120 transmits the user ID information and the service information to the server 130 as described above.

In operation S523a, the server 130 receives the service information and the user ID information from the service terminal 120. In operation S533a, the server 130 transmits the service information to the user terminal 110 indicated by the user ID information.

In operation S515a, the user terminal 110 receives the service information and provides a service according to the received service information.

Figure 5B:
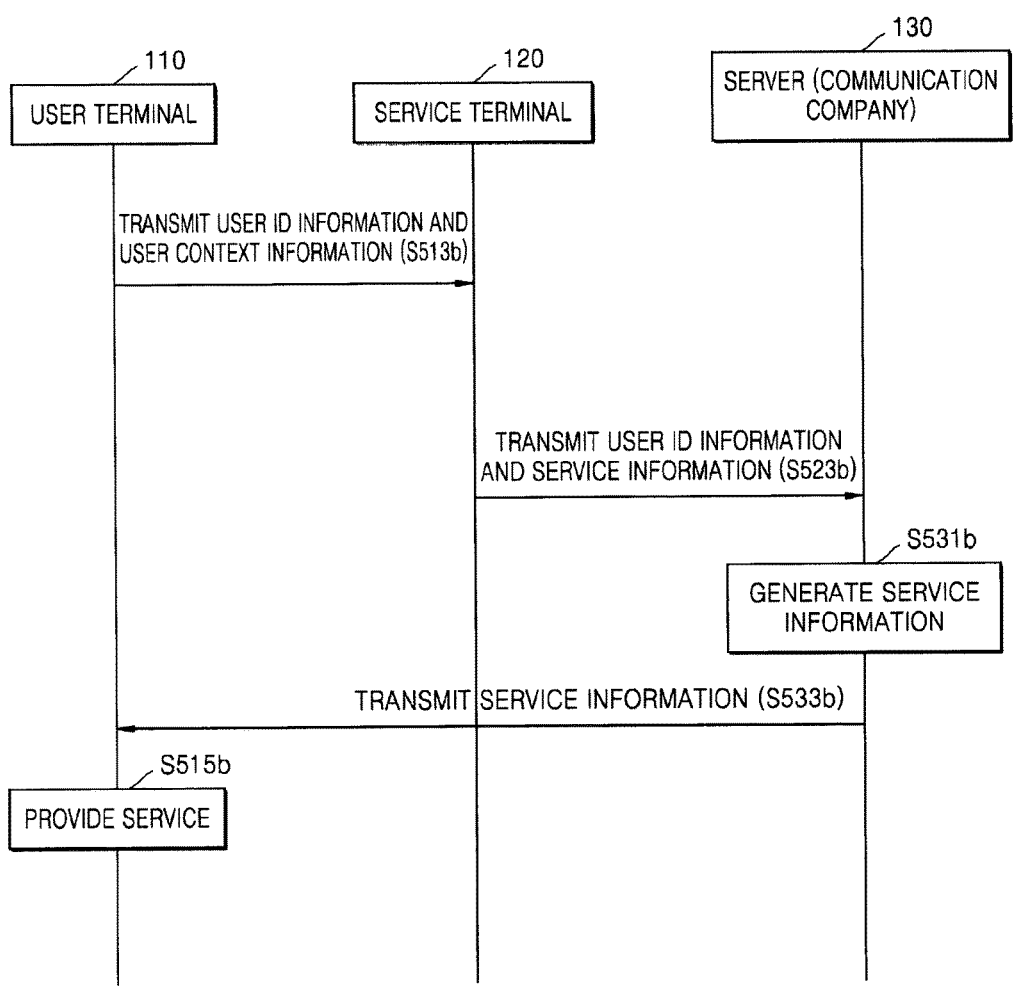

FIG. 5B is a flowchart illustrating an exemplary embodiment in which the service terminal 120 transmits user context information received from the user terminal 110 to the server 130 and the server 130 generates service information according to the user context information received from the service terminal 120.

First, the user terminal 110 transmits user ID information and user context information to the service terminal 120, in operation S513b. For example, the user terminal 110 may broadcast the user ID information and the user context information according to the above-described method.

In operation S513b, the service terminal 120 receives the user ID information and the user context information. In operation S523b, the service terminal 120 transmits the received user ID information and the received user context information to the server 130.

In operation S523b, the server 130 receives the user ID information and the user context information from the service terminal 120. In operation S531b, the service terminal 130 having received the user ID information and the user context information generates service information according to the above-described method. In operation S533b, the server 130 transmits the service information to the user terminal 110 indicated by the user ID information.

In operation S515b, the user terminal 110 receives the service information and provides a service according to the received service information.

Figure 5C:
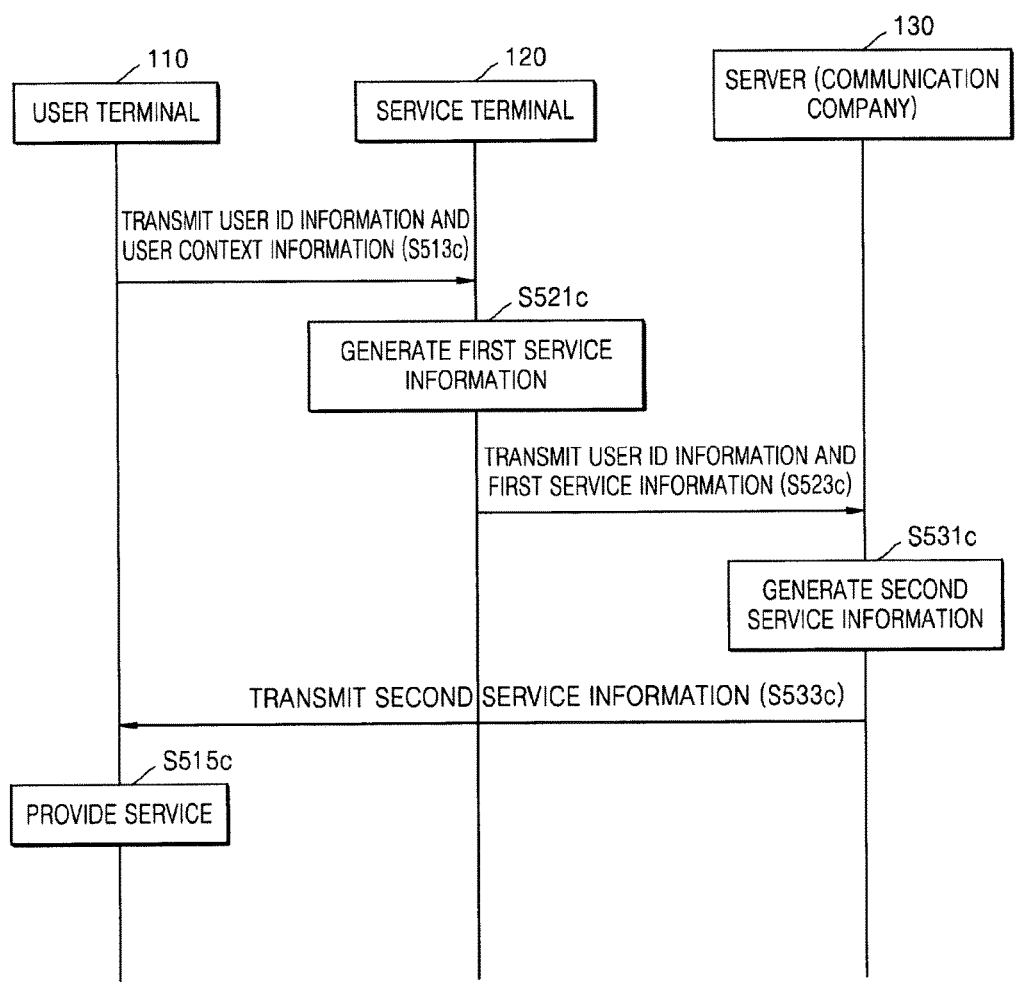

FIG. 5C is a flowchart illustrating an exemplary embodiment in which the service terminal 120 generates first service information according to user context information received from the user terminal 110 and transmits the first service information to the server 130, and the server 130 generates second service information according to the first service information received from the service terminal 120.

First, the user terminal 110 transmits user ID information and user context information to the service terminal 120, in operation S513c. For example, the user terminal 110 may broadcast the user ID information and the user context information according to the above-described method.

In operation S513c, the service terminal 120 receives the user ID information and the user context information. In operation S521c, the service terminal 120 having received the user ID information and the user context information generates the first service information according to the above-described method. In operation S523c, the service terminal 120 transmits the user ID information and the first service information to the server 130 as described above.

In operation S523c, the server 130 receives the user ID information and the first service information from the service terminal 120. In operation S531c, the service terminal 130 having received the user ID information and the first service information generates second service information according to the above-described method. In operation S533c, the server 130 transmits the second service information to the user terminal 110 indicated by the user ID information.

In operation S515c, the user terminal 110 receives the second service information and provides a service according to the received second service information.

Figure 5D:
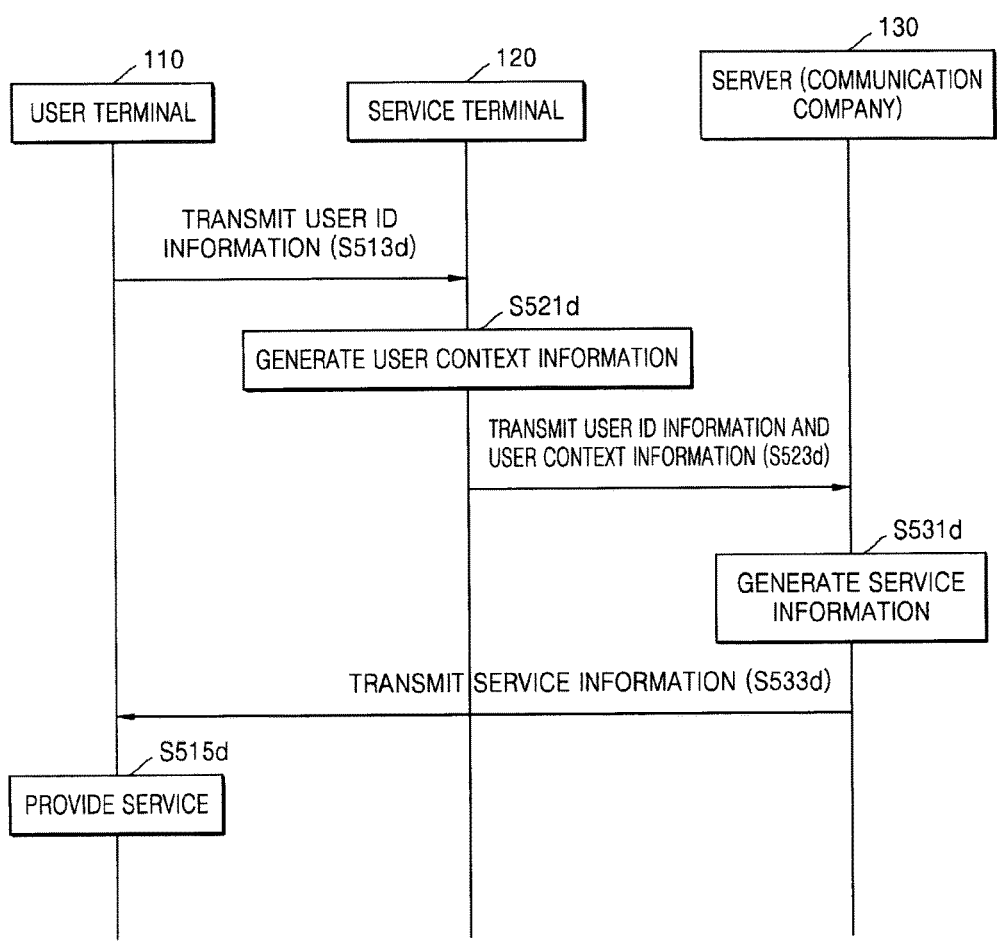

FIG. 5D is a flowchart illustrating an exemplary embodiment in which, when the service terminal 120 receives user ID information from the user terminal 110, the service terminal 120 generates user context information and transmits the generated user context information to the server 130, and the server 130 generates service information according to the user context information received from the service terminal 120.

In operation S513d, the user terminal 110 transmits user ID information to the service terminal 120. For example, the user terminal 110 may broadcast the user ID information in the above-described way.

In operation S513d, the service terminal 120 receives the user ID information. In operation S521d, in response to the user ID information, the service terminal 120 generates user context information according to the above-described method. In operation S523d, the service terminal 120 transmits the user ID information and the user context information to the server 130 as described above.

In operation S523d, the server 130 receives the user ID information and the user context information from the service terminal 120. In operation S531d, the service terminal 130 having received the user ID information and the user context information generates service information according to the above-described method. In operation S533d, the server 130 transmits the service information to the user terminal 110 indicated by the user ID information.

In operation S515d, the user terminal 110 receives the service information and provides a service according to the received service information.

Figure 6:
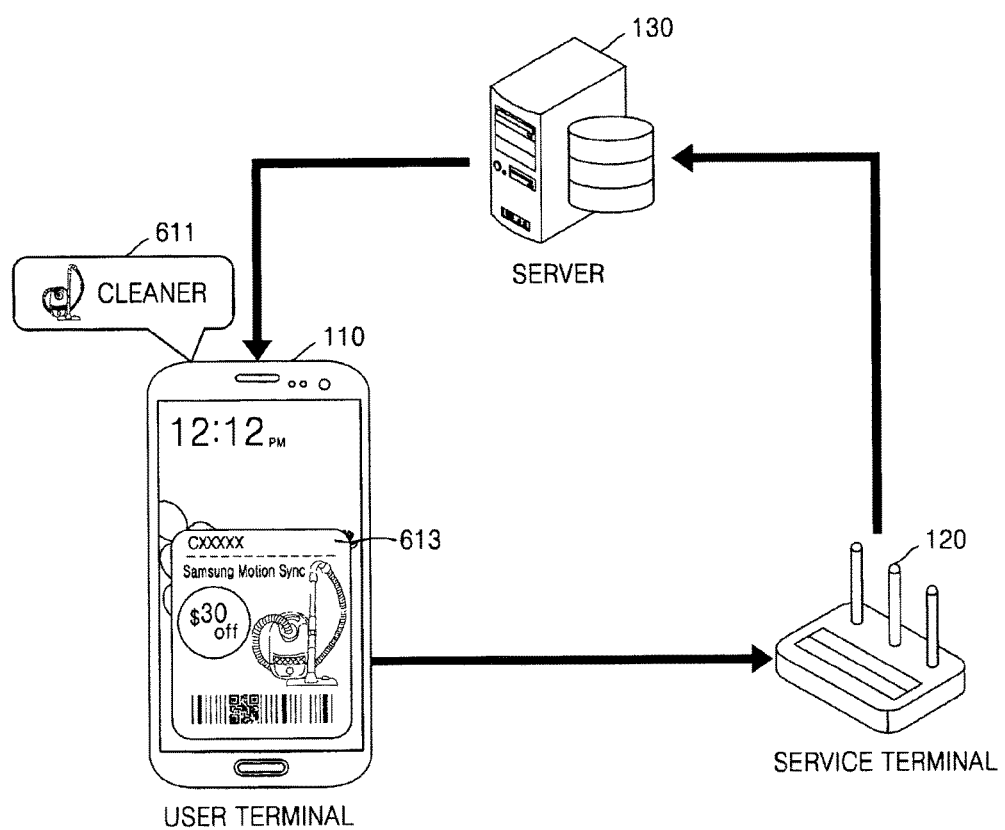
FIG. 6 is a conceptual view illustrating a discount coupon providing method according to an exemplary embodiment.
Figure 7A:
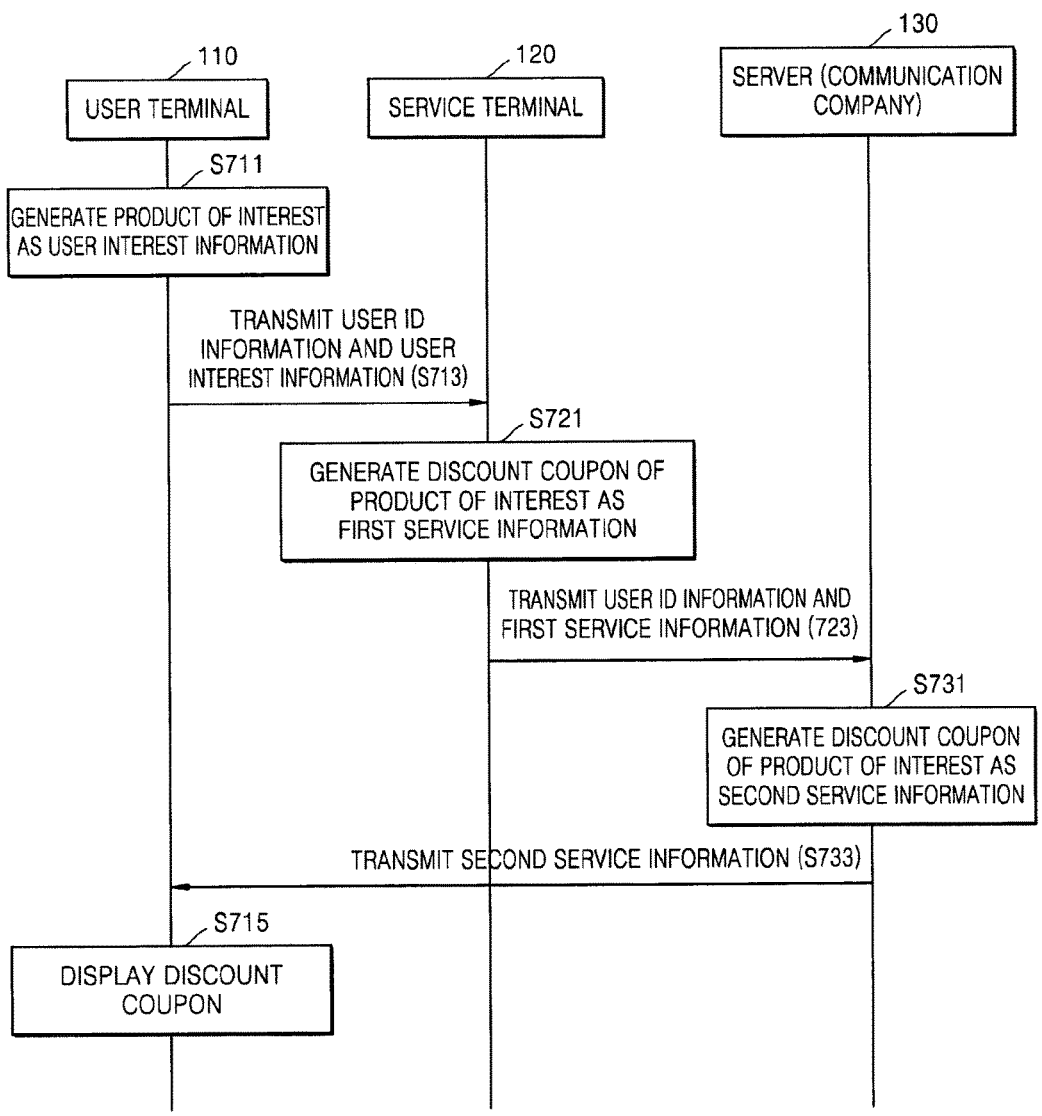
FIGS. 7A and 7B are flowcharts illustrating discount coupon providing methods, according to one or more exemplary embodiments.

FIG. 6 is a conceptual view illustrating a discount coupon providing method according to an exemplary embodiment. FIG. 7A is a flowchart illustrating a discount coupon providing method, which is an exemplary embodiment illustrated in FIG. 6. Referring to FIGS. 6 and 7A, an example in which a discount coupon for a product of interest is provided to a user will be described. As described above, user interest information is an example of user context information.

First, in operation S711, the user terminal 110 generates a product of interest as user interest information. For example, the user terminal 110 may receive the title of the product of interest from a user and generate interest information of the product of interest. For example, the user terminal 110 may receive a cleaner 611 from the user and generate the cleaner 611 as the interest information. Alternatively, the user terminal 110 may generate interest information, based on a history of the user using the user terminal 110, such as a search memo. For example, the user terminal 110 may generate interest information, based on a recent search history of the user.

In addition, the user terminal 110 may generate interest information, based on a product purchase history of the user. For example, the user terminal 110 may determine an interest brand of the user as the interest information, by referring to a payment history of the user. Alternatively, the user terminal 110 may receive a purchase history of the user from an external apparatus and generate interest information.

In operation S713, the user terminal 110 broadcasts user ID information and the user interest information. The user terminal 110 broadcasts the user ID information and the user interest information at regular intervals.

The service terminal 120 having received the broadcast user ID information and the broadcast user interest information generates first service information using the user interest information, as described above. The first service information may include service information such as an advertisement or a recommendation service. In the exemplary embodiments of FIGS. 6 and 7A, the service terminal 120 generates a discount coupon for a cleaner, which is a product of interest, as the first service information, in operation S721. For example, the service terminal 120 may generate a cleaner discount coupon corresponding to a cleaner, which is user interest information, as the first service information, using the mapping information of FIG. 3. In operation S723, the service terminal 120 transmits the first service information and the user ID information to the server 130.

In operation S731, the server 130 determines the discount coupon for the product of interest as second service information. As described above, the server 130 may determine the cleaner discount coupon included in the first service information, as the second service information. In operation S733, the server 130 transmits the second service information to the user terminal 110 indicated by the user ID information.

In operation S715, the user terminal 110 provides the cleaner discount coupon, which is the second service information received from the server 130, to the user. The user terminal 110 may display a cleaner discount coupon 613 received from the server 130, to the user.

Figure 7B:
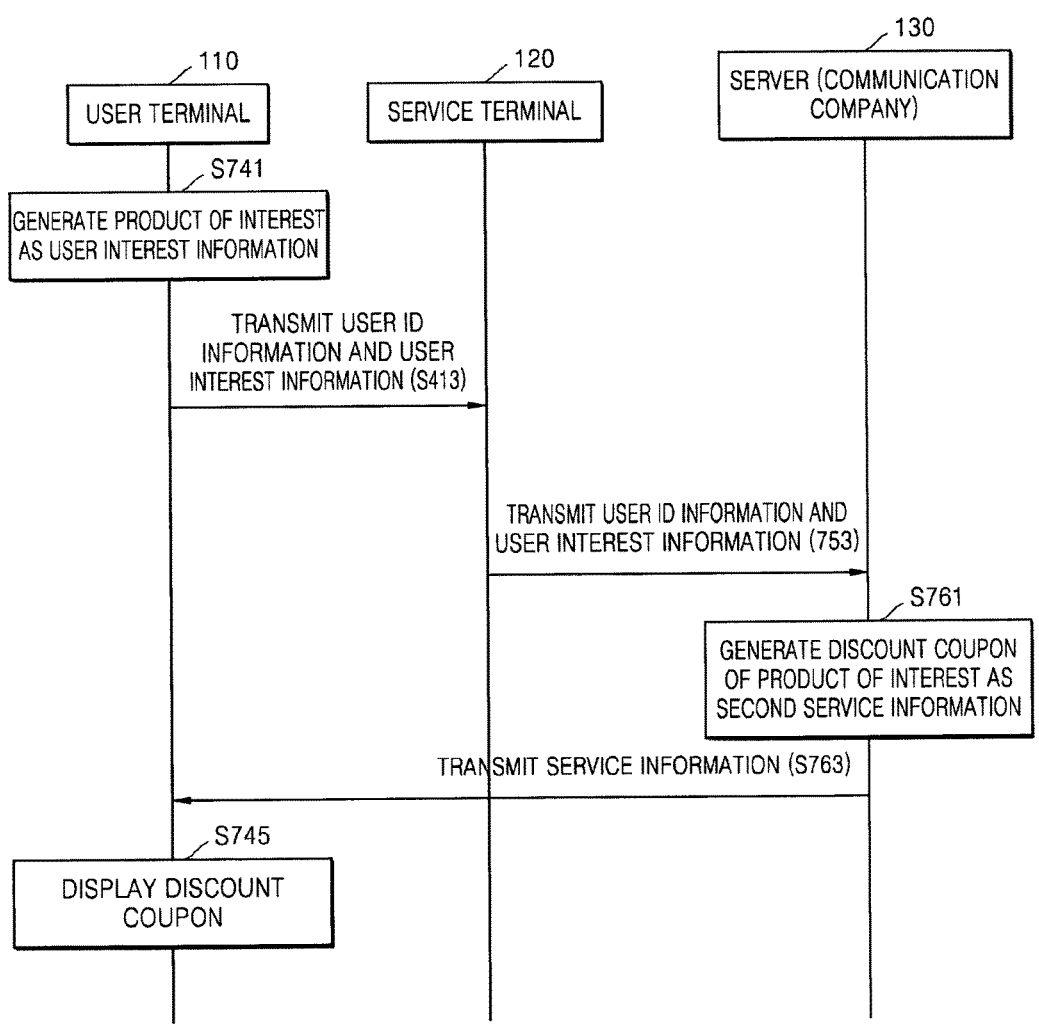

FIG. 7B is a flowchart illustrating a discount coupon providing method, which is another exemplary embodiment illustrated in FIG. 6. Referring to FIGS. 6 and 7B, an example in which a discount coupon for a product of interest is provided to a user will be described. In the service providing method according to an exemplary embodiment, as shown in FIG. 7B, the service terminal 120 may not generate the discount coupon as service information but the server 130 may generate the discount coupon.

First, in operation S741, the user terminal 110 generates a product of interest as user interest information, as shown in FIG. 7A. For example, as shown in FIG. 7A, the user terminal 110 may generate the title of the product of interest as user interest information. In operation S743, the user terminal 110 broadcasts user ID information and the user interest information. The user terminal 110 broadcasts the user ID information and the user interest information at regular intervals.

In operation S753, the service terminal 120 transmits the received user ID information and the received user interest information to the server 130. The service terminal 120 may include user ID information of the service terminal 120 or service-user ID information in the user ID information and transmit resultant user ID information to the server 130.

The server 130 generates service information using the received user interest information. The service information may include service information such as an advertisement or a recommendation service. In the exemplary embodiment illustrated in FIG. 7B, in operation S761, the server 130 generates a cleaner discount coupon corresponding to a cleaner, which is the product of interest, as the service information, as described above with respect to the service terminal 120. In operation S763, the server 130 transmits the service information to the user terminal 110 indicated by the user ID information.

In operation S745, the user terminal 110 provides the cleaner discount coupon, which is the service information received from the server 130, to the user. The user terminal 110 may display the cleaner discount coupon 613 received from the server 130, on a display to provide the cleaner discount coupon 613 to the user.

As described above, the service providing method according to an exemplary embodiment may be performed by acquiring interest information of a user in the daily life of the user for a user-tailored service and broadcasting the acquired interest information to a peripheral terminal. The peripheral terminal may provide an advertisement and promotion to a user, based on the received interest information.

In the service providing method according to an exemplary embodiment, a plurality of user terminals 110 are used. For example, a user may use both a smartphone and a smart watch. The smartphone and the smart watch may perform data communication via wireless communications. Because both the smartphone and the smart watch may transmit data to the service terminal 120 around the smartphone and the smart watch, both the smartphone and the smart watch may broadcast the user ID information and the user context information in the above-described way.

When a plurality of user terminals 110 exist, a user terminal 110 may perform only broadcasting of user ID information and user context information, and another user terminal 110 may perform only reception of service information from the server 130.

A plurality of exemplary embodiments in which a service providing method for a single user is performed using a plurality of user terminal 110 owned by the single user will now be described.

Figure 8:
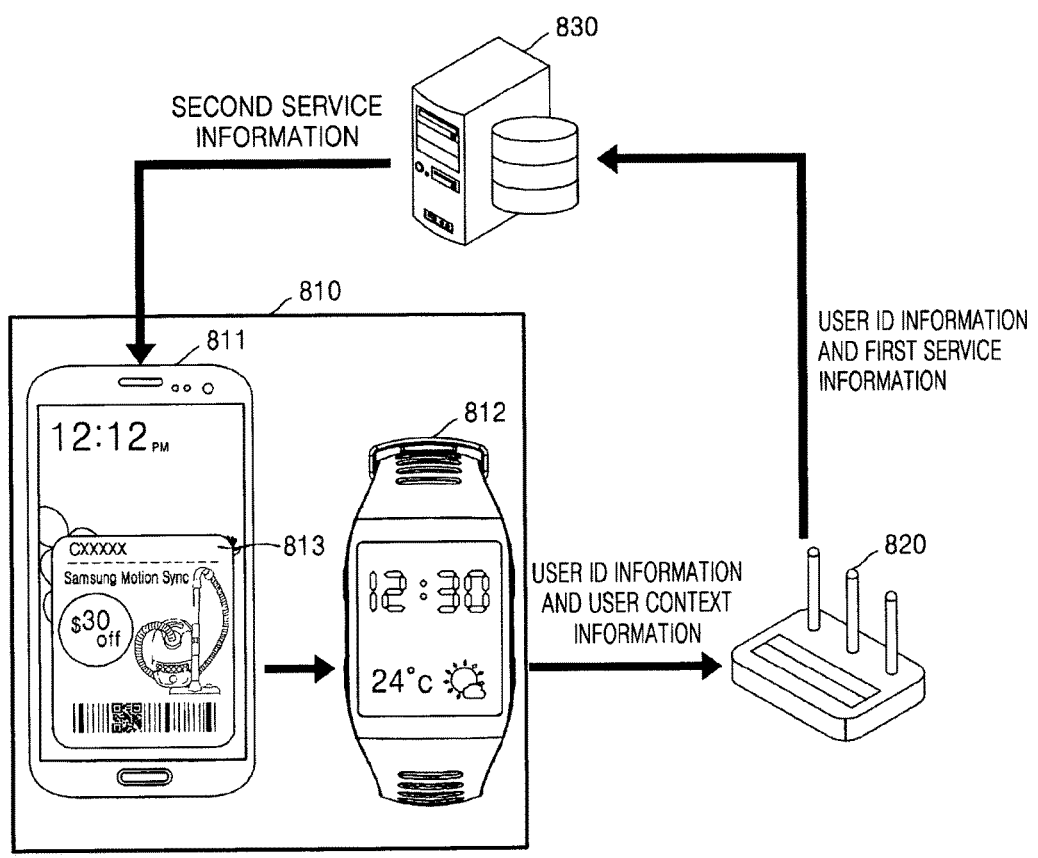
FIG. 8 is a conceptual view illustrating a service providing method performed using a plurality of user terminals, according to an exemplary embodiment.
Figure 9:
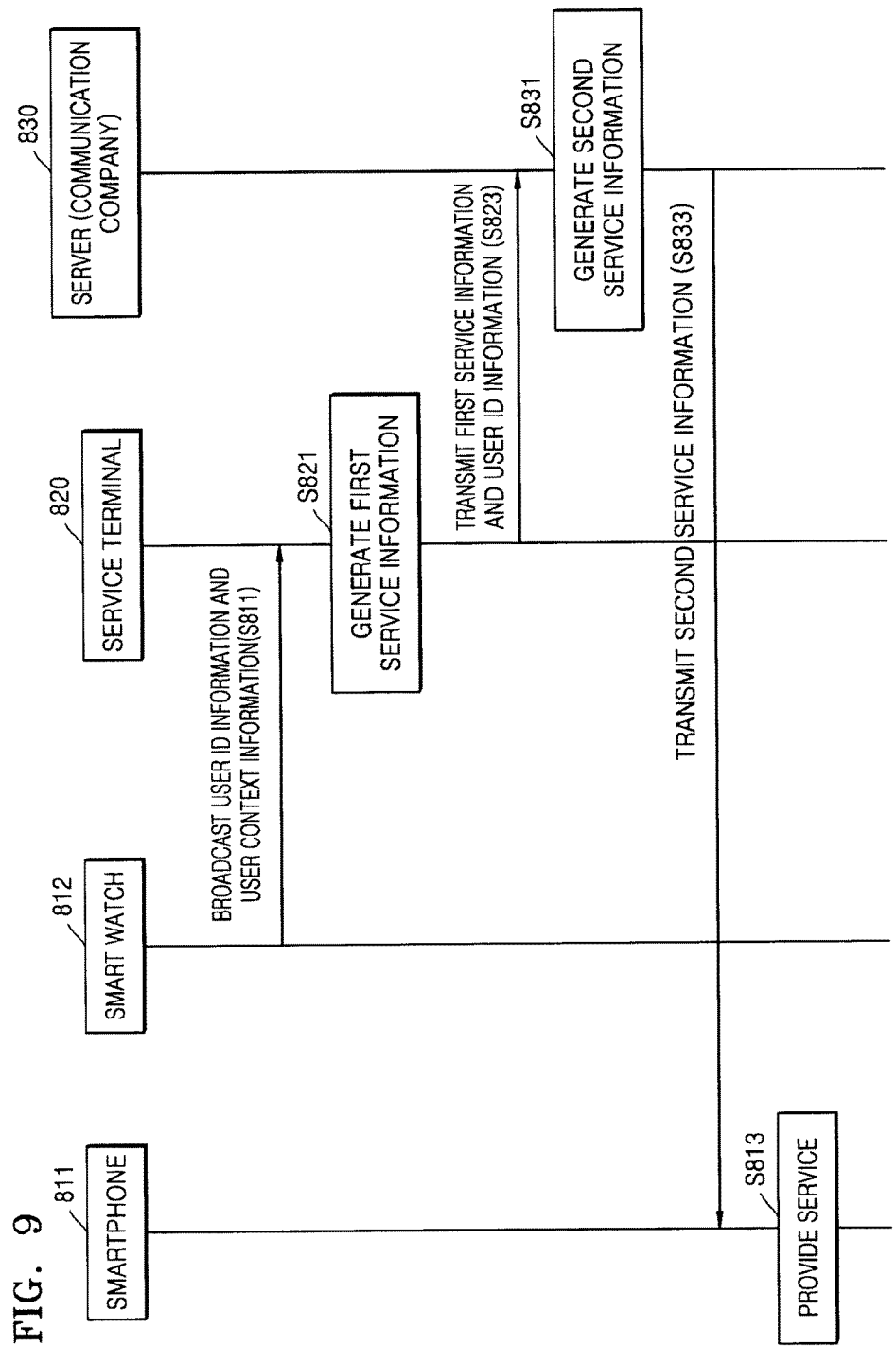
FIG. 9 is a flowchart illustrating a service providing method performed using a plurality of user terminals, according to an exemplary embodiment.

First, an exemplary embodiment in which broadcasting of user ID information and user context information and reception of service information are performed using separate user terminals 810 will be described with reference to FIGS. 8 and 9. FIG. 8 is a conceptual view illustrating a service providing method that is performed using a plurality of user terminals 810. FIG. 9 is a flowchart illustrating the service providing method that is performed using the plurality of user terminals 810.

In the exemplary embodiments of FIGS. 8 and 9, a smart watch 812 broadcasts user ID information and user context information, in operation S811. In operation S821, in response to the user ID information and the user context information, a service terminal 820 around the smart watch 812 generates first service information using the received user context information. In operation S823, the service terminal 820 transmits the first service information and the user ID information to a server 830. In operation S831, the server 830 having received the first service information generates second service information using the first service information. In operation S833, the server 830 transmits the second service information to a smartphone 811. The server 830 may transmit the second service information to the smartphone 811 via a mobile communication network.

The smartphone 811 receives the second service information from the server 830. In operation S813, the smartphone 811 provides a service to the user using the second service information. For example, the smartphone 811 may provide service information included in the second service information to the user by displaying the service information. As shown in FIG. 8, the smartphone 811 may provide discount information to the user by displaying a discount coupon 813 of a cleaner included in the second service information.

Although the smart watch 812 performs broadcasting in the exemplary embodiment illustrated in FIGS. 8 and 9, when the plurality of user terminals 810 exist, broadcasting may be performed by any terminal capable of performing wireless communication. When the plurality of user terminals 810 exist, all of the user terminals 810 may perform broadcasting. Alternatively, the plurality of user terminals 810 may take turns in a sequence to perform broadcasting.

Alternatively, only user terminals 810 corresponding to high priorities in the order of priority may perform broadcasting. For example, the order of priority may be determined based on a residual battery capacity. A user terminal 810 of which a current residual battery capacity is high may have a high priority and perform broadcasting. Alternatively, the order of priority may be determined based on whether the user uses the user terminals 810. A user terminal 810 that is the most actively used by the user may have a high priority. Alternatively, the order of priority may be determined based on processor occupancy ratios. A user terminal 810 having the lowest processor usage ratio from among the plurality of user terminals 810 may be determined to have a high priority to perform broadcasting. To reduce power consumption, a user terminal 810 in a standby mode may be excluded from candidates of user terminals 810 that perform broadcasting. The order of priority is not limited to the above-described criteria, and a plurality of other criteria may be considered to determine the order of priority.

One of the plurality of user terminals 810 may determine a terminal that performs broadcasting according to the order of priority, and transmit to the determined terminal a message instructing execution of broadcasting. For example, the smartphone 811 may determine a terminal that performs broadcasting according to the order of priority, and transmit to the determined terminal a message instructing broadcasting to be performed. When the terminal determined to perform broadcasting does not respond to the message or no data is broadcast by the terminal, the smartphone 811 may transmit the message instructing execution of broadcasting to a terminal having a next priority.

When a user uses a plurality of user devices, each user device may generate user context information of the user. The user devices may generate different pieces of user context information. For example, the smart watch 812 may check a heartbeat of the user and thus generate state information representing that the user is in an excited state, and, when the smartphone 811 determines from a search history of the user that the user frequently searches for shoes, the smartphone 811 may generate shoes as interest information. Each user terminal 810 may broadcast user context information generated by the user terminal 810 directly to the service terminal 820 around the user terminal 810. Alternatively, the user terminal 810 may gather the pieces of user context information respectively generated by the user terminals 810. The user terminal 810 may broadcast the gathered user context information using the same method as described above. For example, the smartphone 811 may receive the user context information generated by the smart watch 812 and broadcast the received user context information together with the user context information generated by the smartphone 811 to the service terminal 820 around the smartphone 811.

On the other hand, the user devices may generate the same user context information. When the pieces of user context information respectively generated by the user devices are identical, a user terminal from among user terminals having the same user context information may broadcast the pieces of user context information which are identical. Alternatively, each of the user terminals may broadcast the user context information.

Figure 10:
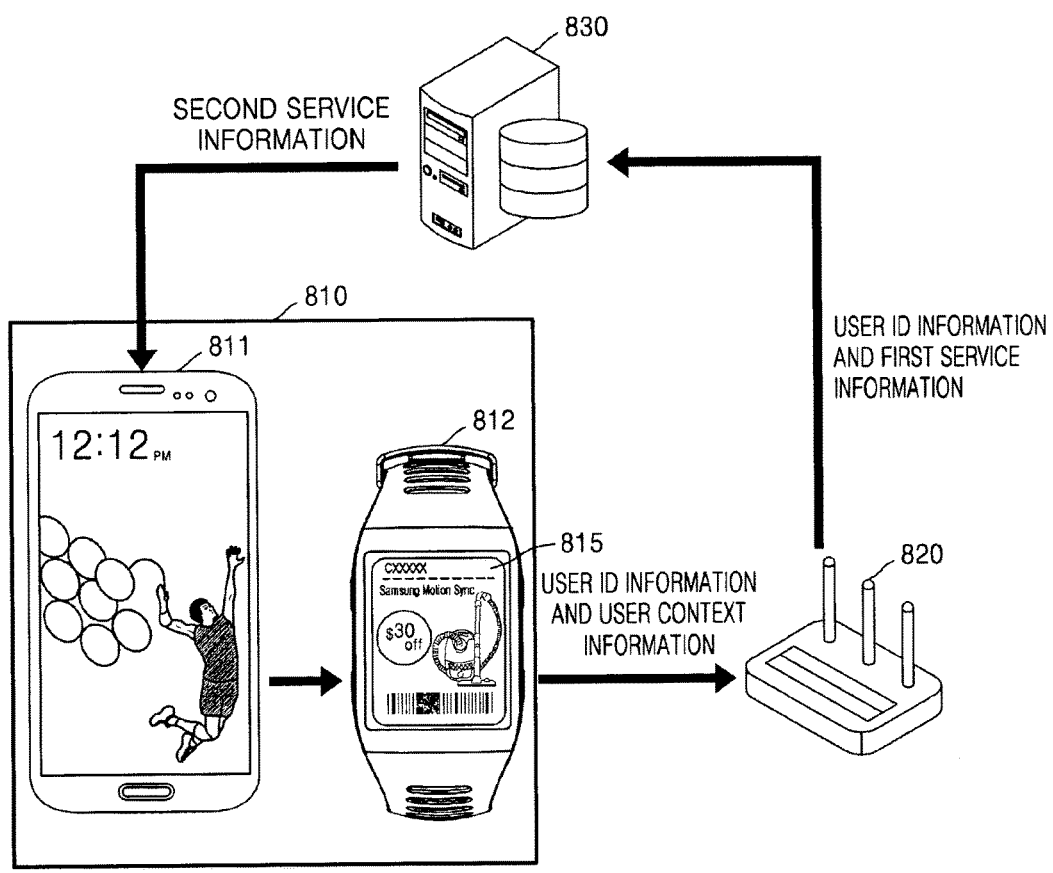
FIG. 10 is a conceptual view illustrating a smart watch providing a service, according to exemplary embodiment.

FIG. 10 is a conceptual view illustrating an exemplary embodiment in which the smart watch 812 provides a service in the exemplary embodiment illustrated in FIGS. 8 and 9. As shown in FIG. 10, in the service providing method according to an exemplary embodiment, a user terminal 810 having received second service information may transmit the received second service information to another user terminal 810. In response to the second service information, the other user terminal 810 may provide a service using the received second service information. For example, the smartphone 811 may transmit discount coupon information received from the server 830 to the smart watch 812. The smart watch 812 may display a discount coupon 815 using the discount coupon information received from the smartphone 811.

Figure 11:
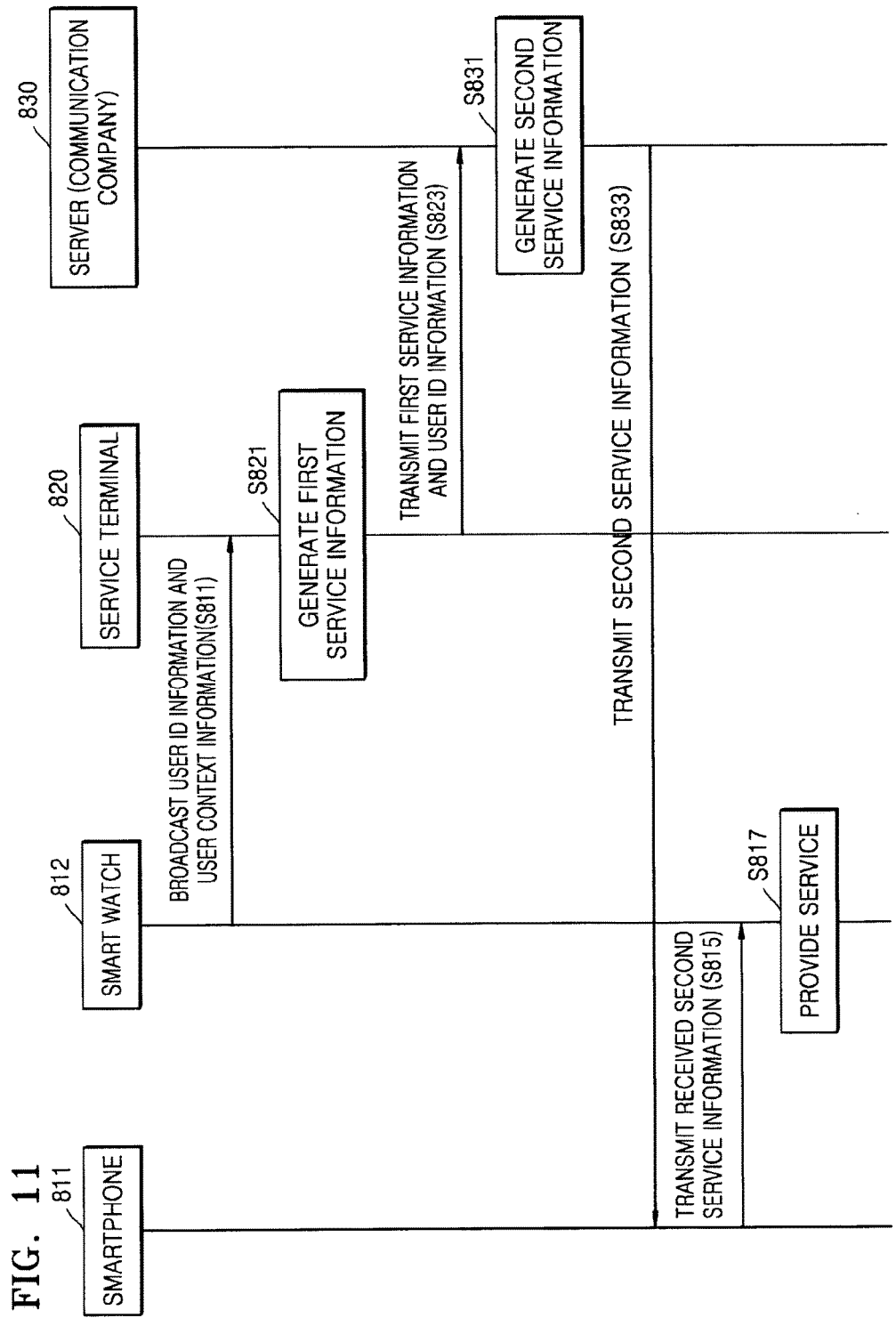
FIG. 11 is a flowchart illustrating a service providing method, according to an exemplary embodiment.

FIG. 11 is a flowchart illustrating the service providing method according to the exemplary embodiment described above with reference to FIG. 10. Only differences between the service providing methods of FIGS. 9 and 11 will be described herein. In contrast with the sequence in which the service providing method of FIG. 9 is performed, the smartphone 811 may transmit second service information to the smart watch 812, in operation S815. In operation S817, the smart watch 812 may provide a service to the user using the second service information received from the smartphone 811.

Figure 12:
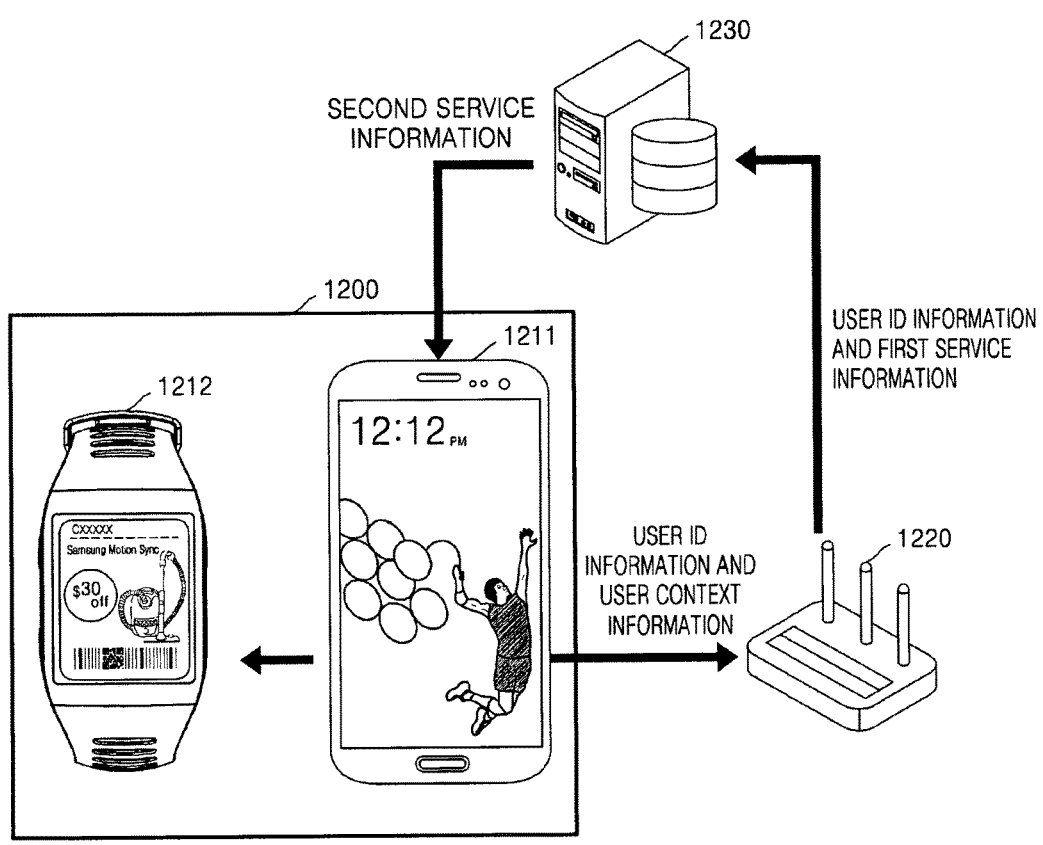
FIG. 12 is a conceptual view illustrating an exemplary embodiment in which a plurality of user terminals are used.

FIG. 12 is a conceptual view illustrating another exemplary embodiment in which a plurality of user terminals 1200 are used. In the exemplary embodiment illustrated in FIG. 12, a smartphone 1211 broadcasts user ID information and user context information, receives service information from a server 1230, and transmits the received service information to a smart watch 1212. The smart watch 1212 may provide a service using the service information received from the smartphone 1211. In the exemplary embodiment illustrated in FIG. 12, the smart watch 1212 displays a discount coupon using the received service information. As in the exemplary embodiment illustrated in FIG. 12, when a plurality of user terminals 1210 exist, a first user terminal 1210 may broadcast user ID information and user context information and transmit received service information to a second user terminal 1210. The second user terminal 1210 may provide a service to a user using the service information received from the first user terminal 1210.

Figure 13:
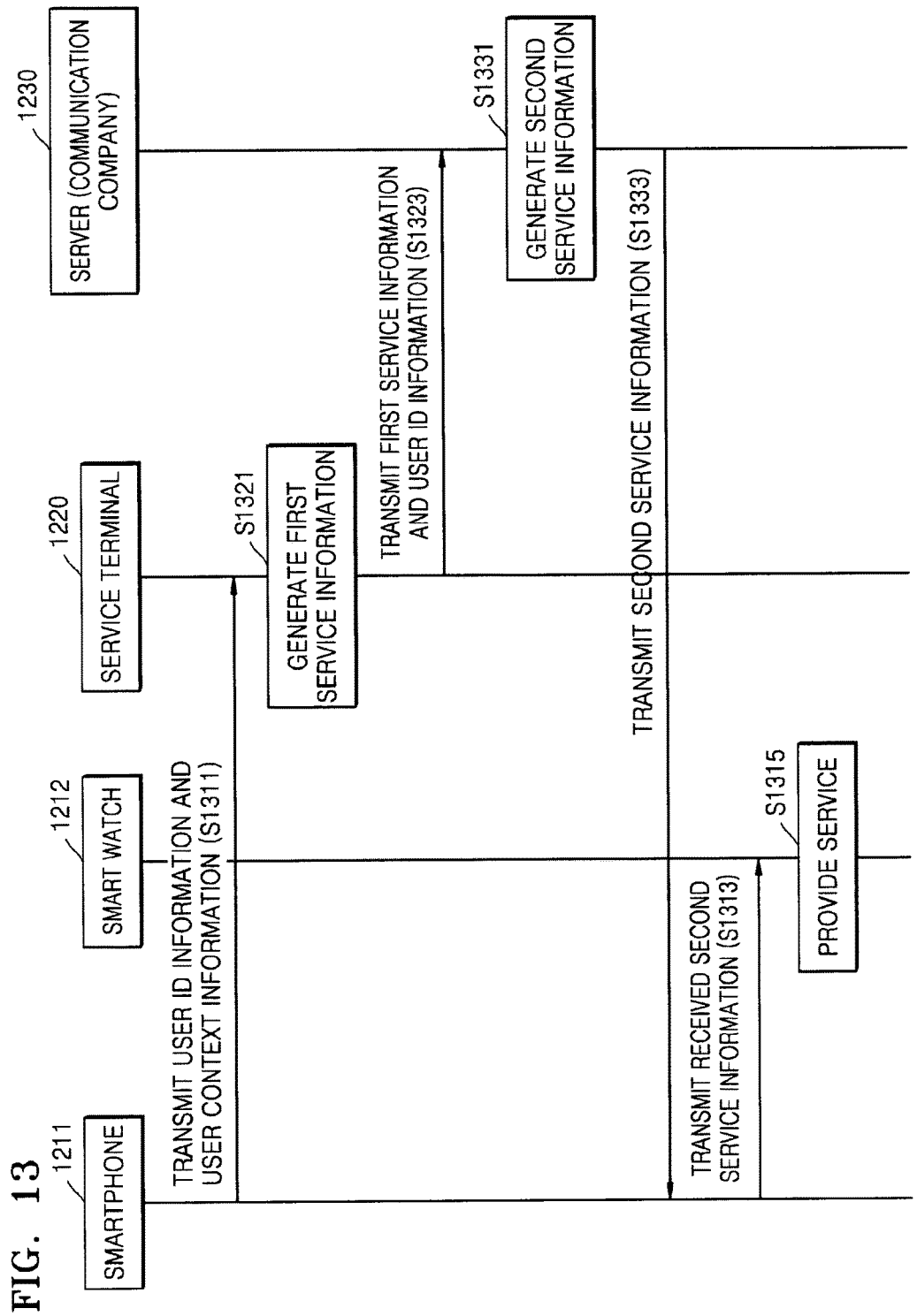
FIG. 13 is a flowchart illustrating a service providing method according to an exemplary embodiment.

FIG. 13 is a flowchart illustrating the service providing method of FIG. 12. First, the smartphone 1211 transmits user ID information and user context information to a service terminal 1220, in operation S1311. Next, in operation S1321, the service terminal 1220 generates first service information using the user ID information and the user context information. In operation S1323, the service terminal 1220 transmits the generated first service information and the user ID information to a server 1230. Then, in operation S1331, the server 1230 generates second service information using the received first service information. In operation S1333, the server 1230 transmits the second service information to the smartphone 1211. In operation S1313, the smartphone 1211 transmits the received second service information to the smart watch 1212. In operation S1315, the smart watch 1212 provides a service using the second service information received from the smartphone 1211.

Figure 14:
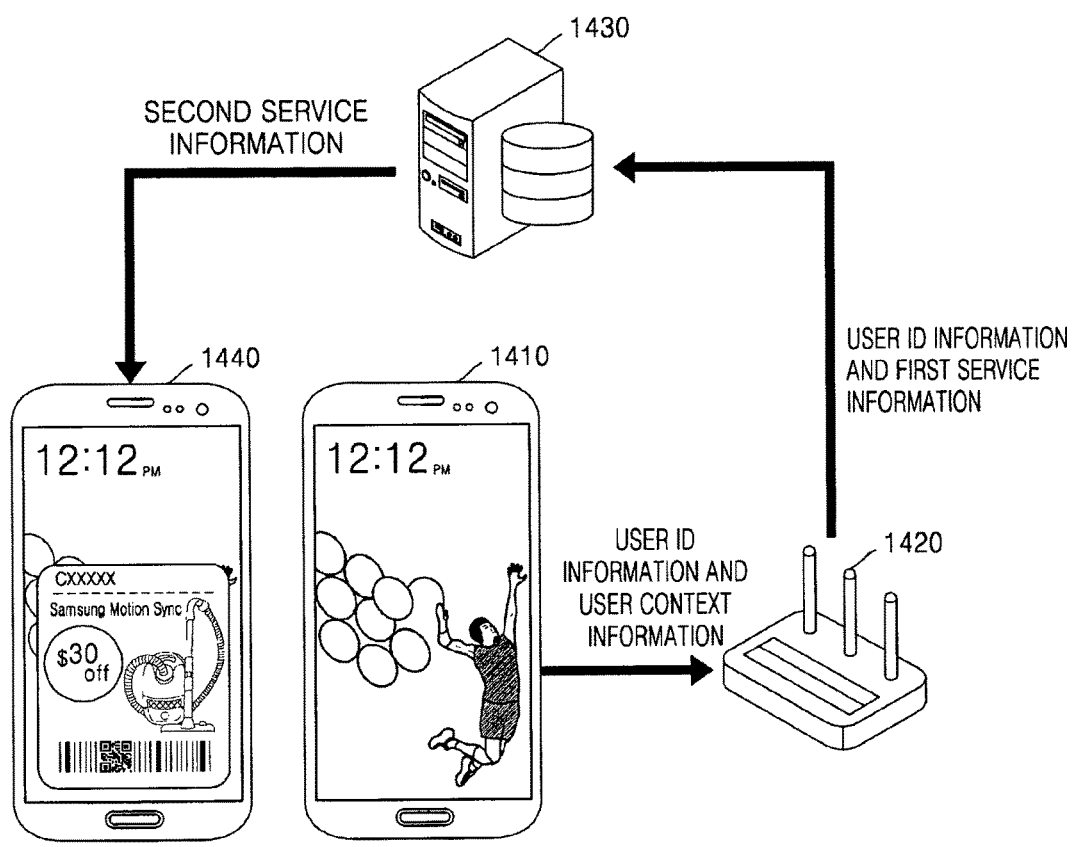
FIG. 14 is a conceptual view illustrating an exemplary embodiment in which a service providing method is performed by a plurality of users.

FIG. 14 is a conceptual view illustrating an exemplary embodiment in which a service providing method is performed by a plurality of users. The service providing method according to the exemplary embodiment illustrated in FIG. 14 is performed using a first user terminal 1410 and a second user terminal 1440. An exemplary embodiment in which the second user terminal 1440 receives service information generated according to user context information that is broadcast by the first user terminal 1410, and provides a service using the received service information will now be described with reference to FIG. 14.

In the exemplary embodiment illustrated in FIG. 14, the first user terminal 1410 and the second user terminal 1440 may be terminals that are used by different users. Although the first user terminal 1410 and the second user terminal 1440 are smartphones in FIG. 14, the first user terminal 1410 and the second user terminal 1440 may be smart watches. Alternatively, the first user terminal 1410 may include a smartphone and a smart watch, as in the exemplary embodiment illustrated in FIG. 8, and thus include a plurality of user terminals. Similarly, the second user terminal 1440 may include a plurality of user terminals.

Figure 15:
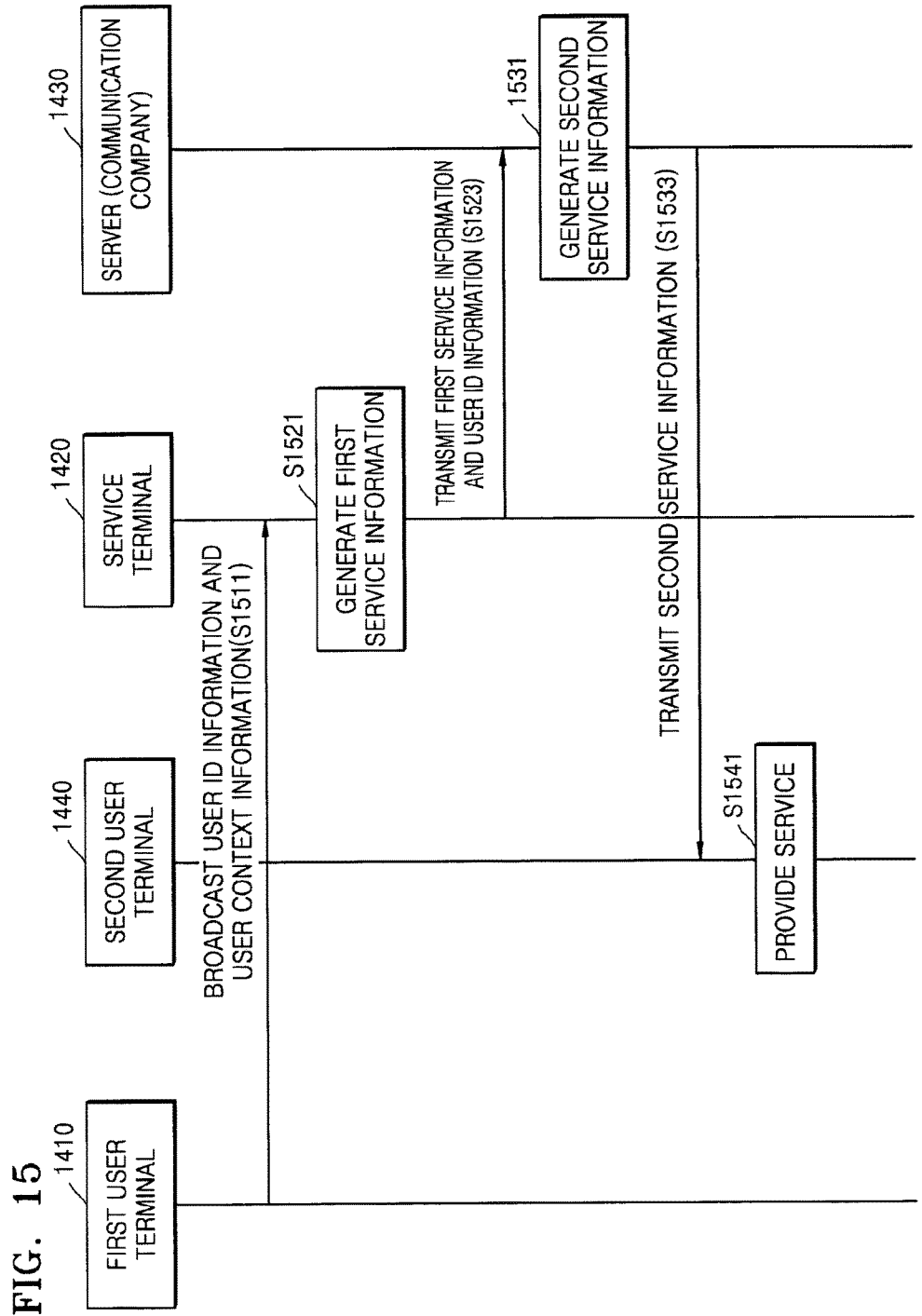
FIG. 15 is a flowchart illustrating a service providing method according to an exemplary embodiment.

FIG. 15 is a flowchart illustrating the service providing method according to the exemplary embodiment illustrated in FIG. 14. The service providing method of FIG. 14 will be described in more detail with reference to FIG. 15. First, in operation S1511, the first user terminal 1410 may broadcast user ID information and user context information. The user ID information indicates the second user terminal 1440 which is to receive service information that is generated by at least one of a service terminal 1420 and a server 1430 according to the user context information. For example, the user ID information may include device ID information of the second user terminal 1440, network ID information of the second user terminal 1440, or a user ID of a user who uses the second user terminal 1440.

In operation S1521, the service terminal 1420 may generate first service information using the user ID information and the user context information received from the first user terminal 1410. In operation S1523, the service terminal 1420 may transmit the generated first service information and the received user ID information to the server 1430. The server 1430 receives the user ID information and the first service information from the service terminal 1420. In operation S1531, the server 1430 may generate second service information using the first service information. In operation S1533, the server 1430 may transmit the second service information to the second user terminal 1440 indicated by the user ID information. In operation S1541, the second user terminal 1440 may provide a service using the second service information.

Figure 16:
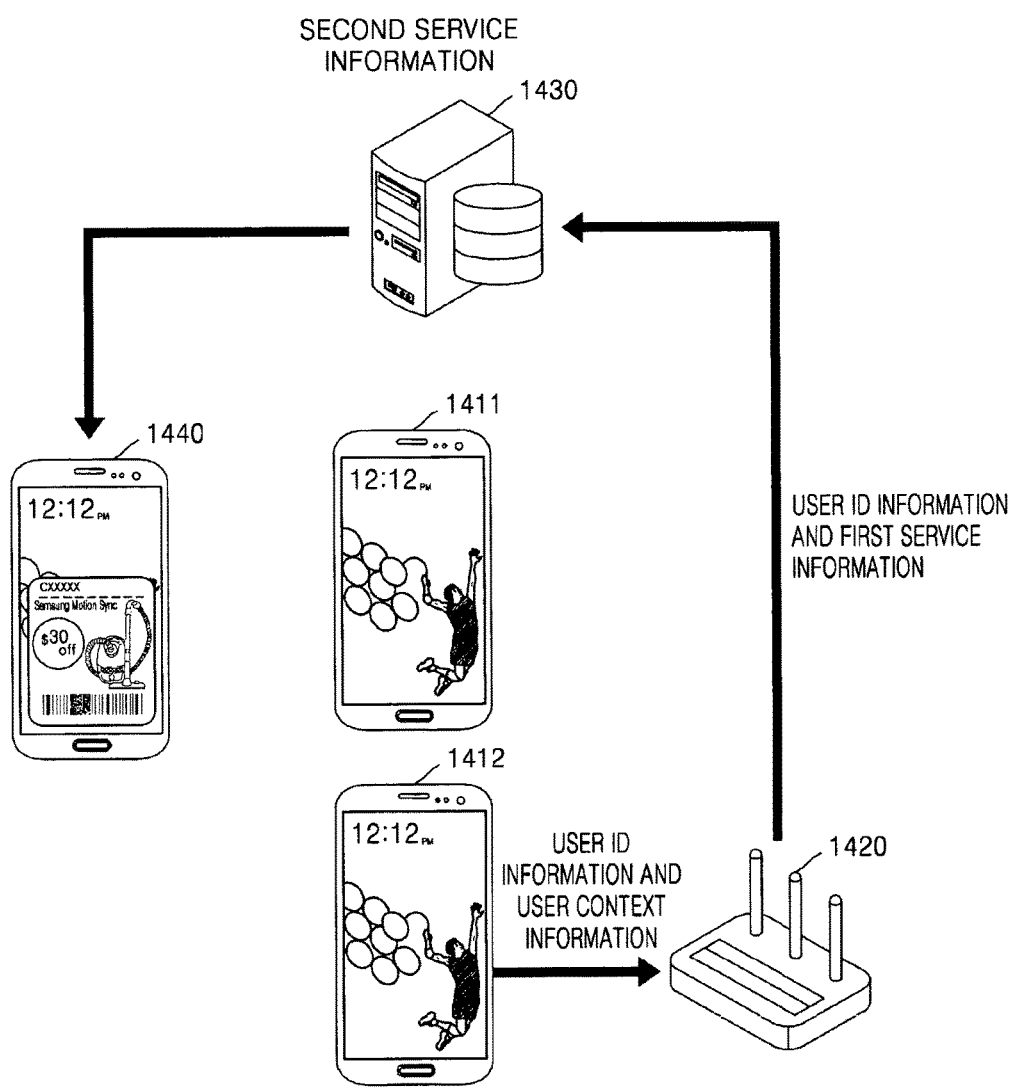
FIGS. 16 and 17 are conceptual views illustrating one or more exemplary embodiments in which a service providing method is performed by at least three users.
Figure 17:
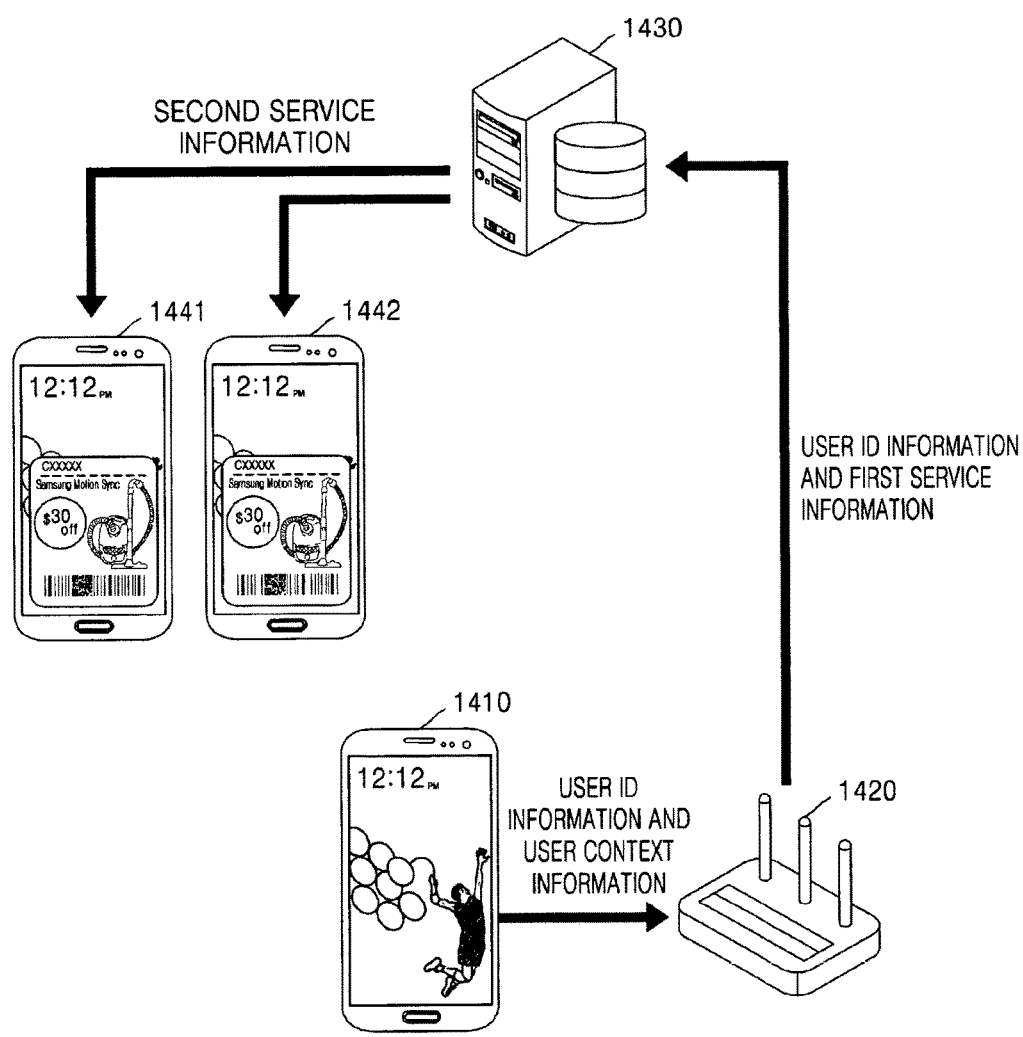

In a service providing method according to an exemplary embodiment, at least three users may participate. FIGS. 16 and 17 are conceptual views illustrating exemplary embodiments in which a service providing method is performed by at least three users.

As shown in FIG. 16, at least two user terminals, namely, first and second user terminals 1411 and 1412, may broadcast user ID information and user context information. For example, the first user terminal 1411 and the second user terminal 1412 may each broadcast user context information and user ID information while moving. For example, the first user terminal 1411 and the second user terminal 1412 may be smartphones of children, and a third user terminal 1440 may be a smartphone of a parent.

The user ID information that is broadcast by each of the first user terminal 1411 and the second user terminal 1412 may indicate the third user terminal 1440. The user context information may include user context information representing that a user is going home from school, or user context information representing that a user is in a dangerous situation. As a service terminal 1420 receives the user ID information and the user context information from at least one of the first user terminal 1411 and the second user terminal 1412, the service terminal 1420 may generate first service information according to the user context information and transmit the first service information to a server 1430.

The server 1430 may transmit second service information to the third user terminal 1440 according to the first service information. The third user terminal 1440 may receive the second service information and provide a service to the user using the second service information.

As shown in FIG. 17, at least two user terminals, namely, second and third user terminals 1441 and 1442, may receive service information. For example, the second user terminal 1441 and the third user terminal 1442 may each receive service information from a mobile communication network, while moving. For example, a first user terminal 1410 may be a smartphone of a child, and the second user terminal 1441 and the third user terminal 1442 may be smartphones of a parent.

User ID information that is broadcast by the first user terminal 1410 may indicate the second user terminal 1441 and the third user terminal 1442. User context information may include user context information representing that a user is going home from school, or user context information representing that a user is in a dangerous situation. As a service terminal 1420 receives the user ID information and the user context information from the first user terminal 1410, the service terminal 1420 may generate first service information according to the user context information and transmit the first service information to a server 1430.

The server 1430 may transmit the second service information to the second and third user terminals 1441 and 1442 according to the first service information. The second and third user terminals 1441 and 1443 may receive the second service information and provide a service to users using the received second service information.

When exemplary embodiments consistent with FIGS. 16 and 17 are combined with each other, service information may be transmitted to at least two user terminals using ID information and user context information that are broadcast by the at least two user terminals.

Figure 18:
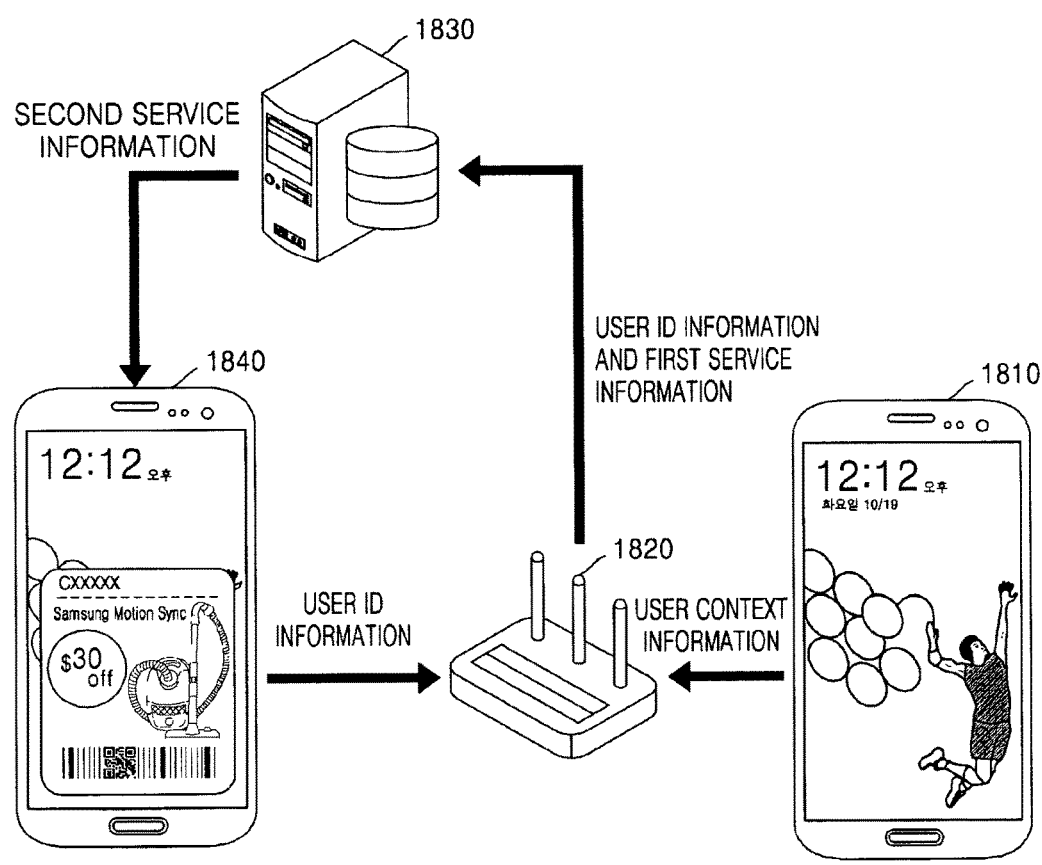
FIG. 18 is a conceptual view illustrating a service providing method according to an exemplary embodiment.

FIG. 18 is a conceptual view illustrating a service providing method according to another exemplary embodiment. Referring to FIG. 18, the service providing method according to another exemplary embodiment will be described. A first user terminal 1810 may move while broadcasting user context information. A second user terminal 1840 may move while broadcasting user ID information. When a service terminal 1820 receives the user ID information of the second user terminal 1840 while the second user terminal 1840 is moving while broadcasting the user ID information of the second user terminal 1840, the service terminal 1820 may generate service information and transmit the generated service information to the second user terminal 1840 via a server 1830. The service terminal 1820 may provide the second user terminal 1840 with service information generated using the user context information received from the first user terminal 1810.

Figure 19:
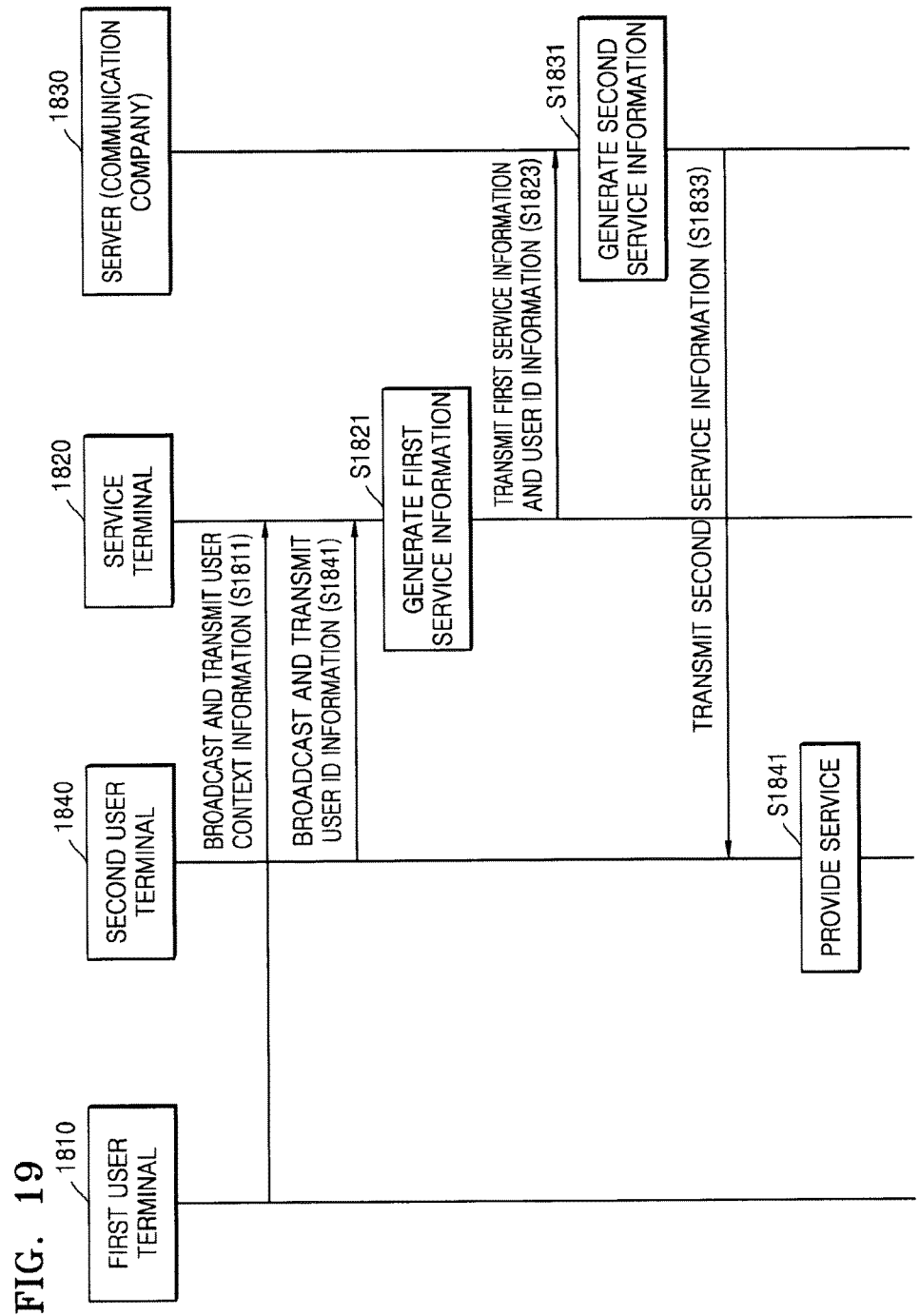
FIG. 19 is a flowchart illustrating a service providing method according to an exemplary embodiment illustrated.

FIG. 19 is a flowchart illustrating the service providing method according to the exemplary embodiment illustrated in FIG. 18. First, in operation S1811, the first user terminal 1810 broadcasts the user context information and transmits the user context information to the service terminal 1820. In operation S1841, the second user terminal 1840 broadcasts the user ID information and transmits the user ID information to the service terminal 1820. In operation S1821, the service terminal 1820 generates first service information using the user context information received from the first user terminal 1810. In operation S1823, the service terminal 1820 transmits the user ID information received from the second user terminal 1840 and the generated first service information to the server 1830. Then, in operation S1831, the server 1830 generates second service information using the first service information received from the service terminal 1820. In operation S1833, the server 1830 transmits the second service information to the second user terminal 1840, which is indicated by the user ID information received from the service terminal 1820. Then, in operation S1843, the second user terminal 1840 provides a service using the second service information received from the service terminal 1820.

Figure 20:
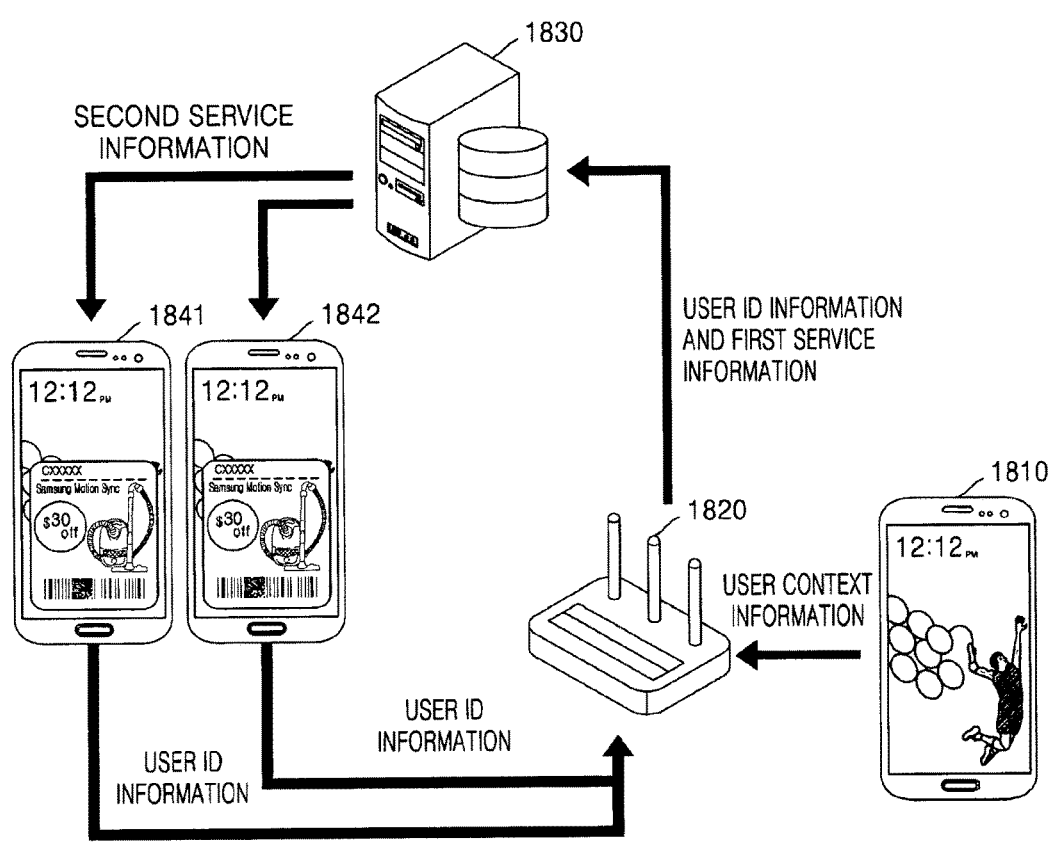
FIG. 20 is a conceptual view illustrating an example in which a plurality of second user terminals exist according to an exemplary embodiment.

In the exemplary embodiment illustrating in FIG. 18, a plurality of second user terminals 1840 may exist. For example, as shown in FIG. 20, a plurality of second user terminals 1841 and 1842 may exist. Also, a second user terminal 1841 and a third user terminal 1842 may exist. A plurality of users may receive service information generated by the service terminal 1820 according to user context information set by a user having the first user terminal 1810, via the server 1830 using respective user terminals of the plurality of users. For example, the second user terminal 1841 and the third user terminal 1842 may transmit respective user ID information thereof to the service terminal 1820. The service terminal 1820 may generate service information according to the user context information received from the first user terminal 1810, and transmit the received user ID information together with the service information to the server 1830. The server 1830 may generate the second service information using the first service information and transmit the second service information to the second and third user terminals 1841 and 1842, which are indicated by the user ID information received from the service terminal 1820.

Although a case in which a plurality of user terminals broadcast user ID information and receive service information is illustrated in FIG. 20, a case in which a plurality of user terminals broadcast user context information may be considered. When a plurality of terminals broadcast user context information, a service terminal may receive a plurality of pieces of user context information. When the service terminal receives the plurality of pieces of user context information, the service terminal may generate a plurality of pieces of first service information according to the plurality of pieces of user context information. The service terminal may transmit generated service information together with received ID information to a server.

Figure 21:
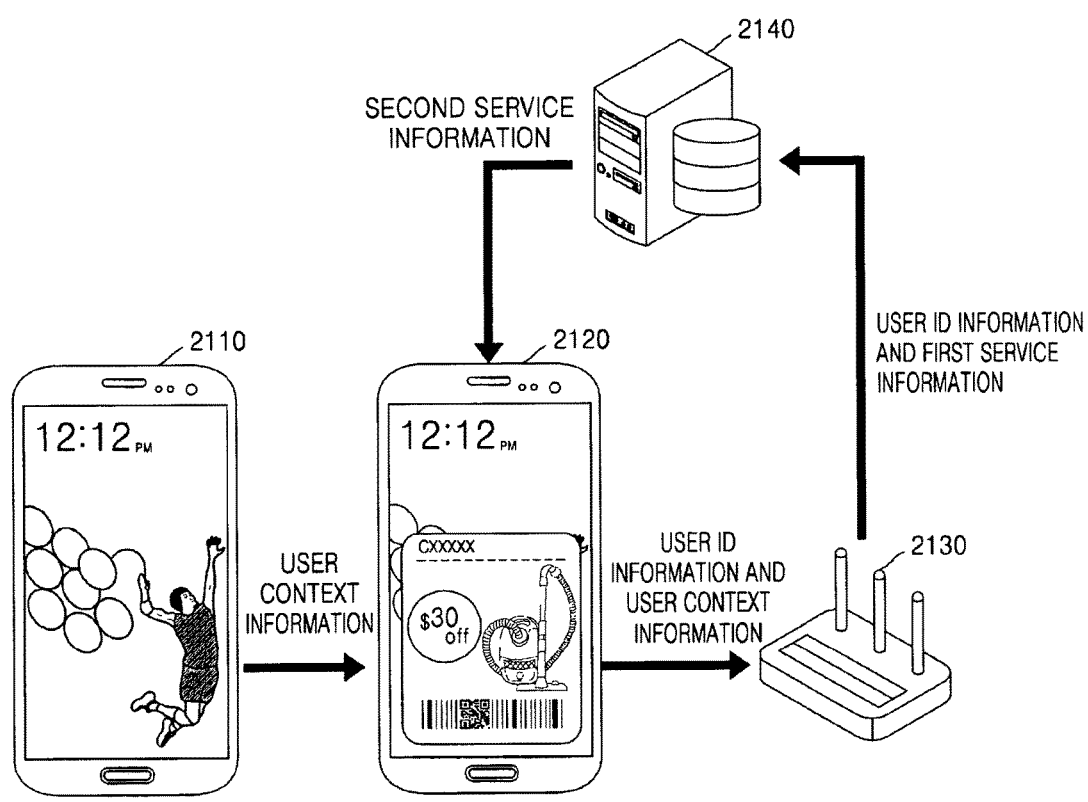
FIG. 21 is a conceptual view illustrating a service providing method according to an exemplary embodiment.

FIG. 21 is a conceptual view illustrating a service providing method according to another exemplary embodiment. The service providing method according to an exemplary embodiment may be performed by including an operation in which a first user terminal 2110 transmits user context information to a second user terminal 2120.

The first user terminal 2110 may move while broadcasting the user context information. The second user terminal 2120 may receive the user context information broadcast by the first user terminal 2110, while moving. The first user terminal 2110 may transmit the user context information to the second user terminal 2120.

The second user terminal 2120 may receive a service using the user context information received from the first user terminal 2110. The second user terminal 2120 may transmit user ID information representing the second user terminal 2120, together with the user context information received from the first user terminal 2110, to a service terminal 2130. The service terminal 2130 may transmit service information generated using the pieces of user context information received from the second user terminal 2120, to the second user terminal 2120 via a server 2140. The second user terminal 2120 may provide a service using the service information received from the server 2140.

Figure 22:
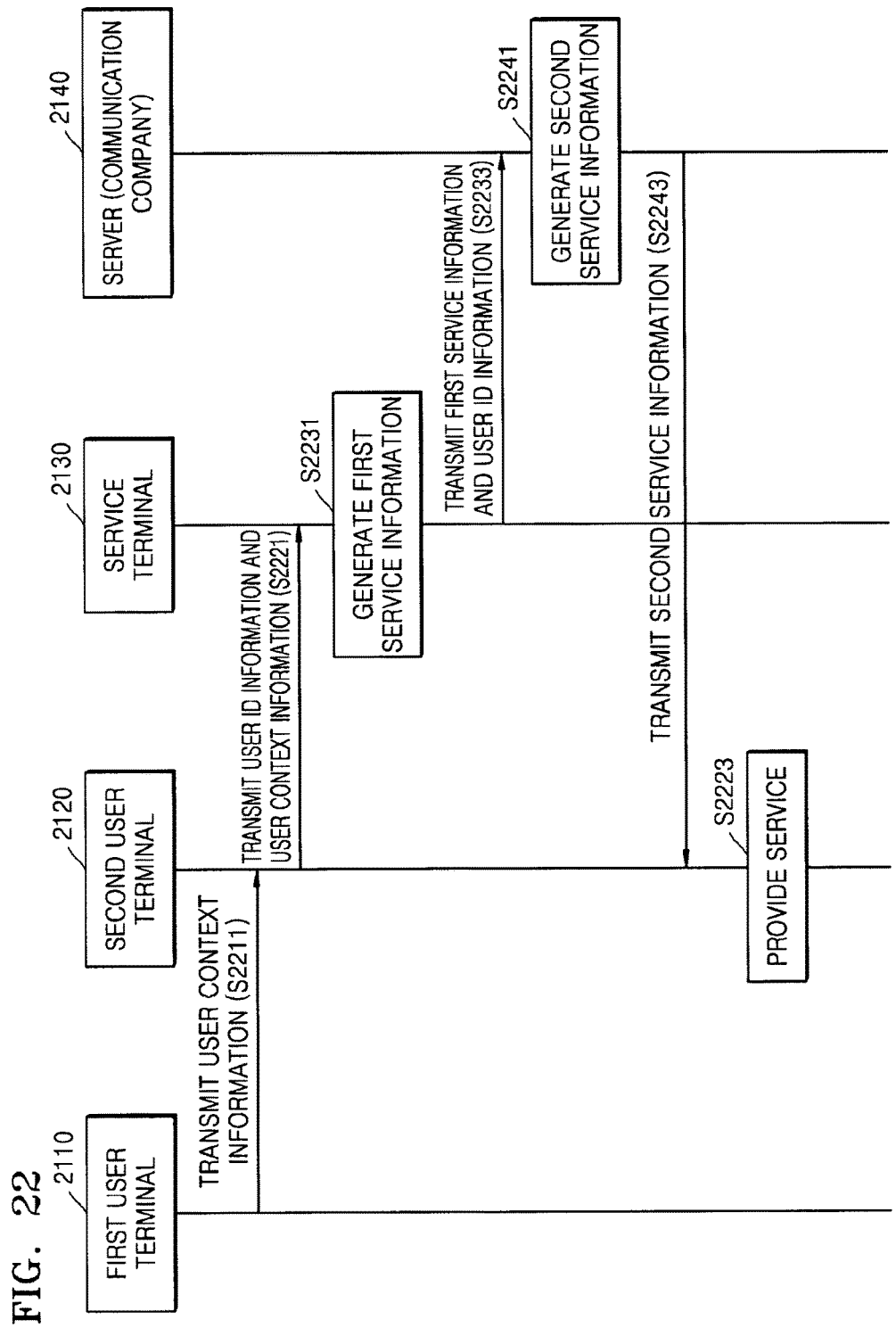
FIG. 22 is a flowchart illustrating a service providing method according to an exemplary embodiment.

The service providing method illustrated in FIG. 21 will be described in more detail with reference to FIG. 22. FIG. 22 is a flowchart illustrating a service providing method according to the exemplary embodiment illustrated in FIG. 21. First, in operation S2211, the first user terminal 2110 transmits the user context information to the second user terminal 2120. Next, in operation 52221, the second user terminal 2120 transmits the user ID information and the user context information to the service terminal 2130. The user context information transmitted by the second user terminal 2120 to the service terminal 2130 may be the user context information received by the second user terminal 2120 from the first user terminal 2110. In operation S2231, the service terminal 2130 generates the first service information using the user context information received from the second user terminal 2120. In operation S2233, the service terminal 2130 transmits the first service information and the user ID information to the server 2140. Then, in operation S2241, the server 2140 generates the second service information using the first service information received from the service terminal 2130. In operation S2243, the server 2140 transmits the second service information to the second user terminal 2120, that is indicated by the user ID information received from the service terminal 2130. In operation S2223, the second user terminal 2120 provides a service using the second service information received from the server 2140.

Figure 23:
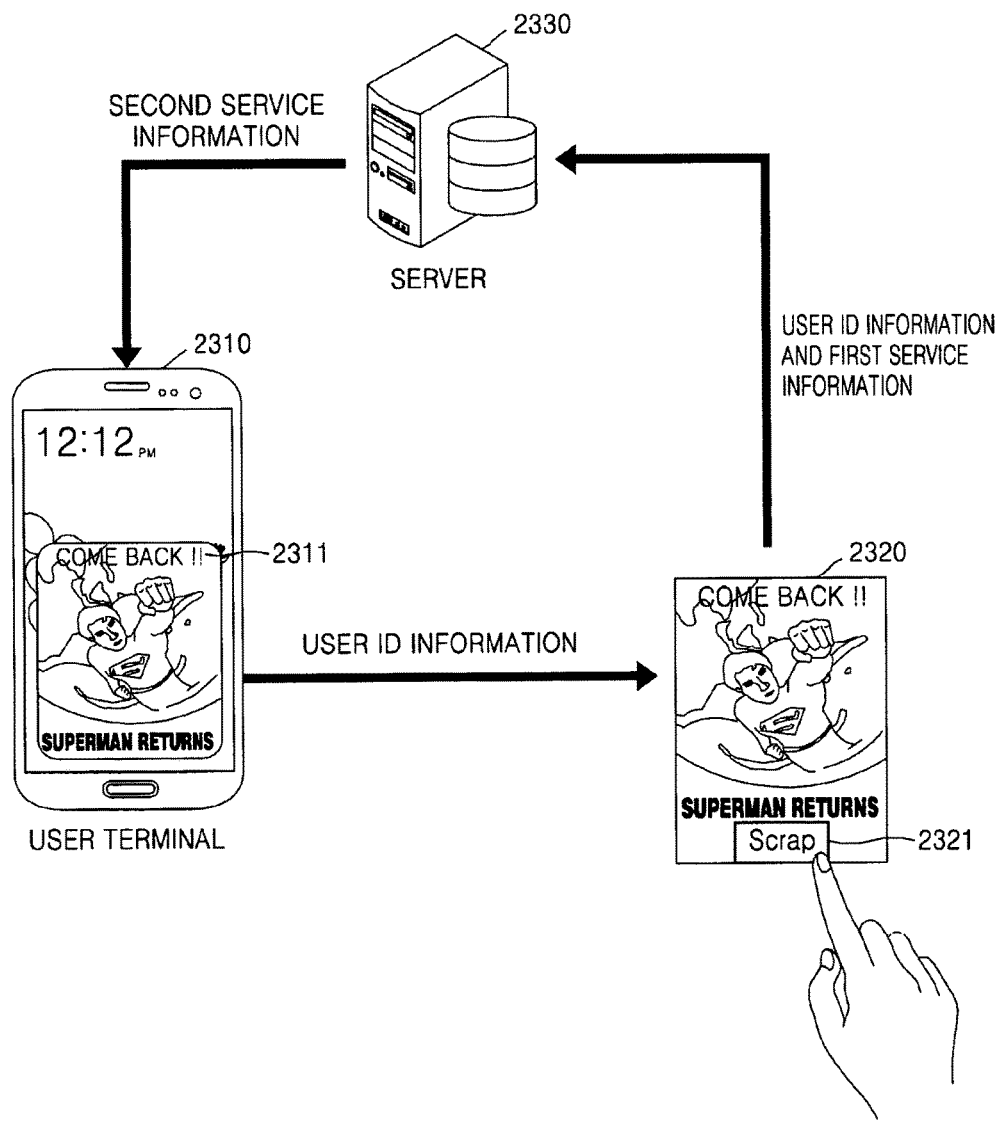
FIG. 23 is a conceptual view illustrating a service providing method according to an exemplary embodiment.

FIG. 23 is a conceptual view illustrating a service providing method according to another exemplary embodiment.

FIG. 23 illustrates an exemplary embodiment in which a service terminal 2320 receives user context information directly from a user. A user terminal 2310 may move while broadcasting only user ID information.

The service terminal 2320, having received the user context information from the user terminal 2310, may provide a user interface (UI) 2321 via which the user context information is input. The user may input the user context information by manipulating the UI 2321 of the service terminal 2320. The service terminal 2320 may receive the user context information from the user using the UI 2321.

In the example of FIG. 23, the service terminal 2320 may be a commonly-used device provided in a public place. For example, the service terminal 2320 may be an advertisement device. The service terminal 2320 may display an advertisement. When the service terminal 2320 receives the user ID information from the user terminal 2310 while displaying an advertisement, the service terminal 2320 may provide the UI 2321 including a scrap image. When a user input of selecting the scrap image occurs in the UI 2321, the service terminal 2320 may determine that the user is interested in the advertisement provided at the moment when the user input was made. Thus, the service terminal 2320 may determine that the advertisement is an advertisement in which the user is interested. The service terminal 2320 may determine interest information representing that the user is interested in the advertisement, as user context information. The service terminal 2320 may generate first service information, based on the determined user context information. For example, the first service information may include detailed information about a product that is promoted by the advertisement in which the user is interested. For example, when the advertisement is an advertisement that publicizes a movie, the first service information may include information that introduces a movie.

The service terminal 2320 may provide a UI 2321 that provides a personalized service. For example, the service terminal 2320 may provide different UIs 2321 to different users. The service terminal 2320 may identify the user using the user ID information received from the user terminal 2310 and determine a UI 2321 for the identified user. For example, the service terminal 2320 may previously have data about what UI 2321 ID information of a user is mapped with. Alternatively, the service terminal 2320 may transmit the user ID information to a server 2330, receive UI information according to the user ID information from the server 2330, and determine different UIs 2321 for different users.

Figure 24:
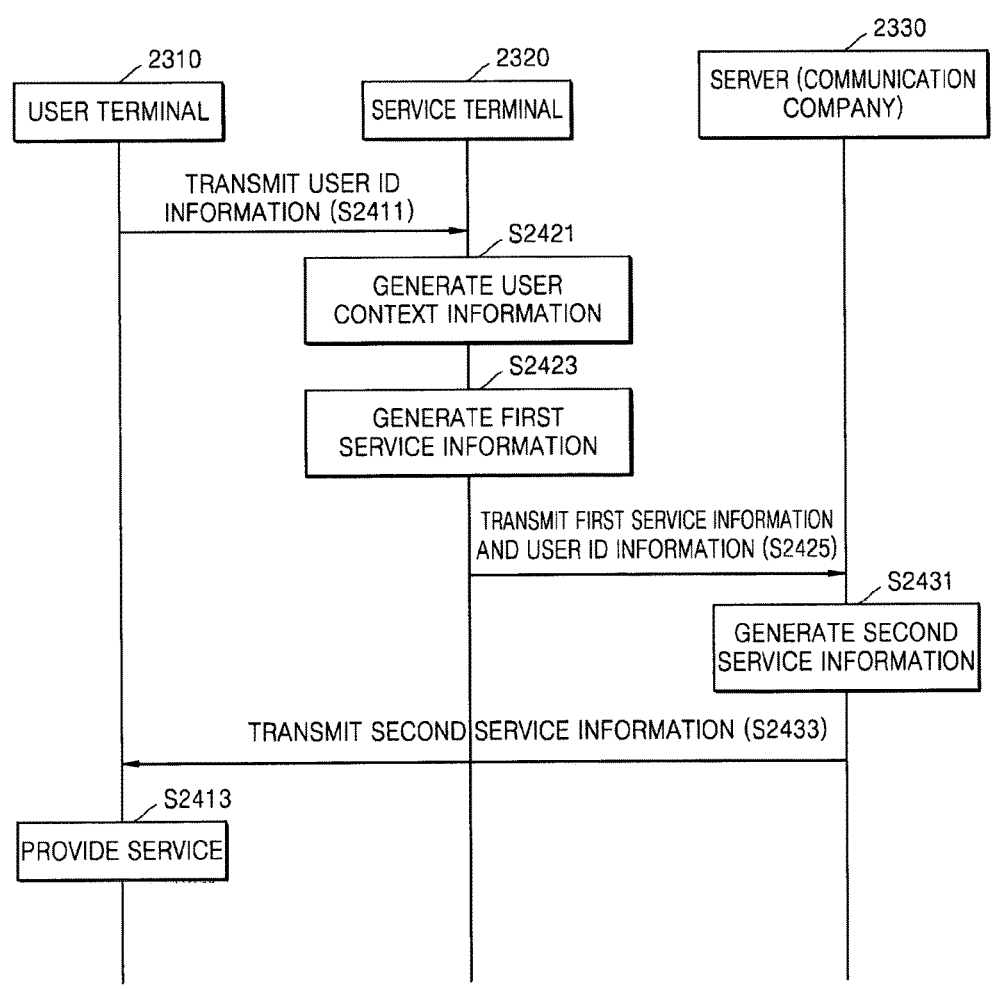
FIG. 24 is a flowchart illustrating a service providing method according to an exemplary embodiment.

Operations included in the service providing method of FIG. 23 will now be described with reference to FIG. 24.

In operation S2411, the user terminal 2310 transmits the user ID information to the service terminal 2320. As described above, the user ID information may include information such as a terminal ID representing the user terminal 2310 or a user ID representing a user. In operation 52421, the service terminal 2320 generates the user context information. The service terminal 2320 may receive the user context information from the user using the UI 2321. For example, when a user input of selecting a scrap image occurs in the UI 2321, the service terminal 2320 may determine that the user is interested in the advertisement provided at the moment when the user input was made. Thus, the service terminal 2320 may determine that the advertisement is an advertisement in which the user is interested. The service terminal 2320 may determine interest information representing that the user is interested in the advertisement, as user context information. Alternatively, the service terminal 2320 may receive the user context information from an external apparatus via a reception interface of the service terminal 2320.

In operation S2423, the service terminal 2320 generates the first service information using the user context information. The service terminal 2320 may store mapping information representing mapping between advertisements displayed on the service terminal 2320 and additional information of the advertisements, in a data storage. The service terminal 2320 may determine additional information about the advertisement as the first service information, based on the mapping information. When the advertisement is regarding a movie, the additional information of the advertisement may be, for example, a poster image of the movie.

In operation S2425, the service terminal 2320 transmits the user ID information received from the user terminal 2310 and the generated first service information to the server 2330. Then, in operation S2431, the server 2330 generates second service information using the received first service information. In operation S2433, the server 2330 transmits the second service information to the user terminal 2310. In operation S2413, the user terminal 2310 may provide a service using the second service information.

As another example, the service terminal 2320 does not directly generate service information but may simply transmit the user context information and the user ID information to the server 2330. The server 2330 may generate service information using the received user context information.

The server 2330 may store mapping information representing mapping between advertisements displayed on the service terminal 2320 and additional information of the advertisements, in a data storage. The server 2330 may determine additional information about an advertisement indicated by the user context information, as the service information, using the mapping information. When the advertisement is regarding a movie, the additional information about the advertisement may be, for example, a poster image of the movie. The server 2330 may transmit the service information to the user terminal 2310. The user terminal 2310 may provide a service using the received service information.

Figure 25A:
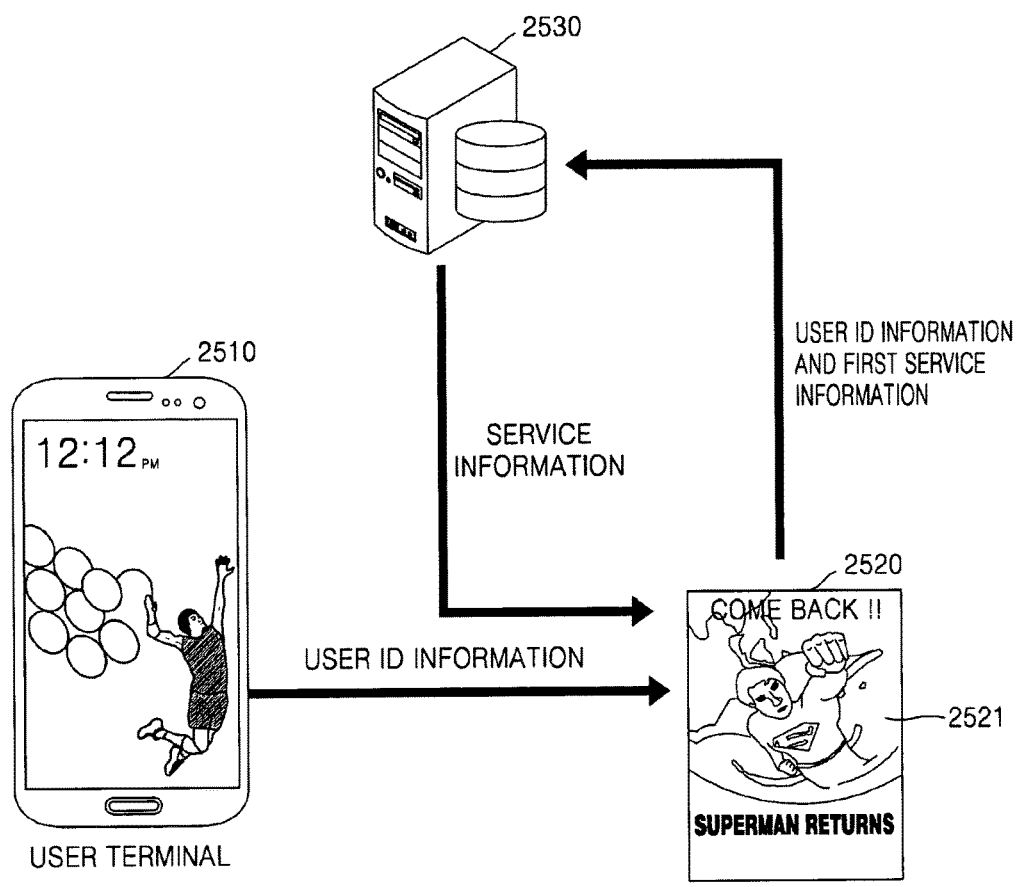
FIGS. 25A and 25B are conceptual views illustrating a service providing method according to an exemplary embodiment.

FIG. 25A is a conceptual view illustrating a service providing method according to another exemplary embodiment. FIG. 25A illustrates a method in which a service terminal 2520 provides a service using user context information received from a user terminal 2510.

The service terminal 2520 may be a fixed type service terminal 2520 that resides at a location. In the service providing method according to another exemplary embodiment, a preferred product may be inferred based on user information, such as a search history or memo recorded in a terminal of a user, and a product purchase history of purchases in an online or offline shop. The service terminal 2520 around a user may provide an advertisement or a recommendation service in response to user context information that is broadcast by the user terminal 2510.

In the example of FIG. 25A, the service terminal 2520 may be a ticket machine in a movie theater. The user terminal 2510 may generate information about a movie reserved by the user as the user context information, based on a movie reservation history recorded in the user terminal 2510.

Referring to FIG. 25A, the user terminal 2510 broadcasts the user context information. The service terminal 2520 may transmit the user context information received from the user terminal 2510 to a server 2530. The service terminal 2520 may also transmit user ID information about the service terminal 2520 to the server 2530.

In addition, the service terminal 2520 may receive an input from the user using a UI 2521, similar to the above-described method, and thus may further generate user context information or change the user context information. For example, the service terminal 2520 may display a poster of a movie reserved by the user, and receive a determination as to whether to issue a reserved ticket via the UI 2521.

Alternatively, the service terminal 2520 may display a poster of the movie reserved by the user according to the user context information, and change a reservation history of the user by receiving a user input via the UI 2521. When the user changes the movie reservation history, the service terminal 2520 may change a movie reservation history of the user context information.

For example, when a history in which a plurality of movies has been reserved is included in the user context information, the service terminal 2520 may display posters of all of the movies reserved by the user, and receive a determination as to whether to issue tickets for all of the reserved movies via the UI 2521. When the user inputs a command to issue tickets for only some of the reserved movies, the service terminal 2520 may change the movie reservation history of the user context information so that tickets for only some of the reserved movies are issued.

The server 2530 may transmit service information corresponding to the user context information received from the service terminal 2520 to the service terminal 2520 indicated by the user ID information. For example, the server 2530 may search for a ticket image of the movie reserved by the user from a database of the server 2530 using the user ID information and the user context information, and may generate a found ticket image as the service information.

The service terminal 2520 may provide a service using the service information received from the server 2530. For example, the service terminal 2520 may display a ticket of a movie using the service information received from the server 2530, and issue the ticket of the movie.

Figure 25B:
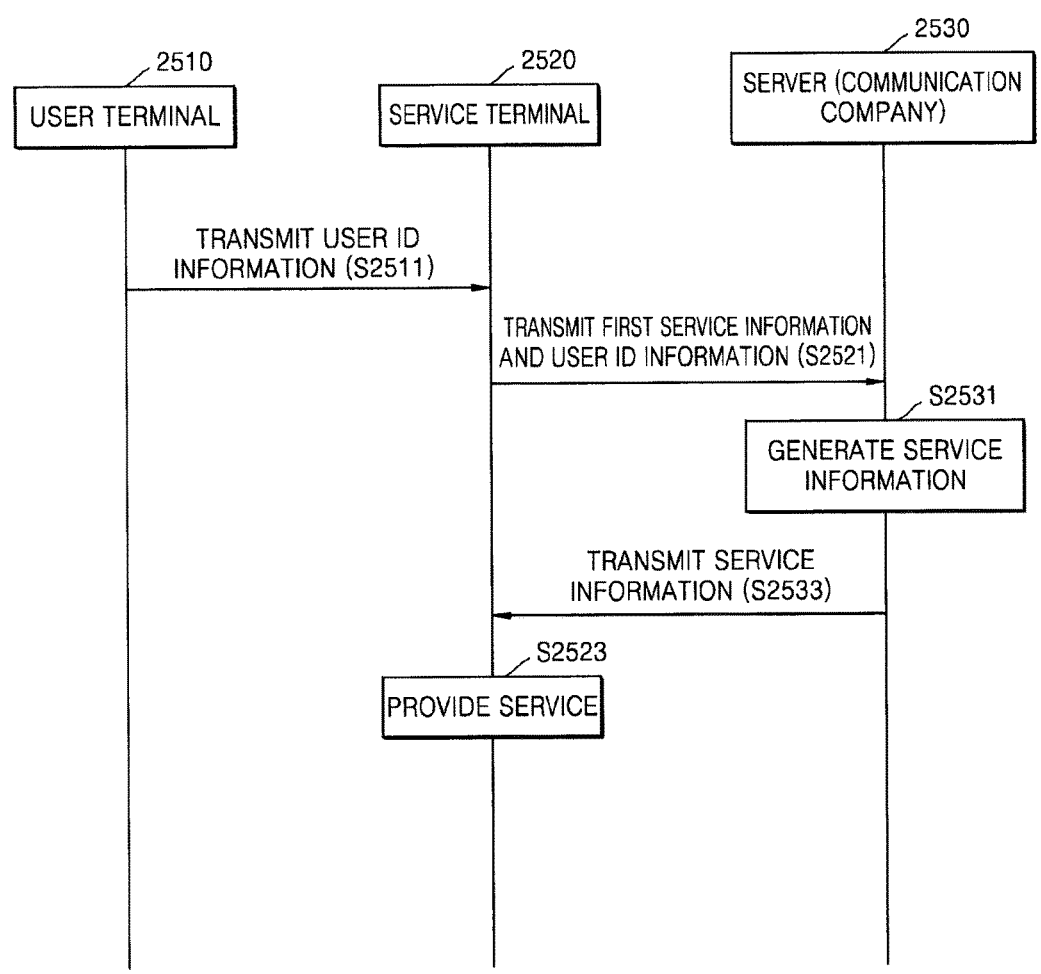

FIG. 25B is a flowchart illustrating the service providing method of FIG. 25A. Operations included in the service providing method of FIG. 25A will be described with reference to FIG. 25B.

First, the user terminal 2510 transmits the user context information to the service terminal 2520. The user context information may include movie reservation information as described above. The user terminal 2510 may broadcast the user context information. In operation S2511, the user terminal 2510 may transmit the user context information to the service terminal 2520 around the user terminal 2510, by broadcasting the user context information.

In operation S2521, the service terminal 2520 having received the user context information transmits ID information of the service terminal 2520 and the received user context information to the server 2530. In addition, the service terminal 2520 may receive an input from the user using the UI 2521, similar to the above-described method, and thus may further generate user context information or change the user context information.

In operation S2531, the server 2530 having received the user context information generates the service information. As described above, the server 2530 may generate the service information using the user context information received from the service terminal 2520. For example, the server 2530 may search for a ticket image of a movie reserved by the user from a database of the server 253— using the user ID information and the user context information, and may generate a found ticket image as the service information. In operation S2533, the server 2530 transmits the generated service information to the service terminal 2520 indicated by the received user ID information.

In operation S2523, the service terminal 2520 having received the service information provides a service. The service terminal 2520 may provide a service using the received service information. For example, the service terminal 2520 may display a ticket of a movie using the service information received from the server 2530, and issue the ticket of the movie.

Figure 26A:
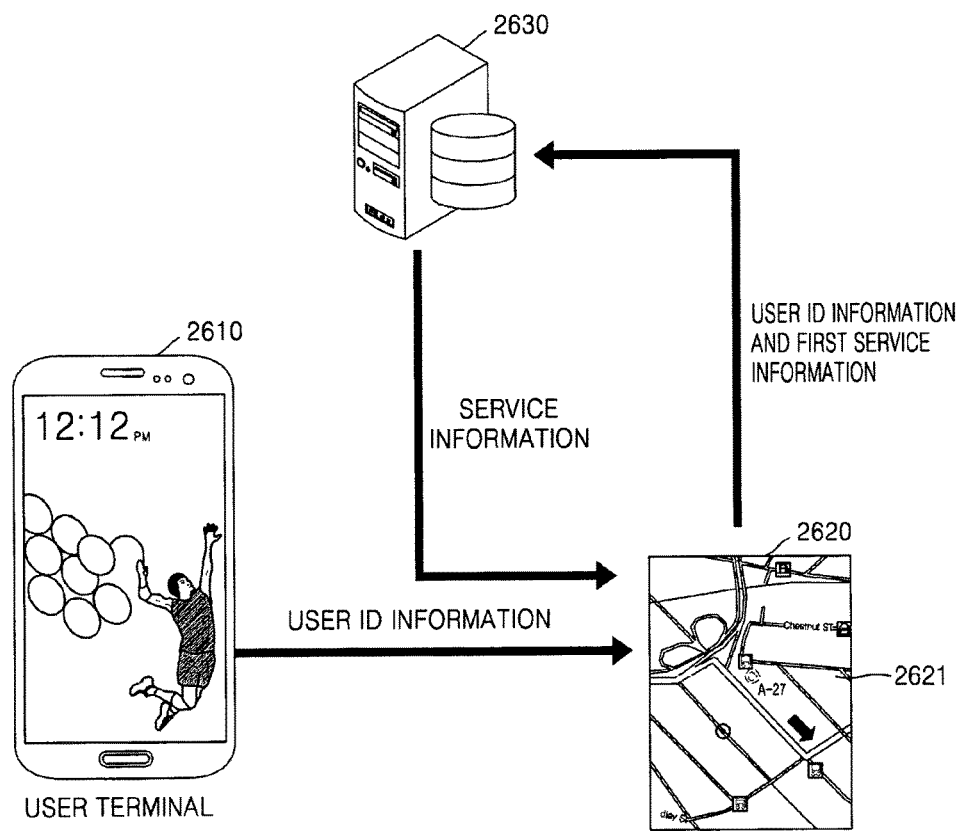
FIGS. 26A and 26B are conceptual views illustrating a service providing method according to an exemplary embodiment.

FIG. 26A is a conceptual view illustrating a service providing method according to another exemplary embodiment. FIG. 26A illustrates a method in which a service terminal 2620 provides a service using user context information received from a user terminal 2610.

In the example of FIG. 26A, the service terminal 2620 may be a large-screen display device that resides in an airport. For example, the service terminal 2620 may be a large-screen display device that displays a map, and may display an airplane boarding gate of airport users on the map. When the service terminal 2620 receives user ID information broadcast by a user terminal 2610, the service terminal 2620 may display the location of an airplane boarding gate of a user corresponding to the user ID information on the map.

Alternatively, when the service terminal 2620 receives user ID information broadcast by the user terminal 2610, the service terminal 2620 may determine whether the user terminal 2610 is tagged on the service terminal 2620. When the user terminal 2610 is tagged on the service terminal 2620, the service terminal 2620 may display the airplane boarding gate of the user corresponding to the user ID information on the map.

For example, when the service terminal 2620 receives user ID information broadcast by the user terminal 2610, the service terminal 2620 may acquire tag information and thus determine whether the user terminal 2610 is tagged on the service terminal 2620. When a touch input is acquired from a UI of the service terminal 2620, the service terminal 2620 may determine that the user terminal has been tagged on the service terminal 2620.

Alternatively, when the service terminal 2620 receives tag data from the user terminal 2610 according to an NFC communication method, the service terminal 2620 may determine that the user terminal 2610 has been tagged on the service terminal 2620. To receive tag data from the user terminal 2610 via an NFC communication method, the service terminal 2620 may request the user terminal 2610 for the tag data via an NFC communication method.

Alternatively, when the service terminal 2620 receives tag data from the user terminal according to a BLE close communication method, the service terminal 2620 may determine that the user terminal has been tagged on the service terminal 2620. To receive tag data from the user terminal 2610 via a BLE close communication method, the service terminal 2620 may request the user terminal 2610 for the tag data via a BLE close communication method.

Alternatively, when the service terminal 2620 receives user ID information broadcast by the user terminal 2610, the service terminal 2620 may display an airplane boarding gate of the user corresponding to the user ID information on the map, according to whether the user manipulates the map displayed on the service terminal 2620. When the service terminal 2620 acquires a user input with respect to the map displayed on the service terminal 2620 from a UI 2621, the service terminal 2620 may determine that the user has manipulated the map displayed on the service terminal 2620.

For example, when the service terminal 2620 receives user ID information broadcast by the user terminal 2610, the service terminal 2620 may determine whether a user input with respect to the map displayed on the service terminal 2620 is acquired, and, when the service terminal 2620 acquires a user input with respect to the map displayed on the service terminal 2620, the service terminal 2620 may display an airplane boarding gate of the user corresponding to the user ID information on the map.

Figure 26B:
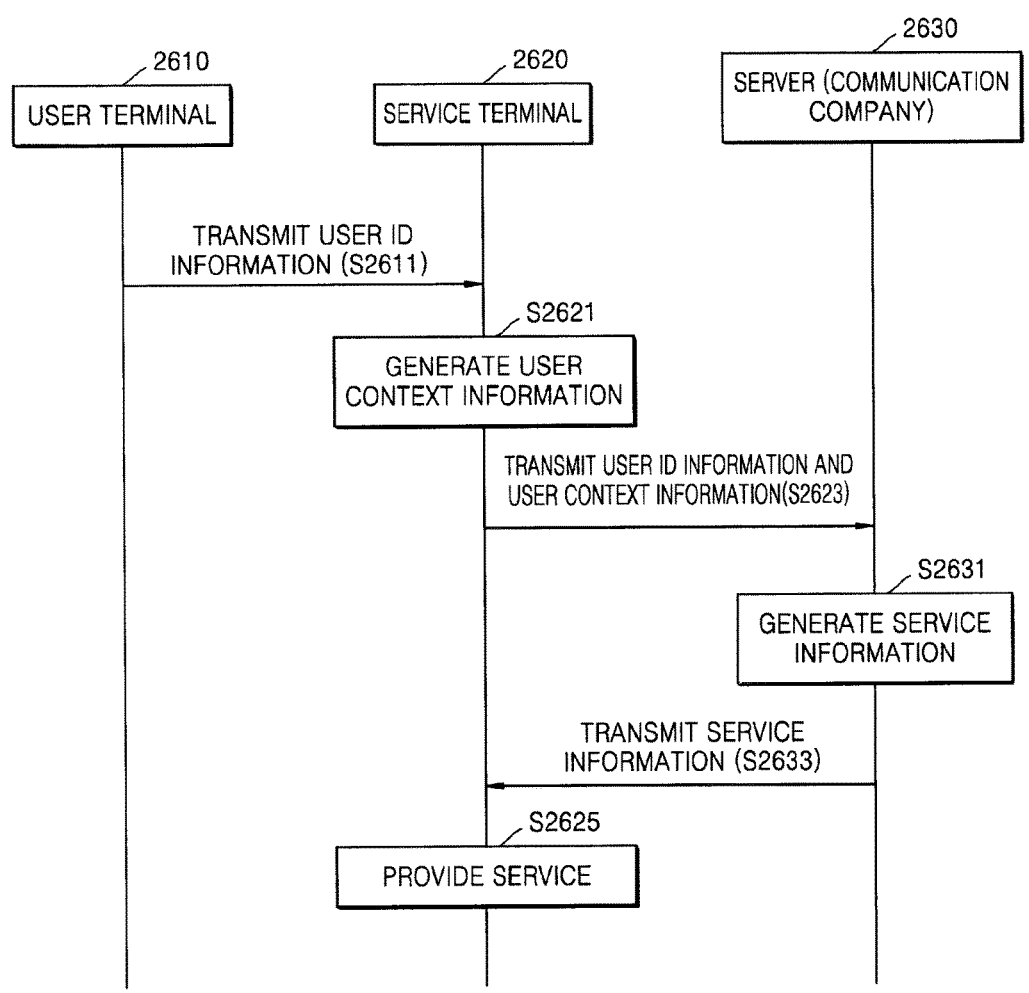

FIG. 26B is a flowchart illustrating the service providing method of FIG. 26A. Operations included in the service providing method of FIG. 26A will be described with reference to FIG. 26B.

First, the user terminal 2610 transmits the user ID information to the service terminal 2620. The user terminal 2610 may broadcast the user ID information. In operation S2611, the user terminal 2610 may transmit the user ID information to the service terminal 2620 around the user terminal 2610, by broadcasting the user ID information.

In operation S2621, the service terminal 2620 having received the user ID information generates user context information. In operation 52623, the service terminal 2620 transmits ID information of the service terminal 2620, the received user ID information, and the generated user context information to the server 2630. The ID information of the service terminal 2620 may be an ID of the service terminal 2620 through which the server 2630 identifies the service terminal 2620. According to an exemplary embodiment, the user context information may include user context information about a state in which the user searches for a boarding gate.

The service terminal 2620 may generate the user context information according to sensing data about a surrounding environment that is acquired by the service terminal 2620. For example, the service terminal 2620 may generate the user context information representing a situation in which the user searches for a boarding gate, according to data that is acquired by the service terminal 2620.

As described above, when the service terminal 2620 receives user ID information broadcast by the user terminal 2610, the service terminal 2620 may generate the user context information representing the situation in which the user searches for a boarding gate.

Alternatively, when the service terminal 2620 receives the user ID information broadcast by the user terminal 2610, the service terminal 2620 may generate the user context information representing the situation in which the user searches for a boarding gate, according to whether the user terminal 2610 is tagged on the service terminal 2620. For example, when the service terminal 2620 receives the user ID information broadcast by the user terminal 2610 and the user terminal 2610 is tagged on the service terminal 2620, the service terminal 2620 may generate the user context information representing the situation in which the user searches for a boarding gate. As described above, when the service terminal 2620 receives tag data from the user terminal 2610 according to an NFC or BLE communication method, the service terminal 2620 may determine that the user terminal 2610 has been tagged on the service terminal 2620.

Alternatively, when the service terminal 2620 receives the user ID information broadcast by the user terminal 2610, the service terminal 2620 may determine whether the user manipulates the map displayed on the service terminal 2620, and as the user manipulates the map displayed on the service terminal 2620, the service terminal 2620 may generate the user context information representing the situation in which the user searches for a boarding gate.

For example, when the service terminal 2620 receives the user ID information broadcast by the user terminal 2610, the service terminal 2620 may determine whether a user input with respect to the map displayed on the service terminal 2620 is acquired, and, when the service terminal 2620 acquires a user input with respect to the map displayed on the service terminal 2620, the service terminal 2620 may generate the user context information representing the situation in which the user searches for a boarding gate.

Next, in operation S2631, the server 2630 having received the user context information generates service information. As described above, the server 2630 may generate the service information using the user context information received from the service terminal 2620. For example, when the user context information represents the state in which the user searches for a boarding gate, the server 2630 may specify an airplane booked by the user using the user ID information and acquire boarding gate location information of the airplane booked by the user. The server 2630 may generate the boarding gate location information as the service information. In operation S2633, the server 2630 transmits the generated service information to the service terminal 2620 indicated by the received ID information of the service terminal 2620.

In operation S2625, the service terminal 2620 having received the service information provides a service. The service terminal 2620 may provide a service using the received service information. For example, the service terminal 2620 may display the location of the boarding gate on the map using the boarding gate location information received from the server 2630.

Figure 27:
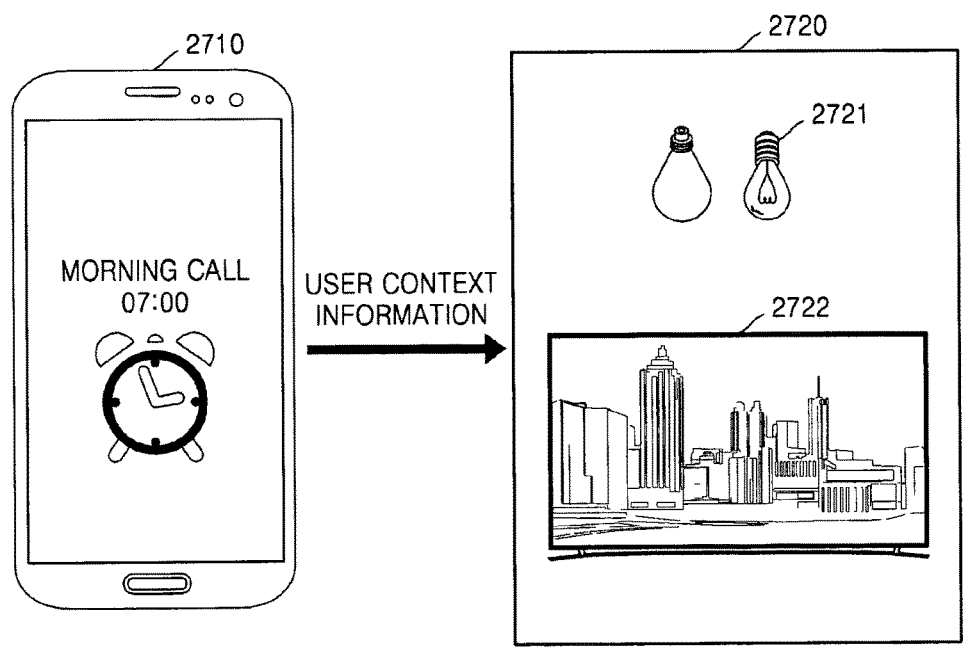
FIG. 27 is a conceptual view illustrating a service providing method according to an exemplary embodiment.

FIG. 27 is a conceptual view illustrating a service providing method according to another exemplary embodiment. FIG. 27 illustrates an example in which a smartphone broadcasts morning call user context information to a peripheral terminal while ringing alarm.

A user terminal 2710 may recognize a situation and broadcast user context information according to the recognized situation. In response to the user context information, a service terminal 2720 may provide a service by performing an operation according to the user context information.

For example, when a morning call alarm time set by a user arrives, the smartphone 2710 may recognize a situation in which a morning call should be rung. The smartphone may broadcast the morning call user context information while ringing a morning call alarm. For example, in response to the morning call user context information, a light bulb 2721 may recognize that the user should wake up, and may turn on the power. In response to the morning call user context information, a TV 2722 may recognize that the user should wake up, and may turn on the power.

Alternatively, the smartphone may broadcast user context information requesting peripheral noise-generating apparatuses to stop their operations when the user is on the phone. The service terminal 2720, such as a TV or a cleaner, may stop an operation after receiving the user context information requesting peripheral noise-generating apparatuses to stop their operations.

Alternatively, when the smartphone has received an important message, the smartphone may broadcast user context information representing that a message reception alarm is to be provided to the service terminal 2720 around the smartphone via an UI. In response to the user context information representing that a message reception alarm is to be provided, the service terminal 2720, such as a TV or a PC, may provide a message reception alarm. Alternatively, when the battery of the smartphone is dead, the smartphone may broadcast the user context information such that a service terminal around the smartphone may provide an alarm via a UI.

In response to the morning call user context information, the service terminal 2720 may provide a service by performing a preset operation. For example, in response to the morning call user context information, the light bulb 2721 may recognize that the user should wake up, and may turn on the power. In response to the morning call user context information, the TV 2722 may recognize that the user should wake up, and may turn on the power.

The user terminal 2710 and the service terminal 2720 may determine an operation of the service terminal 2720 that is repeatedly driven by the user, according to circumstances, and store the determined operation of the service terminal 2720 as history information. In the service providing method according to another exemplary embodiment, apparatuses that automatically operate via a macro may be selectively controlled via the user terminal 2710. In the service providing method according to another exemplary embodiment, service apparatuses may be selectively and automatically controlled via the user terminal 2710 under a situation using the history information. When the user terminal 2710 recognizes the situation, the user terminal 2710 may instruct the service terminal 2720 to perform an operation corresponding to user context information, according to the history information.

After the user terminal 2710 broadcasts the user context information, the user terminal 2710 may store, as the history information, information about an operation of the service terminal 2720 to be instructed to be performed. The history information may include ID information of the service terminal 2720 and information about the operation to be performed by the service terminal 2720.

The user terminal 2710 may determine an operation of the service terminal 2720 that is repeatedly driven by the user, according to circumstance changes of the user, and store the determined operation of the service terminal 2720 as history information. When the user terminal 2710 broadcasts the user context information and then transmits an input of instructing an operation to be performed to the service terminal 2720 a preset number of times or more, the user terminal 2710 may determine the transmitting operation as an action to broadcast the user context information and then instruct the service terminal 2720 to perform an operation.

After the user terminal 2710 broadcast the user context information, the user terminal 2710 may generate or change history information using received service information. For example, the service information received after the user context information is broadcast may include a message reporting that the service terminal 2720 has performed an operation. The user terminal 2710 may generate or change history information using the message reporting that the service terminal 2720 has performed an operation.

The service terminal 2720 may determine an operation of the service terminal 2720 that is repeatedly driven by the user, according to circumstance changes of the user, and store the determined operation of the service terminal 2720 as history information. When the service terminal 2720 receives the user context information and then receives the input of instructing an operation to be performed a preset number of times or more, the service terminal 2720 may determine the receiving operation as an operation to be performed by the service terminal 2720 after the user context information is received. The service terminal 2720 may store, as history information, information about an operation to be performed after the user context information is received. As such, when the service terminal 2720 receives the user context information, the service terminal 2720 may perform an operation corresponding to the user context information according to the history information. The service terminal 2720 may transmit the history information to the user terminal 2710. The service terminal 2720 may transmit the history information to the user terminal 2710 via a server.

Figure 28:
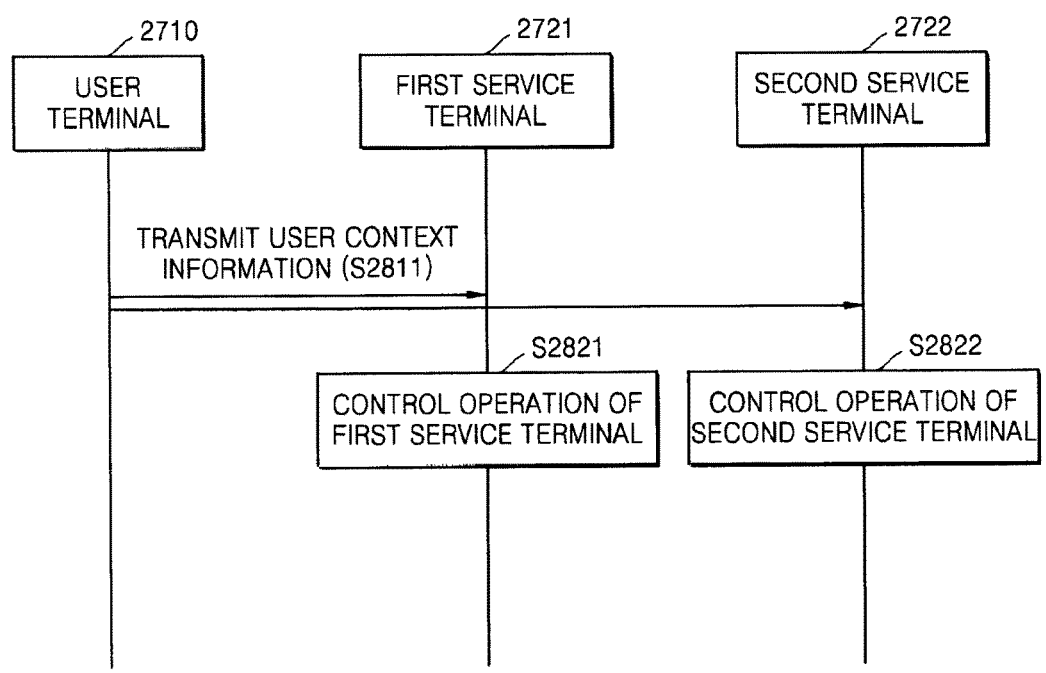
FIG. 28 is a flowchart illustrating a service providing method according to an exemplary embodiment.

FIG. 28 is a flowchart illustrating the service providing method of FIG. 27. In operation S2811, the user terminal 2710 transmits the user context information to a first service terminal 2721 and a second service terminal 2722. The user terminal 2710 may broadcast the user context information to transmit the user context information to the first service terminal 2721 and the second service terminal 2722.

In operations S2821 and S2822, the first service terminal 2721 and the second service terminal 2722 may receive the user context information and provide a service by controlling operations of the first and second service terminals 2721 and 2722 according to the user context information, respectively. For example, when the light bulb 2721 receives the morning call user context information as the user context information, the light bulb 2721 may recognize that the user should wake up, and may turn on the power, in operation S2821. In response to the morning call user context information as the user context information, the TV 2722 may recognize that the user should wake up, and may turn on the power, in operation S2822.

Figure 29:
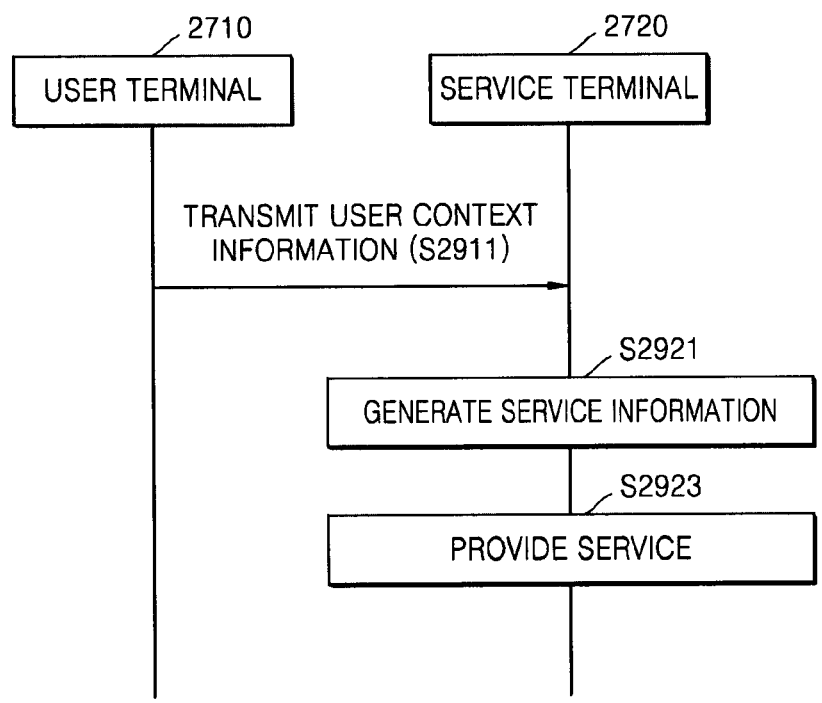
FIG. 29 is a flowchart illustrating a service providing method according to an exemplary embodiment.

FIG. 29 is a flowchart illustrating the service providing method of FIG. 27. In operation S2911, the user terminal 2710 transmits the user context information to the service terminal 2720. The user terminal 2710 may transmit the user context information to the service terminal 2720 by broadcasting the user context information.

In operation S2921, the service terminal 2720 may receive the user context information and generate service information according to the user context information. The service information may include the above-described history information. For example, history information may be generated or changed by increasing the number of times an operation corresponding to the user context information is performed. In operation S2923, the service terminal 2720 may provide a service by controlling an operation of the service terminal 2720 according to the generated service information.

Figure 30:
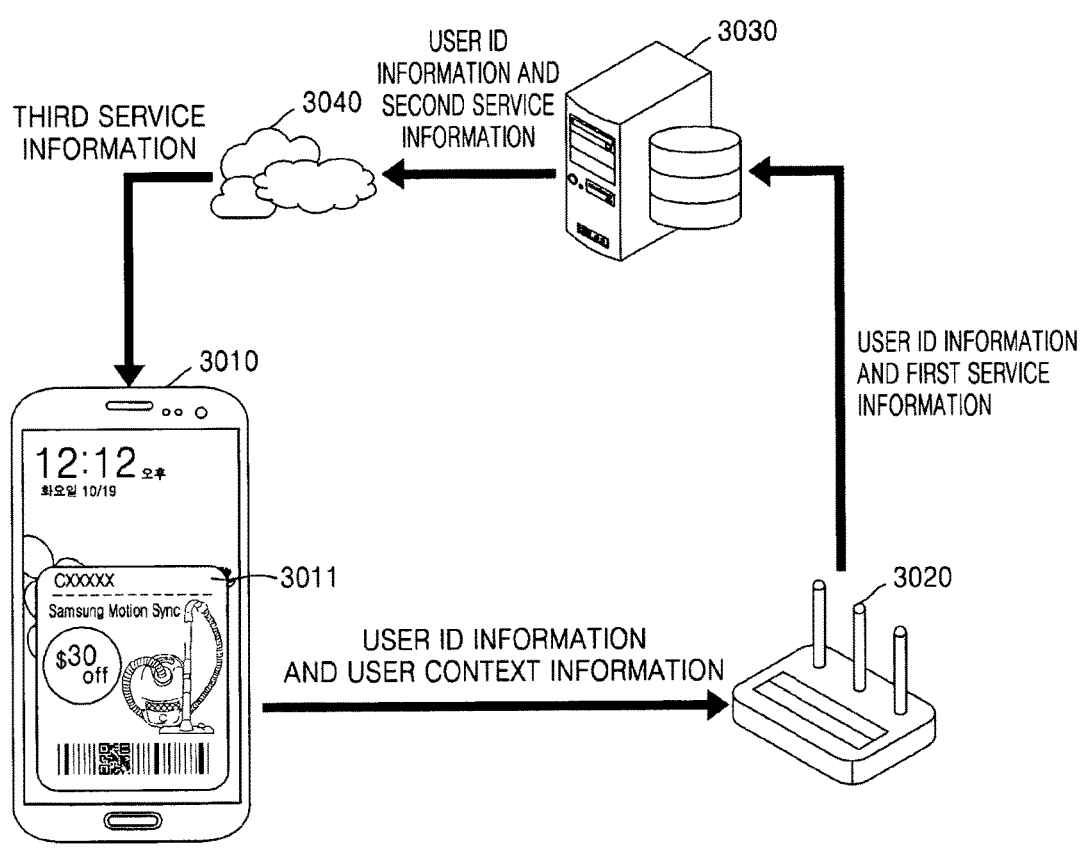
FIG. 30 is a conceptual view illustrating a service providing method according to an exemplary embodiment.

FIG. 30 is a conceptual view illustrating a service providing method according to another exemplary embodiment. A cloud server may perform a service providing method according to an exemplary embodiment. The service providing method according to another exemplary embodiment may be performed by further including a cloud server 3040.

A server 3030 may transmit user ID information and second service information to the cloud server 3040. The cloud server 3040 may include personal information of a user. The cloud server 3040 may generate third service information related to the second service information using the personal information of the user stored in the cloud server 3040. For example, the second service information may be service information including discount coupons of all products that are provided by an electronic product shop. The cloud server 3040 may generate the third service information by selecting a discount coupon for an electronic product searched by the user, based on a search history of electronic products stored in the cloud server 3040.

Figure 31:
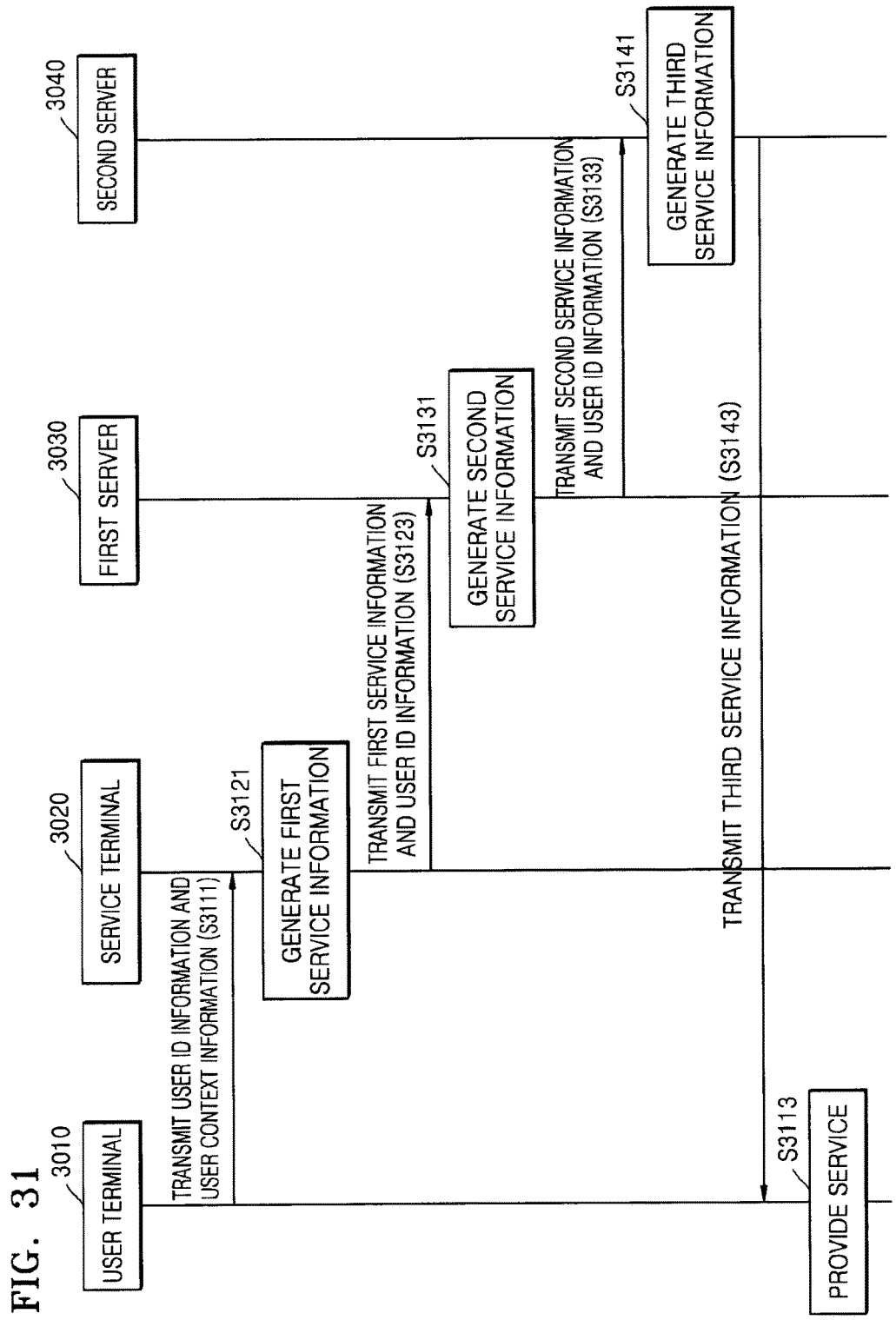
FIG. 31 is a flowchart illustrating a service providing method according to an exemplary embodiment.

FIG. 31 is a flowchart illustrating the service providing method of FIG. 30. First, a user terminal 3010 transmits user ID information and user context information to a service terminal 3020, in operation S3111. In operation S3121, the service terminal 3020 generates first service information using the user context information. In operation S3123, the service terminal 3020 transmits the user ID information received from the user terminal 3010 and the generated first service information to a first server 3030. The first server 3030 may be a server of a service provider. In operation S3131, the first server 3030 may generate second service information using the received first service information. In operation S3133, the first server 3030 may transmit the generated second service information together with the received user ID information to a second server 3040. The second server 3040 may be a cloud server. In operation S3141, the second server 3040 may generate third service information using the received second service information. In operation S3143, the second server 3040 may transmit the generated third service information to the user terminal 3010. Finally, in operation S3113, the user terminal 3010 may provide a service using the received third service information.

Although the first server 3030 and the second server 3040 are independent servers in FIG. 31, the first server 3030 and the second server 3040 may operate as a single server. The single server may receive the first service information from the service terminal 3020, generate service information according to user information and the received first service information, and transmit the service information to the user terminal 3010.

Figure 32:
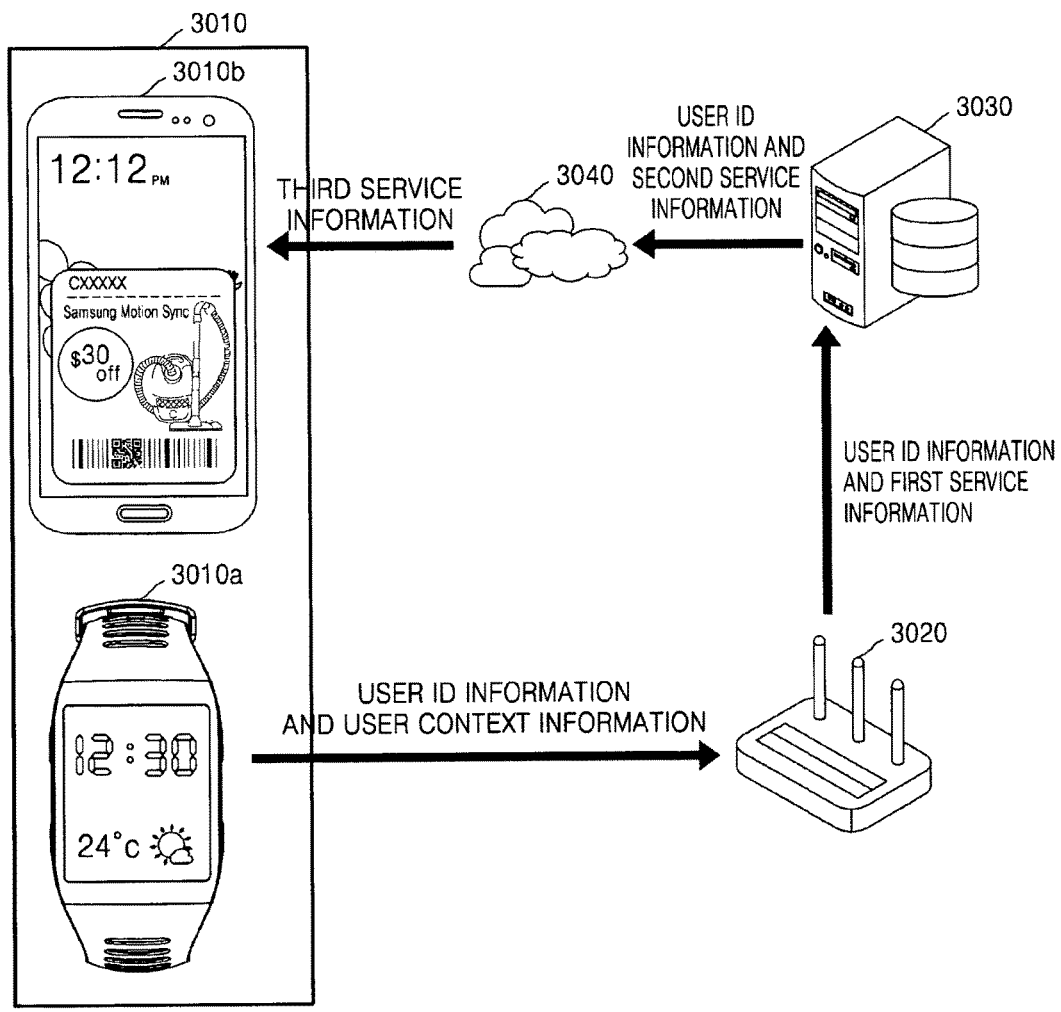
FIGS. 32 and 33 illustrate one or more exemplary embodiments in which a plurality of user terminals are used.
Figure 33:
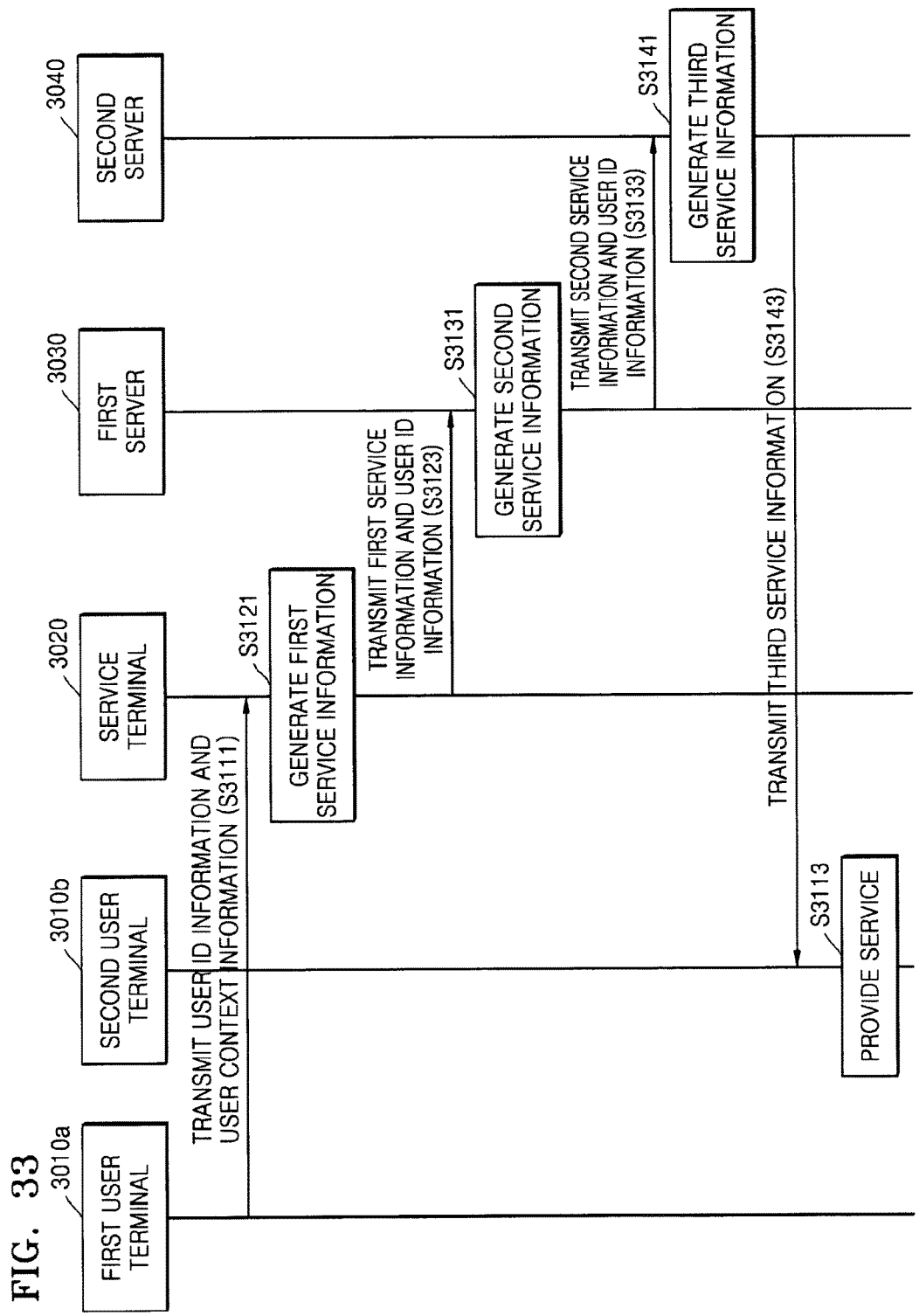

FIGS. 32 and 33 illustrate an exemplary embodiment in which a plurality of user terminals 3010 are used in the exemplary embodiment illustrated in FIG. 30. FIG. 32 illustrates an exemplary embodiment in which the plurality of user terminals 3010 include a smartphone and a smart watch. For example, a first user terminal 3010a may broadcast user context information and user ID information, and a second user terminal 3010b may receive service information from a server.

For example, when a smartphone is solely used, the smartphone may solely broadcast and receive information. When the smartphone recognizes that it is connected to a smart watch, the smartphone may not broadcast information but may instruct the smart watch to broadcast user ID information and user context information.

FIG. 33 is a flowchart illustrating the service providing method of FIG. 32. First, the first user terminal 3010a transmits user ID information and user context information to a service terminal 3020, in operation S3111. The user ID information may include user ID information of the second user terminal 3010b.

In operation S3121, the service terminal 3020 generates first service information using the user context information. In operation S3123, the service terminal 3020 transmits the user ID information received from the first user terminal 3010a and the generated first service information to a first server 3030. The first server 3030 may be a server of a service provider.

In operation S3131, the first server 3030 may generate second service information using the received first service information. In operation S3133, the first server 3030 may transmit the generated second service information together with the received user ID information to a second server 3040. The second server 3040 may be a cloud server. In operation S3141, the second server 3040 may generate third service information using the received second service information. In operation S3143, the second server 3040 may transmit the generated third service information to the second user terminal 3010b. Finally, in operation S3113, the second user terminal 3010b may provide a service using the received third service information.

Figure 34:
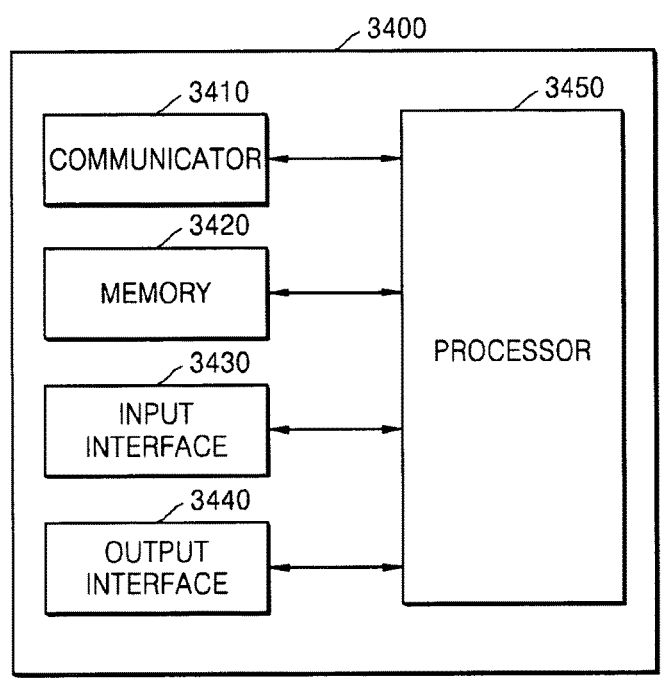
FIGS. 34-37 are block diagrams illustrating user terminals, each of which perform a service providing method according to one or more exemplary embodiments.

FIG. 34 is a block diagram illustrating a user terminal 3400 that performs a service providing method according to an exemplary embodiment. Referring to FIG. 34, the user terminal 3400 may include a communicator 3410, a memory 3420, an input interface 3430, an output interface 3440, and a processor 450.

Figure 35:
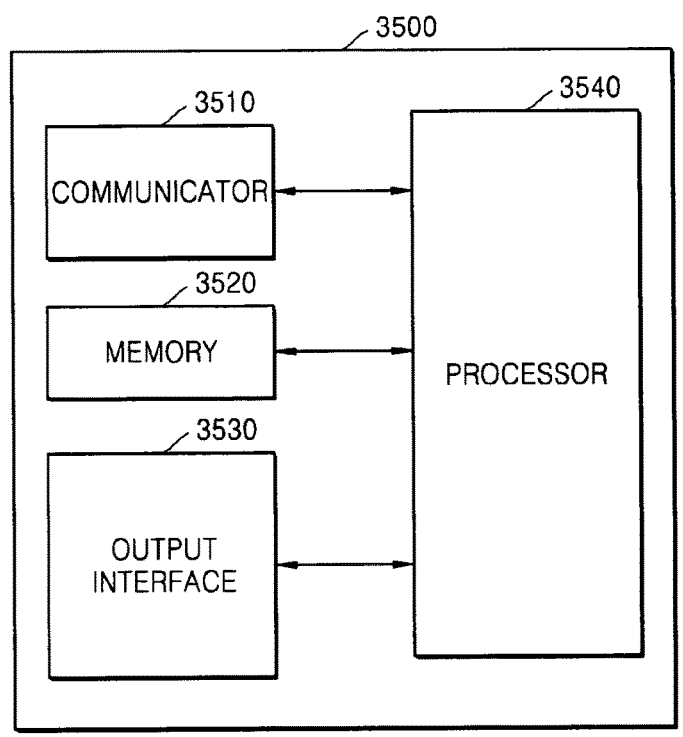
Figure 36:
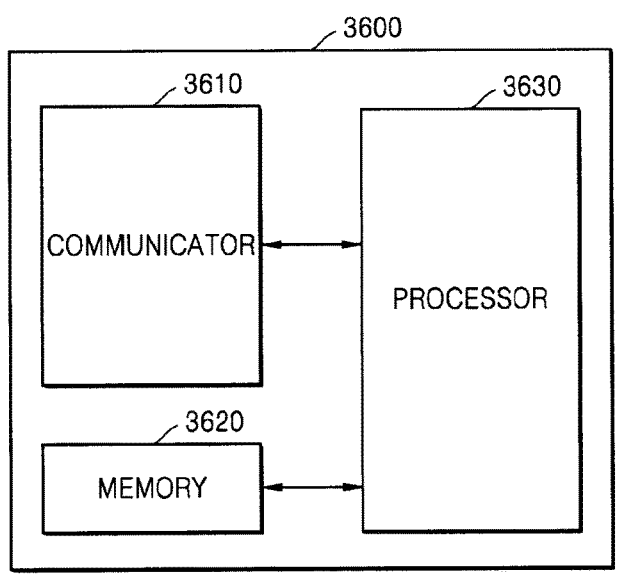
Figure 37:
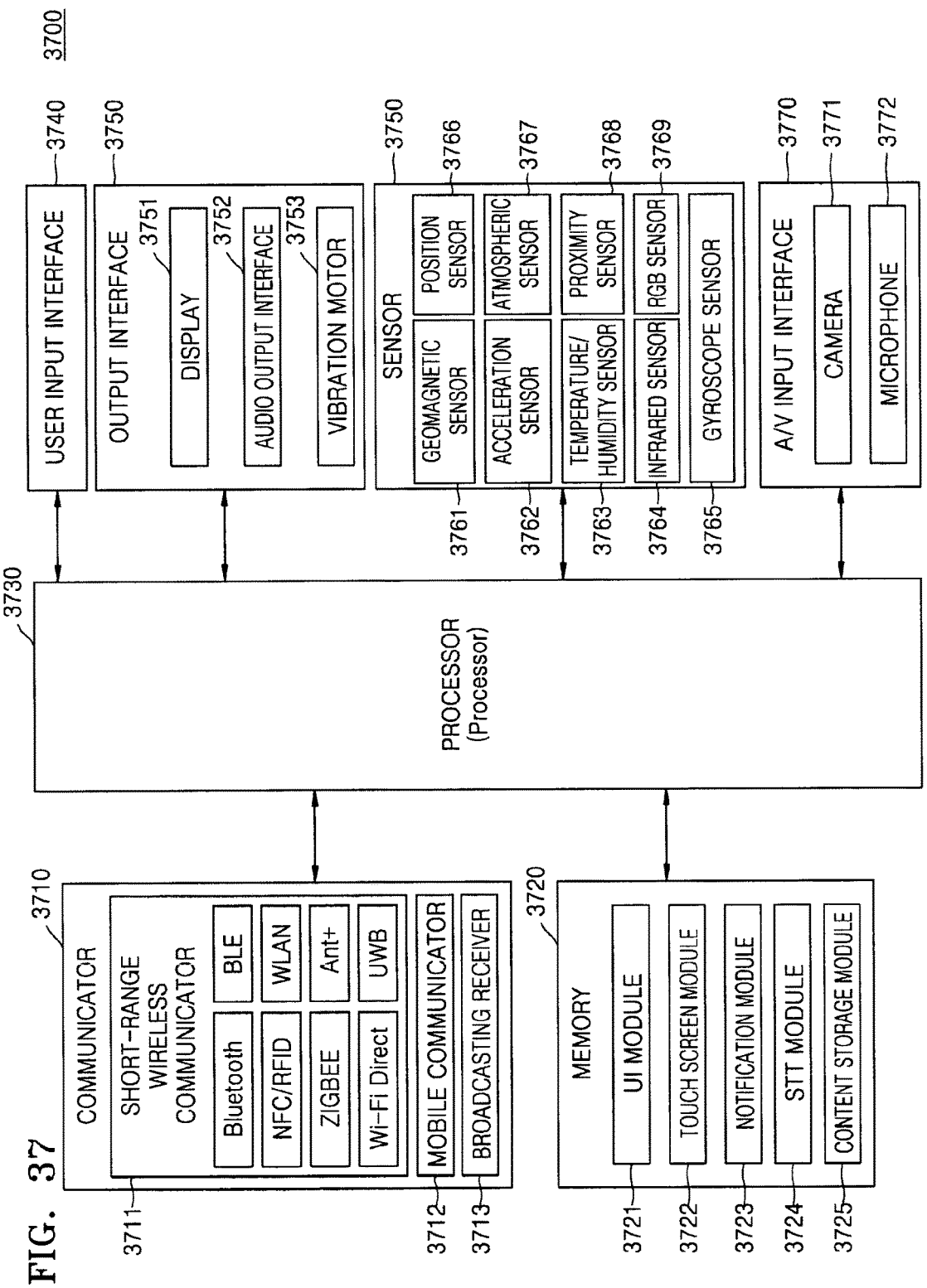

However, the input interface 3430 and the output interface 3440 are optional. As shown in FIG. 35, the input interface 3430 may be omitted, and thus a user terminal 3500 including a communicator 3510, a memory 3520, an output interface 3530, and a processor 3540 may be implemented. Alternatively, as shown in FIG. 36, a user terminal 3600 including a communicator 3610, a memory 3620, and a processor 3630 may be implemented. Alternatively, as shown in FIG. 37, a user terminal further including a sensor and an audio/video (A/V) input interface in addition to the components of FIG. 34 may be implemented.

The aforementioned components will now be described in detail with reference to FIG. 37.

A communicator 3710 performs data communication with an external terminal to perform a service providing method according to an exemplary embodiment. The communicator 3710 may broadcast at least one of user ID information and user context information. The user ID information may include at least one of ID information of a user, a terminal ID information of a user terminal, and a network ID information of the user terminal. The communicator 3710 may receive data from the external terminal. The communicator 3710 may receive service information from the external terminal or a server.

The communicator 3710 may include a short-range wireless communicator 3711, a mobile communicator 3712, and a broadcasting receiver 3713.

The short-range wireless communicator 3711 may include, but is not limited to, a Bluetooth communicator, a Bluetooth Low Energy (BLE) communicator, a near field communication (NFC) interface, a wireless local area network (WLAN) (e.g., Wi-Fi) communicator, a ZigBee communicator, an infrared Data Association (IrDA) communicator, a Wi-Fi direct (WFD) communicator, an ultra-wideband (UWB) communicator, an Ant+ communicator, and the like.

The mobile communicator 3712 may exchange a wireless signal with at least one selected from a base station, an external terminal, and a server on a mobile communication network. Examples of the wireless signal may include a voice call signal, a video call signal, and various types of data generated during a short message service (SMS)/multimedia messaging service (MMS).

The broadcasting receiver 3713 receives a broadcasting signal and/or broadcasting-related information from an external source via a broadcasting channel. The broadcasting channel may be a satellite channel, a ground wave channel, or the like. According to exemplary embodiments, a user terminal 3700 may not include the broadcasting receiver 3713.

The memory 3720 may store computer programs and pieces of temporary data for performing a service providing method according to an exemplary embodiment. For example, the memory 3720 may store programs for processing and control by a processor 3730, or may store input data or output data. For example, the memory 3720 may store applications and multimedia content. The memory 3720 may store user ID information of the user terminal 3700. The memory 3720 may store user context information. The memory 3720 may also store condition information for broadcasting at least one of the user ID information and the user context information. The memory 3720 may store condition information for generating the user context information.

The memory 3720 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk. The device 3700 may operate a web storage or a cloud server on the internet that performs a storage function of the memory 3720.

The programs stored in the memory 3720 may be classified into a plurality of modules according to their functions. For example, the programs may be classified into a UI module 3721, a touch screen module 3722, a speak-to-text (STT) module 3724, and a content storage module 3725.

The UI module 3721 may provide a UI, GUI, or the like that interoperates with the user terminal 3700 according to applications. The touch screen module 3722 may detect a touch gesture on a touch screen of a user and transmit information regarding the touch gesture to the processor 3730. The touch screen module 3722 according to an exemplary embodiment may recognize and analyze a touch code. The touch screen module 3722 may be configured by a separate hardware including a controller.

To detect the actual touch or the proximate touch on the touch pad, the touch screen may have various internal or external sensors. An example of a sensor used to detect the real touch or the proximity touch on the touch screen is a tactile sensor. The tactile sensor denotes a sensor that detects a touch by an object to a degree that a human feels more. The tactile sensor may detect various types of information, such as the roughness of a touched surface, the hardness of the touching object, the temperature of a touched point, and the like.

Another example of a sensor used to detect the real touch or the proximity touch on the touch screen is a proximity sensor.

The proximity sensor is a sensor that detects the existence of an object that approaches a predetermined detection surface or that exists nearby, using an electromagnetic force or infrared rays, without using any mechanical contact. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. Examples of the touch gesture of the user may include tap, touch and hold, double tap, drag, panning, flick, drag and drop, swipe, and the like.

The notification module 3723 may generate a signal for notifying that an event has been generated in the user terminal 3700. Examples of the event generated in the user terminal 3700 may include call signal receiving, message receiving, a key signal input, schedule notification, and the like. The notification module 3723 may output a notification signal in the form of a video signal via a display 3751, in the form of an audio signal via an audio output interface 3752, or in the form of a vibration signal via a vibration motor 3753.

The STT module 3724 may convert a voice included in multimedia content into a text to generate a transcript corresponding to the multimedia content. The transcript may be mapped to information about a playback time of the multimedia content.

The content storage module 3725 may include at least one type of content from among various types of content. The content storage module 3725 may store multimedia content. The content storage module 3725 may store multimedia content to be played back in the user terminal 3700. The multimedia content may include text data, still image and/or moving image data, audio data, and the like.

The processor 3730 controls all operations of the user terminal 3700. For example, the processor 3730 may control an output interface 3750, a user input interface 3740, the communicator 3710, a sensor 3760, and an A/V input interface 3770 by executing the programs stored in the memory 3720.

The processor 3730 may include a processor 3730 that provides a service by controlling the user terminal 3700 using service information. The processor 3730 may control the communicator 3710 to broadcast user context information acquired via the user input interface 3740.

The processor 3730 may acquire user context information mapped with sensing data acquired by a sensor using mapping information representing mapping between sensing data and user context information, and control the communicator 3710 to broadcast the user context information.

The processor 3730 may determine whether transmission conditions for broadcasting the user context information have been satisfied. When the transmission conditions for broadcasting the user context information are satisfied, the processor 3730 may control the communicator 3710 to broadcast the user context information.

When the user context information is broadcast, the processor 3730 may transmit a message to an external terminal according to history information about a control message that is transmitted by the user terminal 3700. When the user context information is broadcast, the history information may be generated by including the control message transmitted by the user terminal 3700 and ID information of the external terminal that has received the message.

The user input interface 3740 denotes an interface via which a user inputs data for controlling the user terminal 3700. For example, the user input interface 3740 may be, but not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The output interface 3750 outputs an audio signal, a video signal, or a vibration signal, and may include the display 3751, the audio output interface 3752, and the vibration motor 3753.

The display 3751 displays information that is processed by the user terminal 3700. When the display 3751 forms a layer structure together with a touch pad to construct a touch screen, the display 3751 may be used as an input device as well as an output device. The display 3751 may include at least one of a liquid crystal display (LCD), a thin film transistor-liquid crystal display (TFT-LCD), an organic light-emitting diode (OLED), a flexible display, a 3D display, and an electrophoretic display. According to exemplary embodiments of the user terminal 3700, the user terminal 3700 may include at least two displays 3751.

The audio output interface 3752 may output audio data that is received from the communicator 3710 or stored in the memory 3720. The audio output interface 3752 may also output an audio signal (for example, a call signal receiving sound, a message receiving sound, a notification sound) related with a function of the user terminal 3700. The audio output interface 3752 may include, for example, a speaker and a buzzer.

The vibration motor 3753 may output a vibration signal. For example, the vibration motor 3753 may output a vibration signal corresponding to an output of audio data or video data (for example, a call signal receiving sound or a message receiving sound). The vibration motor 3753 may also output a vibration signal when a touch screen is touched.

The sensor 3760 may sense the status of the user terminal 3700 or the status of the surroundings of the user terminal 3700 and may transmit information corresponding to the sensed status to the processor 3730.

The sensor 3760 may include, but is not limited thereto, at least one selected from a magnetic sensor 3761, an acceleration sensor 3762, a temperature/humidity sensor 3763, an infrared sensor 3764, a gyroscope sensor 3765, a position sensor (e.g., a GPS) 3766, a pressure sensor 3767, a proximity sensor 3768, and an RGB sensor 3769 (i.e., an illumination sensor). Functions of most of the sensors would be instinctively understood by one of ordinary skill in the art in view of their names and thus detailed descriptions thereof will be omitted herein.

The A/V input interface 3770 inputs an audio signal or a video signal, and may include, for example, a camera 3771 and a microphone 3772. The camera 3771 may acquire an image frame, such as a still image or a moving picture, via an image sensor in a video call mode or a photography mode. An image captured via the image sensor may be processed by the processor 3730 or a separate image processor.

The image frame obtained by the camera 3771 may be stored in the memory 3720 or transmitted to the outside via the communicator 3710. At least two cameras 3771 may be included, according to exemplary embodiments of the user terminal 3700.

The microphone 3772 receives an external audio signal and converts the external audio signal into electrical audio data. For example, the microphone 3772 may receive an audio signal from an external device or a speaking person. The microphone 3772 may use various noise removal algorithms to remove noise that is generated while receiving the external audio signal.

Figure 38:
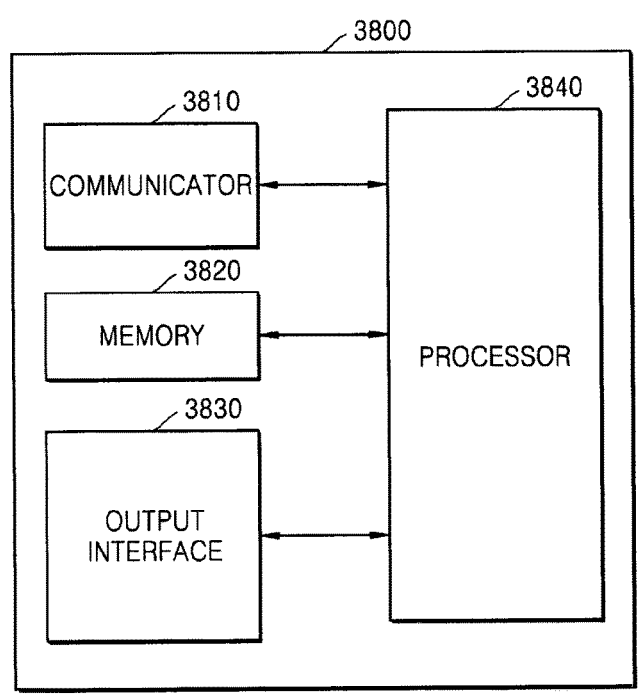
FIGS. 38-40 are block diagrams illustrating structures of a service terminal according to one or more exemplary embodiments.
Figure 39:
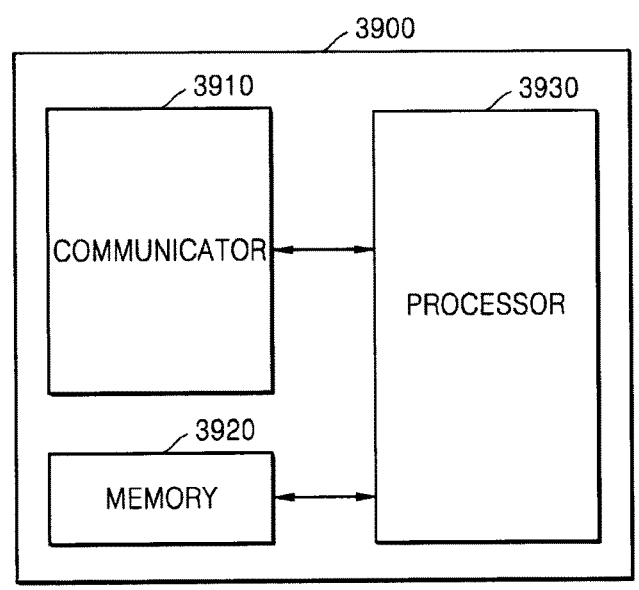
Figure 40:
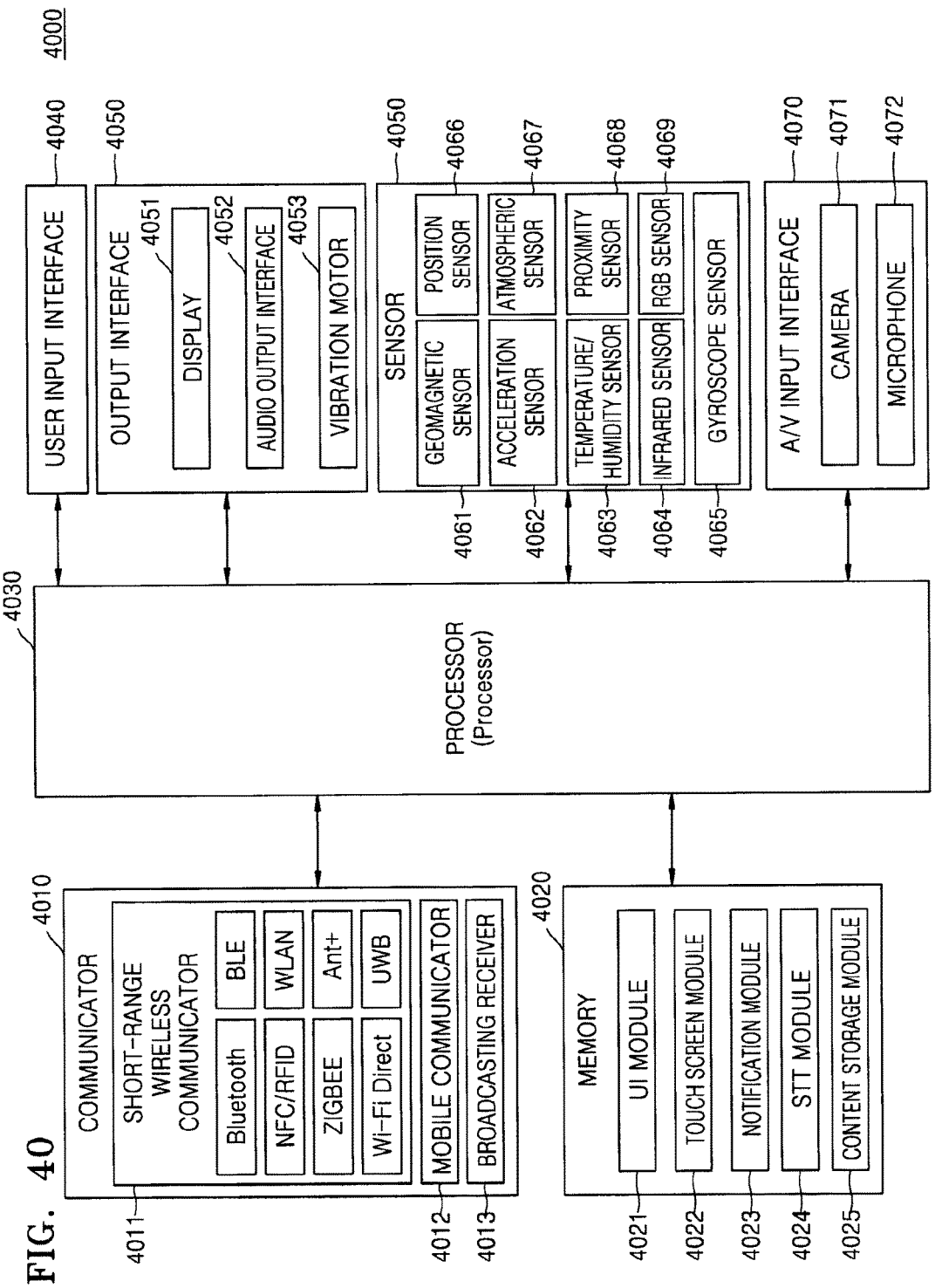

FIGS. 38-40 are block diagrams illustrating structures of a service terminal according to an exemplary embodiment.

Referring to FIG. 38, the service terminal 3800 may include a communicator 3810, a memory 3820, an output interface 3830, and a processor 3840. A service terminal may be implemented with a smaller number of elements than those illustrated in FIG. 39, or may be implemented with a larger number of elements than those illustrated in FIG. 40. FIG. 39 illustrates a service terminal 3900 according to an exemplary embodiment including a communicator 3910, a memory 3920, and a processor 3930. FIG. 40 illustrates a service terminal 4000 according to an exemplary embodiment further including a user input interface 4040, an output interface 4050, a sensor 4060, and an A/V input interface 4070 in addition to a communicator 4010, a memory 4020, and a processor 4030. The elements of the user terminal 4000 may be substantially the same as those of the user terminal 3700, or the elements of the user terminal 4000 may correspond to those of the user terminal 3700 but differ in respects. Hereinafter elements of the user terminal 4000 that are different from the elements of the user terminal 3700 will be described.

The communicator 4010 may include at least one component that enables communication between a user terminal and a server. For example, the communicator 4010 may include a short-range wireless communicator 4011, a mobile communicator 4012, and a broadcasting receiver 4013.

The communicator 4010 may receive at least one of user ID information and user context information that are broadcast by the user terminal. The communicator 4010 may transmit service information to the server. The communicator 4010 may receive service information from the server.

The processor 4030 controls all operations of the service terminal 4000. For example, the processor 4030 may control the output interface 4050, the user input interface 4040, the communicator 4010, the sensor 4060, and the A/V input interface 4070 by executing the programs stored in the memory 4010.

When the service terminal 4000 receives the user ID information broadcast by the user terminal, the processor 4030 may control the communicator 4010 to transmit to the server a service provision request to provide service information to the user terminal. The processor 4030 may control the communicator 4010 to transmit the user ID information to the server. The processor 4030 may control the communicator 4010 to transmit the user context information to the server. The processor 4030 may control the service terminal to provide a service using the service information received from the server. The processor 4030 may acquire service information mapped with the user context information broadcast by the user terminal using mapping information representing mapping between user context information and service information, and control the communicator 4010 to transmit the acquired service information to the server.

Figure 41:
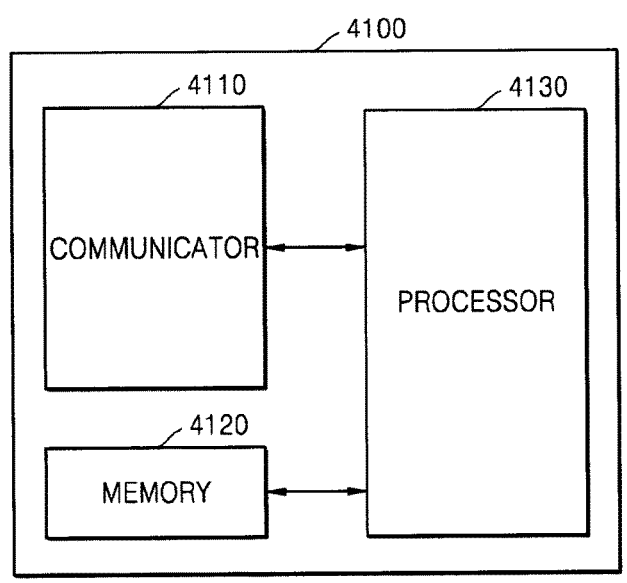
FIG. 41 is a block diagram illustrating a structure of a server according to an exemplary embodiment.

FIG. 41 is a block diagram illustrating a structure of a server according to an exemplary embodiment.

Referring to FIG. 41, a server 4100 according to an exemplary embodiment may include a communicator 4110, a memory 4120, and a processor 4130. The server 4100 may be implemented with a larger number of components than those illustrated in FIG. 41, like the user terminal 3700 of FIG. 37 and those of the service terminal 4000 of FIG. 40.

For example, the server 4100 may further include a user input interface, an output interface, a sensor, and an A/V input interface in addition to the communicator 4110, the memory 4120, and the processor 4130. The user input interface, the output interface, the sensor, and the A/V input interface of the server 4100 may be the same as those of the user terminal 3700 of FIG. 37 and those of the service terminal 4000 of FIG. 40, or the user input interface, the output interface, the sensor, and the A/V input interface of the server 4100 may correspond to those of the user terminal 3700 of FIG. 37 and those of the service terminal 4000 of FIG. 40 but differ in respects. Hereinafter, elements of the server 4100 that are different from those of the user terminal 3700 of FIG. 37 and those of the service terminal 4000 of FIG. 40 will be described.

The communicator 4110 may include at least one component that enables communication between a user terminal and the server 4100 and communication between a service terminal and the server 4100. For example, the communicator 4110 may include a short-range wireless communicator, a mobile communicator, and a broadcasting receiver.

The communicator 4110 may receive service information from the service terminal. The communicator 4110 may also receive user ID information from the service terminal. The user ID information may include user ID information of the user terminal. Alternatively, the user ID information may include user ID information of the service terminal. The communicator 4110 may receive user ID information, user context information, and first service information from the service terminal having received information that is broadcast by the user terminal. The communicator 4110 may transmit the service information to at least one of the user terminal and the service terminal. The communicator 4110 may transmit second service information generated using the first service information received from the service terminal to at least one of the user terminal and the service terminal.

The processor 4130 controls all operations of the server 4100. For example, the processor 4130 may control the output interface, the user input interface, the communicator 4110, the sensor, and the A/V input interface by executing the programs stored in the memory 4120.

The processor 4130 may control the communicator 4110 to receive the user ID information and the first service information from the service terminal. The service terminal may be a terminal that has received the information broadcast by the user terminal.

The processor 4130 may determine a reception device using the user ID information and generate the service information according to a service provision request. When the processor 4130 receives the user ID information and a service provision request from the service terminal, the processor 4130 may control the communicator 4110 to transmit the service information to the reception device. The processor 4130 may acquire service information mapped with received user context information using mapping information representing mapping between user context information and service information, and control the communicator 4110 to transmit the acquired service information to the user terminal.

The processor 4130 may determine the reception device using ID information. The ID information may include the terminal ID of the user terminal, the network ID information of the user terminal, or a user ID. The processor 4130 may determine the reception device using predetermined correspondence information representing correspondence between pieces of ID information and reception devices. The correspondence information representing correspondence between pieces of ID information and reception devices may be stored in the memory 4120. For example, when the ID information includes the terminal ID of the user terminal or the network ID information of the user terminal, the processor 4130 may determine the user terminal as the reception device. When the ID information includes a user ID, the processor 4130 may determine the server of a web service provider used by the user ID, as the reception device The processor 4130 may generate the second service information using at least one of the user context information and the first service information received from the service terminal. The processor 4130 may generate service information that is the same as the first service information, as the second service information. Alternatively, the processor 4130 may generate, as the second service information, at least one of service information including the first service information, information generated using the first service information, and service information generated using the first service information and user information.

The processor 4130 may control the communicator 4110 to transmit the second service information to the reception device. For example, the processor 4130 may control the communicator 4110 to transmit the second service information to the user terminal, the service terminal, or a cloud server of the user terminal. When the second service information is transmitted to the cloud server of the user terminal, the processor 4130 may control the communicator 4110 to also transmit user ID information.

A method according to an exemplary embodiment may be embodied as program commands executable by various computing devices, and may be recorded on a non-transitory computer-readable recording medium. The non-transitory computer-readable recording medium may include program commands, data files, data structures, and the like separately or in combinations. The program commands to be recorded on the non-transitory computer-readable recording medium may be designed and configured for exemplary embodiments or may be well-known to and be usable by one of ordinary skill in the art of computer software. Examples of the non-transitory computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device configured to store and execute program commands such as a ROM, a random-access memory (RAM), or a flash memory. Examples of the program commands are advanced language codes that can be executed by a computer using an interpreter or the like as well as machine language codes made by a compiler.

The exemplary embodiments should be considered in a descriptive sense only and not for purposes of limitation. Descriptions of features or aspects within each exemplary embodiment should be considered as available for other similar features or aspects in other exemplary embodiments.

While exemplary embodiments have been particularly shown and described, it will be understood by those of ordinary skill in the art that various changes in form and details may be made therein without departing from the spirit and scope as defined by the following claims.

What is claimed is:

1. A user terminal comprising:
   a communicator;
   a sensor configured to generate sensing data based on sensed surroundings of the user terminal; and
   a controller configured to:
   determine user context information mapped with the sensing data using mapping information representing mapping between the sensing data and the user context information;
   broadcast, via the communicator, user ID information and the user context information to an unspecified terminal using a short-range wireless communication method;
   receive, via the communicator, service information from a server; and
   provide a service using the service information,
   wherein the service information is provided from the server to the user terminal in response to a service request provided to the server by a service terminal that receives the user ID information and the user context information from the user terminal, and
   wherein the service request is determined by the service terminal based on the user ID information and the user context information received from the user terminal.

2. The user terminal of claim 1, wherein the service information comprises at least one among service information generated by the server according to the user context information, and service information provided by the service terminal to the server.

3. The user terminal of claim 1, wherein the user ID information comprises at least one among a user ID, terminal ID information of the user terminal, and network ID information of the user terminal.

4. The user terminal of claim 1, further comprising an input interface configured to receive a user input, wherein
   the controller is further configured to control the communicator to broadcast user context information acquired using the input interface, and
   the service information comprises at least one among service information generated by the server according to the user context information, and service information generated by the service terminal according to the user context information.

5. The user terminal of claim 1, wherein the controller is further configured to control the communicator to broadcast the determined user context information.

6. The user terminal of claim 4, wherein the controller is further configured to determine whether transmission conditions for broadcasting the determined user context information have been satisfied, and, in response to the determining, control the communicator to broadcast the determined user context information.

7. The user terminal of claim 4, wherein
   the controller is further configured to, in response to the user context information being broadcast, transmit a message to an external terminal according to history information, the message comprising a control message that is transmitted by the user terminal, and
   in response to the user context information being broadcast, generate the history information comprising the control message transmitted by the user terminal and ID information corresponding to the external terminal having received the message.

8. The user terminal of claim 7, wherein the controller is further configured to update the history information using a control input that is made by the external terminal to the user terminal after state information is broadcast.

9. The user terminal of claim 1, wherein the user terminal does not perform a network connection with the service terminal.

10. A service terminal comprising:
    a communicator configured to receive user ID information and user context information broadcast from a user terminal using a short-range wireless communication method, and transmit a service provision request to a server, wherein the service terminal is not specified by the user terminal when the user terminal broadcasts the user ID information and the user context information using the short-range wireless communication method; and
    a controller configured to control the communicator to receive the user ID information and the user context information, to determine the service provision request based on the user ID information and the user context information, and to transmit the service provision request to the server in response to receiving the user ID information and the user context information from the user terminal.

11. The service terminal of claim 10, wherein the controller is further configured to control the communicator to transmit the user ID information to the server.

12. The service terminal of claim 10, wherein
    the controller is further configured to control the communicator to transmit the user context information to the server.

13. The service terminal of claim 12, wherein
    the communicator is further configured to receive service information from the server, and
    the controller is further configured to control the service terminal to provide a service using the service information, and
    the service information is generated by the server having received the user context information from the service terminal, according to the user context information.

14. The service terminal of claim 10, wherein
    the controller is further configured to determine corresponding service information mapped with the received user context information using mapping information representing mapping between the user context information and the service information, and control the communicator to transmit the corresponding service information to the server.

15. A server comprising:
    a communicator configured to receive a service provision request comprising user ID information and user context information from a service terminal having received the user ID information and the user context information broadcast from a user terminal using a short-range wireless communication method, and transmit service information to the user terminal, wherein the service terminal is not specified by the user terminal when the user terminal broadcasts the user ID information and the user context information using the short-range wireless communication method; and
    a controller configured to determine the user terminal using the user ID information and generate the service information according to the service provision request, and control the communicator to transmit the service information to the user terminal in response to receiving the user ID information and the service provision request from the service terminal, wherein the service provision request is generated by the service terminal based on the user ID information and the user context information received from the user terminal.

16. The server of claim 15, wherein the controller is further configured to determine corresponding service information mapped with the received user context information using mapping information representing mapping between user context information and service information, and control the communicator to transmit the determined service information to the user terminal.

17. A service providing method performed by a user terminal, the service providing method comprising:

determining user context information mapped with sensing data using mapping information representing mapping between the sensing data and the user context information;

broadcasting user ID information and the user context information to an unspecified terminal using a short-range wireless communication method;

receiving service information from a server; and controlling the user terminal to provide a service using the received service information, wherein the service information is provided from the server to the user terminal in response to a service request provided to the server by a service terminal that receives the user ID information and the user context information from the user terminal, and wherein the service request is determined by the service terminal based on the broadcast user ID information and the user context information as received from the user terminal.

18. A non-transitory computer-readable recording medium having recorded thereon a computer program, which, when executed by a computer, performs the service providing method of claim 17.

19. A service providing method performed by a service terminal, the service providing method comprising:

receiving broadcast user ID information and user context information broadcast from a user terminal using a short-range wireless communication method, wherein the service terminal is not specified by the user terminal when the user terminal broadcasts the user ID information and the user context information using the short-range wireless communication method;

determining a service provision request based on the broadcast user ID information and the user context information received from the user terminal; and transmitting the service provision request to a server.

20. A non-transitory computer-readable recording medium having recorded thereon a computer program, which, when executed by a computer, performs the service providing method of claim 19.

21. A service providing method performed by a server, the service providing method comprising:

receiving a service provision request from a service terminal that has received user ID information and user context information broadcast from a user terminal using a short-range wireless communication method, the service provision request being determined by the service terminal based on the user ID information and the user context information received from the user terminal, and the service terminal not being specified by the user terminal when the user terminal broadcasts the user ID information and the user context information using the short-range wireless communication method;

determining the user terminal using the user ID information;

generating service information according to the service provision request; and transmitting the service information to the user terminal.

22. A non-transitory computer-readable recording medium having recorded thereon a computer program, which, when executed by a computer, performs the service providing method of claim 21.

23. A service providing system comprising:

a user terminal comprising a user terminal communicator and a user terminal controller;

a service terminal comprising a service terminal communicator and a service terminal controller; and a server comprising a server communicator and a server controller, wherein the user terminal controller is configured to generate sensing data based on sensed surroundings of the user terminal, determine user context information mapped with a sensing data using mapping information representing mapping between the sensing data and the user context information, and control the user terminal communicator to broadcast user ID information and user context information to an unspecified terminal using a short-range wireless communication method, the service terminal controller is configured to control the service terminal communicator to receive the user ID information and the user context information from the user terminal, determine a service request, and transmit the service request to the server, the server controller is further configured to control the server communicator to receive the service request from the service terminal, determine service information corresponding to the service request, and control the server communicator to transmit the service information to the user terminal, and the user terminal controller is further configured to control the user terminal communicator to receive the service information from the server and generate a user service based on the service information.

24. The service providing system of claim 23, wherein the user terminal further comprises an input interface configured to generate a user input signal, and the user terminal controller is further configured to generate a control message comprising the user ID information based on the user input signal and control the user terminal controller to transmit the control message to the service terminal.

25. The service providing system of claim 23, wherein the user terminal further comprises a sensor configured to generate a sensor signal, and the user terminal controller is further configured to generate a control message comprising the user ID information based on the sensor signal and control the user terminal controller to transmit the control message to the service terminal.

26. The service providing system of claim 25, wherein the sensor signal corresponds to a location of the user terminal, and the server controller is further configured to determine a user terminal location based on the sensor signal, and determine the service information based on the location of the user terminal.

* * * * *